(12) United States Patent
Iwata et al.

(10) Patent No.: US 6,275,921 B1
(45) Date of Patent: Aug. 14, 2001

(54) DATA PROCESSING DEVICE TO COMPRESS AND DECOMPRESS VLIW INSTRUCTIONS BY SELECTIVELY STORING NON-BRANCH NOP INSTRUCTIONS

(75) Inventors: Yasushi Iwata, Sagamihara; Akira Asato, Kawasaki, both of (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/045,117

(22) Filed: Mar. 20, 1998

(30) Foreign Application Priority Data

Sep. 3, 1997 (JP) ................................................. 9-238287

(51) Int. Cl.[7] ...................................................... G06F 15/76
(52) U.S. Cl. .............................. 712/24; 712/210; 395/706
(58) Field of Search ................................... 710/5; 712/24, 712/210; 395/706; 711/120; 341/55

(56) References Cited

U.S. PATENT DOCUMENTS 5,057,837 * 10/1991 Colwell et al. .......................... 341/55
5,878,267 * 3/1999 Hampapuram et al. ................ 712/24
5,881,260 * 3/1999 Raje et al. ............................. 712/210
5,893,143 * 4/1999 Tanaka et al. ......................... 711/120
5,930,508 * 7/1999 Faraboschi et al. ................... 395/706

* cited by examiner

*Primary Examiner*—Thomas C. Lee
*Assistant Examiner*—Harold Kim
(74) *Attorney, Agent, or Firm*—Staas & Halsey LLP

(57) ABSTRACT

A data processing device includes an instruction storage memory which stores load instructions by eliminating NOP instructions for insertion into a load module of a VLIW computer. The data processing device also includes a device to expand the compressed load module automatically by a hardware circuit during instruction execution. The data processing device compresses and stores specific instruction code strings in memory with information indicating a form of compression and then restores the instruction code strings to an original format when read from memory according to the compression information. Information indicating an original storage position is attached to each instruction code, instruction code strings are stored in memory without specific instruction codes, and then restored to the original code strings when read from memory according to the storage position information.

42 Claims, 50 Drawing Sheets

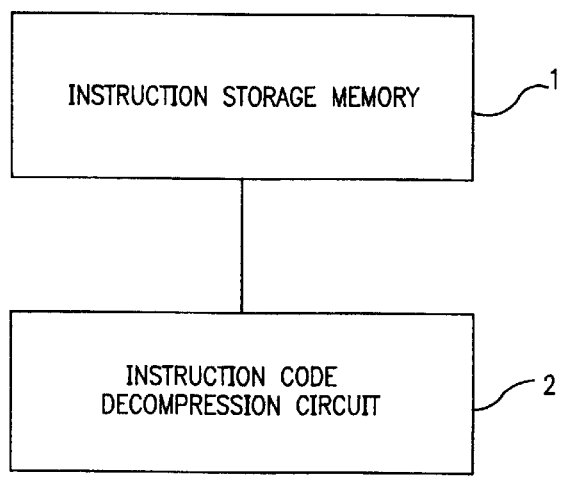
FIG. IA
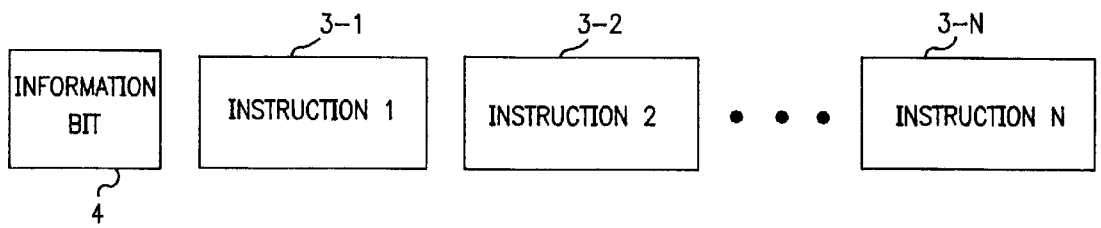
FIG. IB

SHORT FORMAT (48 BITS)

LONG FORMAT (96 BITS)

| | INPUT SLOT | | [S0,S1,[T],S2,S3] |
|---|---|---|---|
| | HIGH-ORDER SLOT | LOW-ORDER SLOT | ON SWITCH |
| 1 | LONG FORMAT (FIRST HALF) | LONG FORMAT (SECOND HALF) | [0,0,[2,3],2,2] |
| 2 | SHORT FORMAT (FORMAT i) | SHORT FORMAT (FORMAT i) | [F(i),[],F(i)] |
| 3 | SHORT FORMAT (FORMAT i) | LONG FORMAT (FIRST HALF) | [F(i),[],0,0] |
| 4 | LONG FORMAT (SECOND HALF) | LONG FORMAT (FIRST HALF) | [2,2,[0,1],[]] |
| 5 | LONG FORMAT (SECOND HALF) | SHORT FORMAT (FORMAT i) | [2,2,[0,1],[]] |
| 4' | LONG FORMAT (SECOND HALF) | LONG FORMAT (FIRST HALF) | [[ ][ ],0,0] |
| 5' | LONG FORMAT (SECOND HALF) | SHORT FORMAT (FORMAT i) | [[ ][ ],F(i)] |

FIG. 7

| SHORT FORMAT i | F(1) |
|---|---|
| SHORT FORMAT (i=1) | [0,0] |
| SHORT FORMAT (i=2) | [0,1] |
| SHORT FORMAT (i=3) | [0,2] |
| SHORT FORMAT (i=4) | [1,1] |
| SHORT FORMAT (i=5) | [1,2] |
| SHORT FORMAT (i=6) | [2,2] |

FIG. 8

| | | | | | | |
|---|---|---|---|---|---|---|
| 1 | I0 | I1 | I2 | I3 | NOP 0: LONG FORMAT |
| 2 | I4 | I5 | I6 | In | NOP 1 |
| 3 | I7 | In | I8 | I9 | |
| 4 | In | In | In | In | NOP 4 |
| 5 | In | In | I0 | I1 | NOP 2: SHORT FORMAT |
| 6 | In | I2 | In | I3 | |
| 7 | I4 | In | I5 | In | |
| 8 | In | In | In | I6 | NOP 3 |
| 9 | In | In | I7 | In | |
| 10 | In | I8 | In | In | |
| 11 | In | In | In | In | NOP 4 |
| 12 | I9 | In | In | I0 | NOP 2: SHORT FORMAT |
| 13 | I1 | I2 | I3 | I4 | NOP 0: LONG FORMAT |
| 14 | I5 | I6 | In | In | NOP 2: SHORT FORMAT |

FIG. 9A

| | | | | | | |
|---|---|---|---|---|---|---|
| 1 | [00] | I0 | I1 | [07] | I2 | I3 |
| 2 | [00] | I4 | I5 | [07] | I6 | In |
| 3 | [00] | I7 | In | [17] | I8 | I9 | ← NOP LINE DELETE
| 4 | [06] | I0 | I1 | [05] | I2 | I3 |
| 5 | [02] | I4 | I5 | [06] | In | I6 |
| 6 | [04] | In | I7 | [11] | In | I8 | ← NOP LINE DELETE
| 7 | [03] | I9 | I0 | [00] | I1 | I2 |
| 8 | [07] | I3 | I4 | [01] | I5 | I6 |

FIG. 9B

4',5' : RE-READ SLOT

| INPUT SLOT | | | [S0,S1,[T],S2,S3] | [S4,S5] |
|---|---|---|---|---|
| LOW-ORDER SLOT ONE CYCLE BEFORE | CURRENT INPUT SLOT | | ON SWITCH | |
| | HIGH-ORDER SLOT | LOW-ORDER SLOT | | |
| | LONG FORMAT (FIRST HALF) | LONG FORMAT (SECOND HALF) | [0,0,[2,3],2,2] | [ ] |
| | SHORT FORMAT (FORMAT i) | SHORT FORMAT (FORMAT i) | [F(i),[],F(i)] | [ ] |
| | SHORT FORMAT (FORMAT i) | LONG FORMAT (FIRST HALF) | [F(i),[],[ ] ] | [ ] |
| LONG FORMAT (FIRST HALF) | LONG FORMAT (SECOND HALF) | LONG FORMAT (FIRST HALF) | [2,2,[ ],[ ]] | [0,0] |
| LONG FORMAT (FIRST HALF) | LONG FORMAT (SECOND HALF) | LONG FORMAT (FORMAT i) | [2,2,[ ],F(i)] | [0,0] |

FIG. 20

|  | SLOT A | SLOT B | SLOT C | SLOT D |
|---|---|---|---|---|
| CYCLE1 | i0 | i1 | nop | i2 |
| CYCLE2 | nop | nop | i3 | nop |
| CYCLE3 | i4 | nop | nop | nop |
| CYCLE4 | nop | i5 | nop | i6 |
| CYCLE5 | nop | nop | nop | nop |
| CYCLE6 | nop | nop | nop | nop |
| CYCLE7 | nop | i7 | nop | nop | entry a
entry a+1
entry a+2

STATUS

E: BLANK
V: EFFECTIVE INSTRUCTION
N: NOP INSTRUCTION
D: DELAY SLOT

FIG. 34A

OPERATION

NOP WAITS FOR INPUT AFTER OUTPUTTING AN NOP INSTRUCTION

WAITS FOR INPUT AFTER OUTPUTTING THE INSTUCTION CODE
NOP WAITS FOR INPUT AFTER OUTPUTTING THE NOP INSTRUCTION
NOP CHANGES TO STATE V AFTER OUTPUTTING THE NOP INSTRUCTION
WHILE KEEPING THE INSTRUCTION CODE.

FIG. 34B

FETCH PATTERN

| | | | | |
|---|---|---|---|---|
| FETCH0 | A0 | B0 | D0 | B1 |
| FETCH1 | C0 | C1 | A1 | A2 |
| FETCH2 | D1 | D2 | B2 | D3 |
| FETCH3 | C2 | C3 | C4 | C5 |

FIG. 35A

INSTRUCTION ISSUE ORDER

| | | | | | | | | | |
|---|---|---|---|---|---|---|---|---|---|
| ISSUE0 | A0 | B0 | NOP | D0 | ISSUE4 | A2 | NOP | NOP | D1 |
| ISSUE1 | NOP | B1 | C0 | NOP | ISSUE5 | NOP | NOP | NOP | D2 |
| ISSUE2 | NOP | NOP | C1 | NOP | ISSUE6 | NOP | B2 | NOP | D3 |
| ISSUE3 | A1 | NOP | NOP | NOP | ISSUE7 | NOP | NOP | C2 | NOP |

FIG. 35B

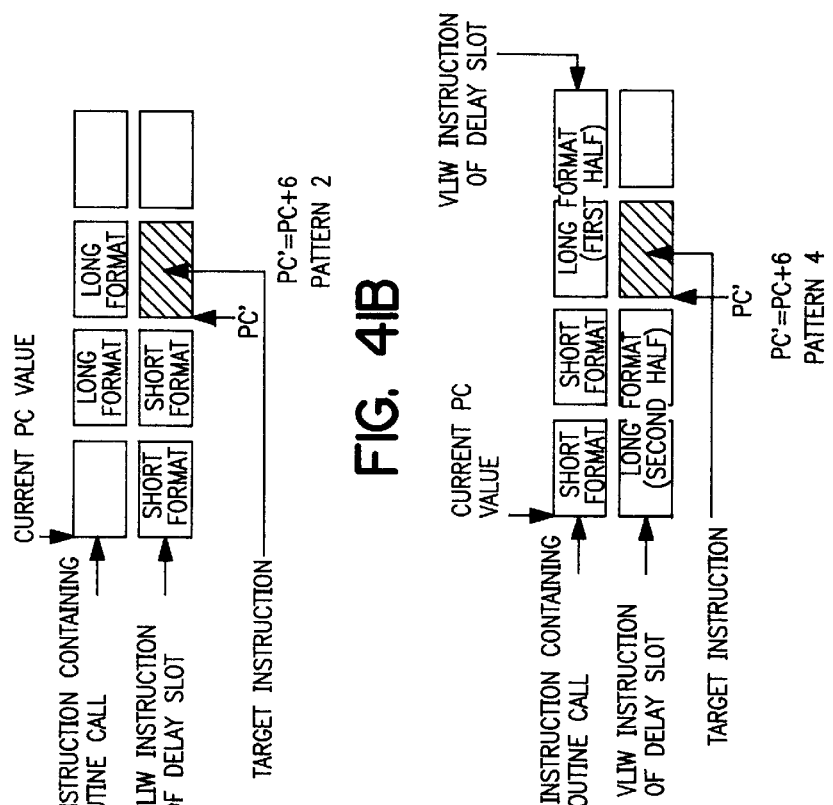
FIG. 4IA
FIG. 4IB
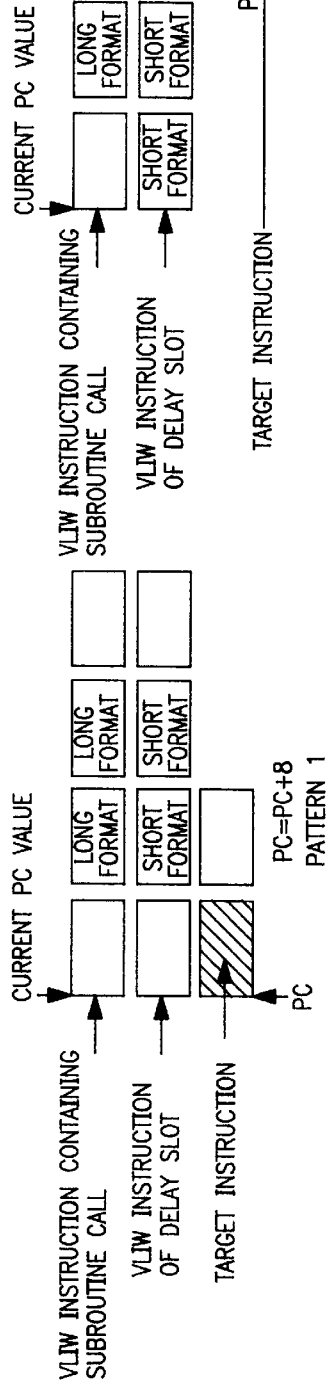
FIG. 4IC
FIG. 4ID

| PATTERN | VLIW INSTRUCTION CONTAINING SUBROUTINE CALL | VLIW INSTRUCTION OF DELAY SLOT | ROFF |
| --- | --- | --- | --- |
| PATTERN 1 | LONG FORMAT | LONG FORMAT | 8 |
| PATTERN 2 | LONG FORMAT | SHORT FORMAT | 6 |
| PATTERN 3 | LONG FORMAT | IMPLICIT NOP | 4 |
| PATTERN 4 | SHORT FORMAT | LONG FORMAT | 6 |
| PATTERN 5 | SHORT FORMAT | SHORT FORMAT | 4 |
| PATTERN 6 | SHORT FORMAT | IMPLICIT NOP | 2 |

FIG. 43

United States Patent US 6,275,921 B1

DATA PROCESSING DEVICE TO COMPRESS AND DECOMPRESS VLIW INSTRUCTIONS BY SELECTIVELY STORING NON-BRANCH NOP INSTRUCTIONS

CROSS-REFERENCE TO RELATED APPLICATIONS

This application is based upon and claims priority of Japanese Patent Application No. 09-238287 filed Sep. 3, 1997, the contents being incorporated herein by reference.

BACKGROUND OF THE INVENTION

The present invention relates to the field of data processing devices including No Operation ("NOP") instructions. More particularly, the present invention relates to data processing devices that eliminate at least NOP instructions from an instruction string to provide more efficient use of instruction storage memory. The present invention also particularly relates to data processing devices, mainly intended for a Very Long Instruction Word ("VLIW") computer, that eliminate NOP instructions inserted substantially into a load module of the VLIW computer to compress the load module and expand the compressed load module automatically by a hardware circuit when executing instructions.

To satisfy the recent demand for faster computer systems, a computer based on a new Central Processing Unit ("CPU") operating system called VLIW is being developed. To install a VLIW-type computer in a limited memory space, VLIW-type load modules should be made as small as possible.

A load module of a conventional VLIW-type computer contains NOP instructions. Because of the use of many unnecessary NOP instructions, the percentage of actual execution instructions in a load module is low. Therefore, if a VLIW-type computer is introduced into a computing system that has a limited memory capacity, such as dedicated processing modules, instruction storage memory is not used efficiently.

Thus, as set forth above, the low efficiency of memory use makes it difficult to use a VLIW-type computer for industrial applications.

BRIEF SUMMARY OF THE INVENTION

It is therefore an object of the present invention to solve the above-mentioned problems by providing a device that eliminates NOP instructions inserted substantially into a load module of a VLIW computer.

It is a further object of the present invention to compress a load module for a VLIW computer and expand the compressed load module automatically by a hardware circuit when executing instructions.

It is an even further object of the present invention to remove NOP instructions to thereby increase a necessary capacity in a load module of a VLIW computer.

It is a further object of the present invention to reduce module size in a VLIW computer.

Objects of the present invention are achieved by a data processing device with an instruction compression function and an instruction decompression function, including an instruction storage memory to store specific instruction code strings in a compressed form, wherein each instruction code string includes attached compression information indicating a form of compression; and an instruction code decompression circuit to restore an instruction code string read from the instruction storage memory to an original status according to the attached compression information.

Further objects of the present invention are achieved by a data processing device with an instruction compression function and an instruction decompression function, including an instruction storage memory to store at least specific instruction code strings in a compressed form with compression information indicating a form of compression; an instruction buffer to store decompressed instructions; an auxiliary buffer to temporarily store part of an instruction being decompressed; a first switch to selectively input instruction code strings of high-order slots read from the instruction storage memory into the instruction buffer; a second switch to selectively input instruction code strings of low-order slots read from the instruction storage memory into the instruction buffer and the auxiliary buffer; a third switch to transfer contents of the auxiliary buffer to the instruction buffer; and a control circuit to control the first, second, and third switch according to the compression information.

Even further objects of the present invention are achieved by a data processing device with an instruction compression function and an instruction decompression function, including an instruction storage memory to read or write instruction codes in units of instruction code strings including a predetermined number of instruction codes in a compressed form and storage position information attached to each instruction code by deleting specific instruction codes; and an instruction code decompression circuit to decompress each instruction code according to the attached storage position information.

Moreover, objects of the present invention are achieved by a data processing device with an instruction compression function and an instruction decompression function, including an instruction storage memory to read or write instruction codes in units of instruction code strings, each instruction code string including a specified number of instruction codes in a compressed form and storage position information attached to each instruction code by deleting specific instruction codes; a plurality of instructions buffers to store a plurality of instruction codes and to cyclically fetch a plurality of instructions; an instruction code distribution unit to develop a compressed instruction code string read from the instruction storage memory and send the instruction codes to respective instruction buffers of the plurality of instruction buffers; and a control circuit to control the development of a compressed instruction code string in the instruction distribution unit according to storage position information attached to each instruction code and instruction buffer information indicating an instruction buffer from which an instruction is output.

Even further objects of the present invention are achieved by a data processing device with an instruction compression function and an instruction decompression function, including an instruction storage memory to store specific instruction code strings in a compressed form with attached compression information indicating a form of compression; and an instruction code decompression circuit to restore a code string read from the instruction storage memory to an original status according to the attached compression information, wherein a program counter is not added to an instruction code deleted for compression and a program counter is added to an instruction code stored in the instruction storage memory.

Objects of the present invention are also achieved by a data processing device with an instruction compression function and an instruction decompression function, including an instruction storage memory to read or write units of instruction code strings including a predetermined number of instruction codes in a compressed form with storage position information attached to each instruction code by deleting specific instruction codes; and an instruction code decompression circuit to decompress each instruction code according to the attached storage position information, wherein a program counter is not added to an instruction code deleted for compression, and wherein a program counter is added to an instruction code stored in the instruction storage memory.

Further objects of the present invention are achieved by a data storage medium to store at least specific instruction code strings in a compressed form and compression form information respectively indicating a form of compression for the instruction code strings.

Moreover, objects of the present invention are achieved by a data storage medium to read or write instruction codes in units of instruction code strings including a specified number of instruction codes in a form compressed by deleting specific instruction codes and in a form such that storage position information is respectively attached to each instruction code.

Even further objects of the present invention are achieved by a data processing device with an instruction compression function and an instruction decompression function, including an instruction storage memory to store specific instruction code strings in a compressed form, wherein each instruction code string includes attached compression information indicating a form of compression; and an instruction code decompression circuit to decompress a compressed instruction code string read from the instruction storage memory according to the attached compression information, wherein succeeding instruction information indicating that a succeeding VLIW instruction includes only NOP instructions is added to the compression information of the instruction code string, thereby storing information from the succeeding instruction code string in the instruction storage memory without storing the succeeding VLIW instruction.

BRIEF DESCRIPTION OF THE DRAWINGS

These and other objects and advantages of the present invention will become apparent and more readily appreciated from the following description of the preferred embodiments, taken in conjunction with the accompanying drawings of which:

FIGS. 1A and 1B are respective block diagrams of an instruction code decompression circuit and a plurality of instructions for use in a VLIW computer according to a first embodiment of the present invention.

FIG. 7 is a table of switching rules for switch circuit groups according to an embodiment of the present invention.

FIG. 8 is a table illustrating details of a switching rule F(i) according to an embodiment of the present invention.

FIGS. 9A and 9B are respective schematic views of a VLIW instruction sequence and a compressed sequence according to an embodiment of the present invention.

FIG. 20 is a table of switching rules in the circuit configuration illustrated in FIG. 19.

FIGS. 34A and 34B are schematic views of the contents of status bits in a VLIW instruction according to an embodiment of the present invention.

FIGS. 35A and 35B are tables of fetch patterns and instruction issue orders for an instruction code string compressed by adding a position specification flag to an instruction word and a decompressed string according to an embodiment of the present invention.

FIGS. 41A, 41B, 41C, and 41D are schematic views of return address patterns for a subroutine call instruction according to an embodiment of the present invention.

FIG. 43 is a return address pattern table according to an embodiment of the present invention.

DETAILED DESCRIPTION OF THE PREFERRED EMBODIMENTS

Figure 2A:
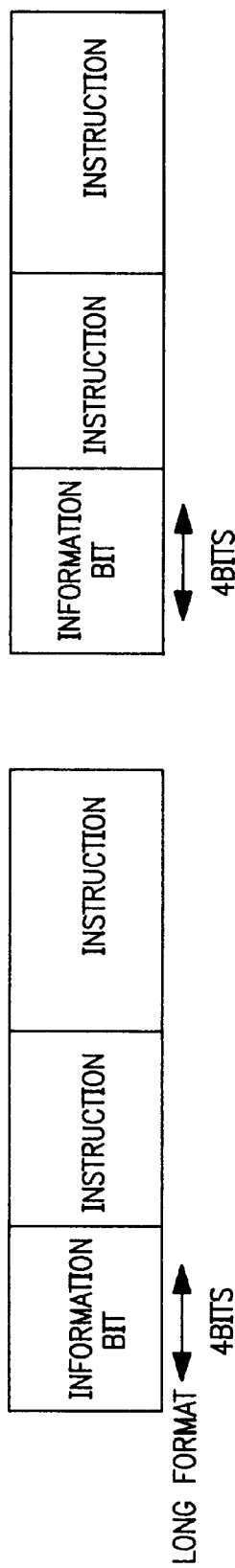
FIGS. 2A and 2B are block diagrams of long format and short format instructions for use in a VLIW computer according to an embodiment of the present invention.

Reference will now be made in detail to the preferred embodiments of the present invention, examples of which are illustrated in the accompanying drawings, wherein like reference numerals refer to like elements throughout.

A first embodiment of the present invention is set forth below with reference to FIGS. 1A and 1B, which are respective block diagrams of an instruction code decompression circuit and a plurality of instructions for use in a VLIW computer according to a first embodiment of the present invention.

FIG. 1A particularly shows the first embodiment of the present invention. The device embodiment is shown in FIG. 1A and the instruction code string is shown in FIG. 1B. The structure shown in FIG. 1A has an instruction storage memory (1) and an instruction code decompression circuit (2).

In the first embodiment of the present invention, the instruction storage memory (1) stores at least specific instruction code strings in a compressed form with information indicating the form of compression. The instruction code decompression circuit (2) restores an instruction code string read from the instruction storage memory (1) to its original status according to the compression form information attached to the string.

As FIG. 1B shows, compression form information (4) is attached to an instruction code string including instruction codes (3-1–3-n).

Figure 24A:
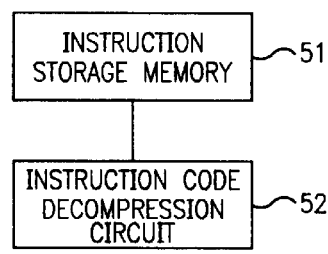
FIGS. 24A and 24B are respective block diagrams of an instruction code decompression circuit and a plurality of instructions for use in a VLIW computer according to a second embodiment of the present invention.
Figure 24B:
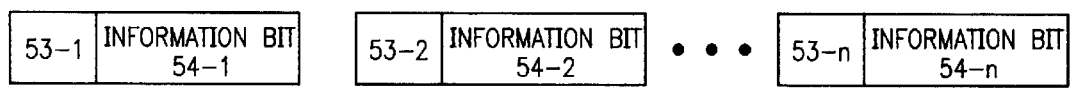

A second embodiment of the present invention is set forth below with reference to FIGS. 24A and 24B. The device embodiment is shown in FIG. 24A and the instruction code string is shown in FIG. 24B. The structure shown in FIG. 24A has an instruction storage memory (51) and an instruction code decompression circuit (52).

In the second embodiment of the present invention, the instruction storage memory (51) enables storing and reading of at least specific instruction code strings in a compressed form with storage position information indicating an original storage position for each instruction code and information indicating the form of compression.

The instruction code decompression circuit (52) restores an instruction code string read from the instruction storage memory (51) to its original status according to the compression form information attached to the string. As FIG. 24B shows, storage position information (53-1–53-n) is attached to the instruction codes (54-1–54-n).

First Embodiment of the Invention

The first embodiment of the present invention is now particularly explained with reference to FIG. 2A. and FIG. 2B. FIG. 2A illustrates an instruction format for the first embodiment of the present invention. This format is used to compress and store four-slot VLIW instructions in an instruction storage memory.

If there are three or more non-NOP effective instructions in a one-word VLIW instruction including four instruction codes (no or only one NOP instruction), the VLIW instruction is expressed in the long format shown in FIG. 2A. This long-format instruction is not compressed. Even if the VLIW instruction contains one NOP instruction, the NOP instruction is not deleted but rather stored in memory together with other effective instructions.

Figure 2B:
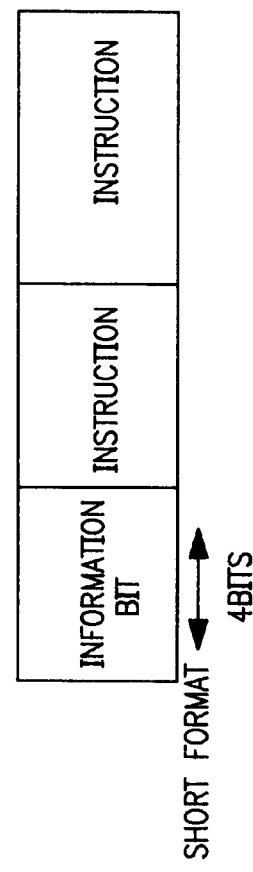

If there are two or three non-NOP effective instructions in a one-word VLIW instruction including four instruction codes (no or only one NOP instruction), the VLIW instruction is expressed in the short format shown in FIG. 2B.

Since a VLIW instruction includes four-slot instructions, an effective instruction appears at each slot in 16 different ways. FIG. 3A illustrates the patterns. In FIG. 3A, the effective instructions are hatched. A VLIW instruction belonging to one of the five effective instruction patterns from 1 to 5 is expressed in the long format shown in FIG. 2A because the number of effective instructions is four or three with no or only one NOP instruction.

A VLIW instruction belonging to one of the ten effective instruction patterns from 6 to 15 is expressed in the short format illustrated in FIG. 2B because the number of effective instructions is one or two, with two or three NOP instructions. The information bits are defined as illustrated in FIG. 3B to indicate slots where effective instructions exist.

To be more specific, the information bit format of information bit pattern 1 is added to effective instruction pattern 6 because A and B are effective instructions. To effective instruction pattern 7, the information bit format of information bit pattern 2 is added because A and c are effective instructions. To effective instruction pattern 8, the information bit format of information bit pattern 3 is added because A and D are effective instructions. To effective instruction pattern 9, the information bit format of information bit pattern 4 is added because B and C are effective instructions. To effective instruction pattern 10, the information bit format of information bit pattern 5 is added because B and D are effective instructions. To effective instruction pattern 11, the information bit format of information bit pattern 6 is added because C and D are effective instructions.

Figure 3B:
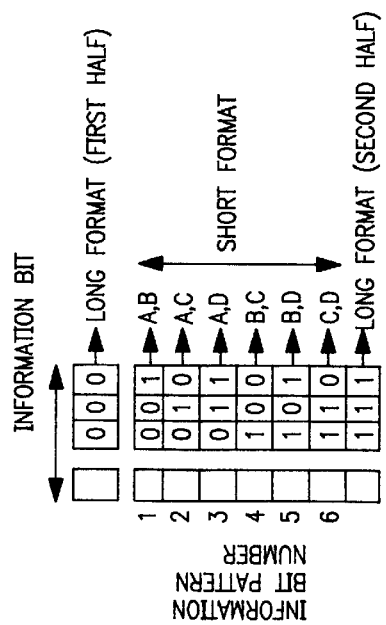
FIGS. 3A and 3B are schematic views of instruction patterns and bit patterns for use in a VLIW computer according to an embodiment of the present invention.
Figure 3A:
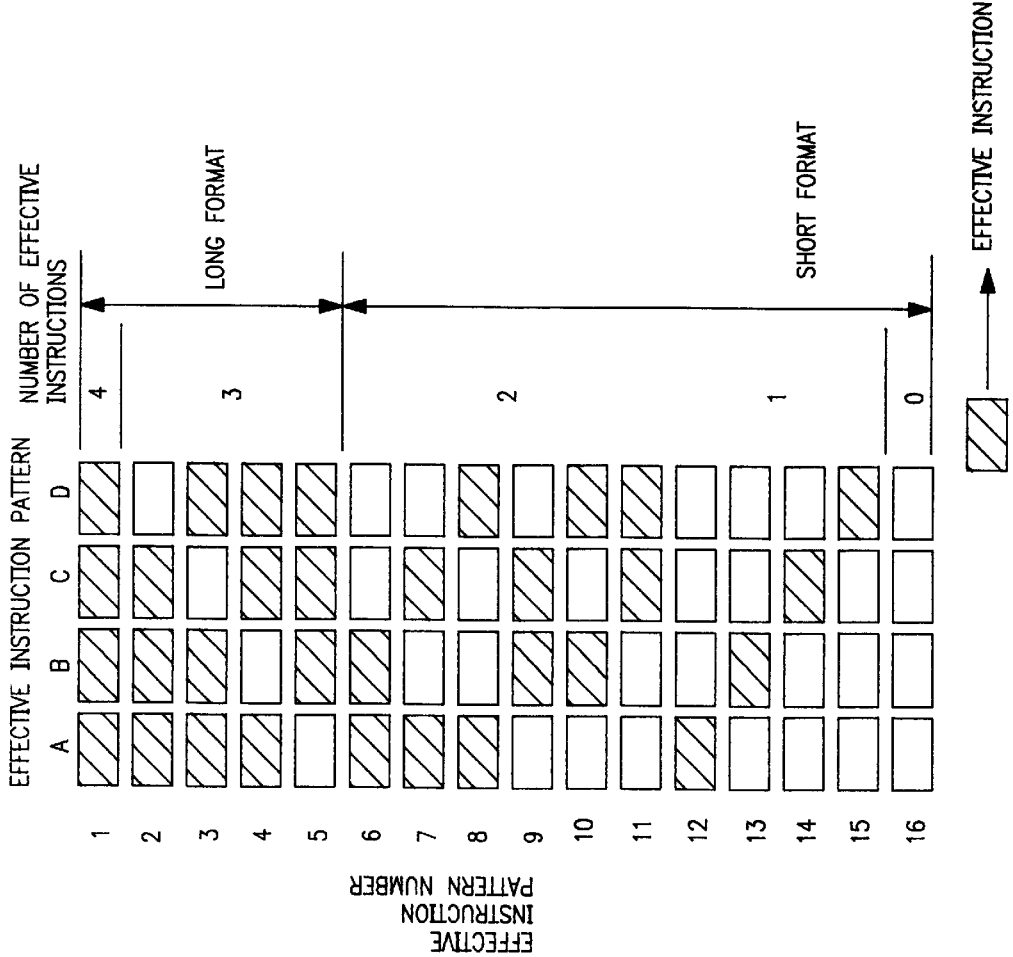

The information bit pattern table in FIG. 3B illustrates no directly corresponding patterns for cases where there is only one effective instruction in each effective instruction pattern from 12 to 15. In these cases, one of the three NOP instructions is handled as an instruction code to be stored in memory. Information bits are added by applying one of the effective instruction patterns from 6 to 11.

For effective instruction pattern 12, the same information bit format as the effective instruction pattern 6 is added to store the NOP instruction of instruction B in memory without deletion. To store the NOP instruction of instruction C in memory without deletion, the same information bit format as the effective instruction pattern 7 is added. To store the NOP instruction of instruction D in memory without deletion, the same information bit format as the effective instruction pattern 8 is added. This also applies to effective instruction patterns 13 to 15. The NOP instruction to be stored can be determined arbitrarily during circuit design.

In this embodiment, three of the four bits express an information pattern. The remaining information bit indicates whether the succeeding VLIW instruction is filled with NOP instructions. As to the information bit pattern in FIG. 3B, if the bit in the highest-order blank column is 1, all four instructions are NOP in the succeeding VLIW instruction.

For effective instruction pattern 16 (all four instructions are NOP in the VLIW instruction) illustrated in FIG. 3A, storage in memory can be omitted by setting the highest-order information bit to 1 in the immediately preceding instruction. By increasing the number of bits in the highest-order blank column in the information bit pattern of FIG. 3B, the existence of several continuous VLIW instructions all filled with NOP can be indicated to have the instructions deleted.

Figure 4A:
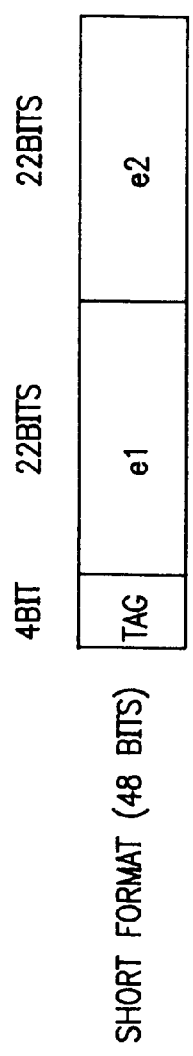
FIGS. 4A and 4B are block diagrams of short-format and long-format instructions according to an embodiment of the present invention.
Figure 4B:
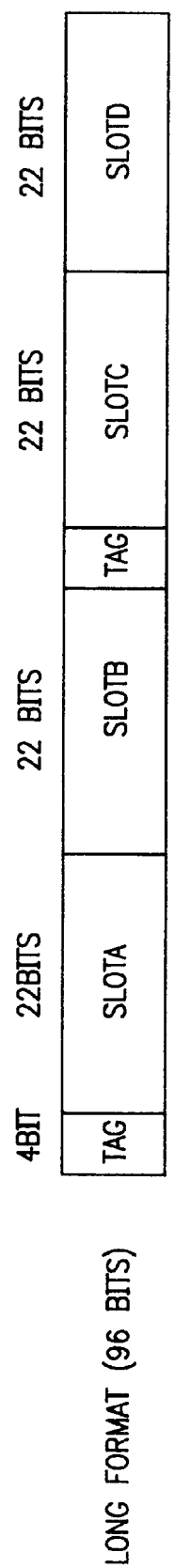

FIG. 4A and FIG. 4B illustrate examples of short-format and long-format instructions. Each instruction element forming a VLIW instruction is expressed by 22 bits. A short-format instruction has a 48-bit format including two instruction elements and 4-bit TAG information. A long-format instruction has a 96-bit format created by coupling two short-format instructions. The TAG information has the same meaning as the information bits illustrated in FIG. 3, as follows:

TAG[0:2]
   000: Long format (first half)
   001: Short format 1 (Slot A, Slot B)
   010: Short format 2 (Slot A, Slot C)
   011: Short format 3 (Slot A, Slot D)
   100: Short format 4 (Slot B, Slot C)
   101: Short format 5 (Slot B, Slot D)
   110: Short format 6 (Slot C, Slot D)
   110: Long format (second half)

TAG[3]
   0: The instruction immediately after in code RAM is the succeeding instruction
   1: The instruction immediately after in code RAM is preceded by a VLIW instruction consisting NOP instructions from all slots.

Figure 5:
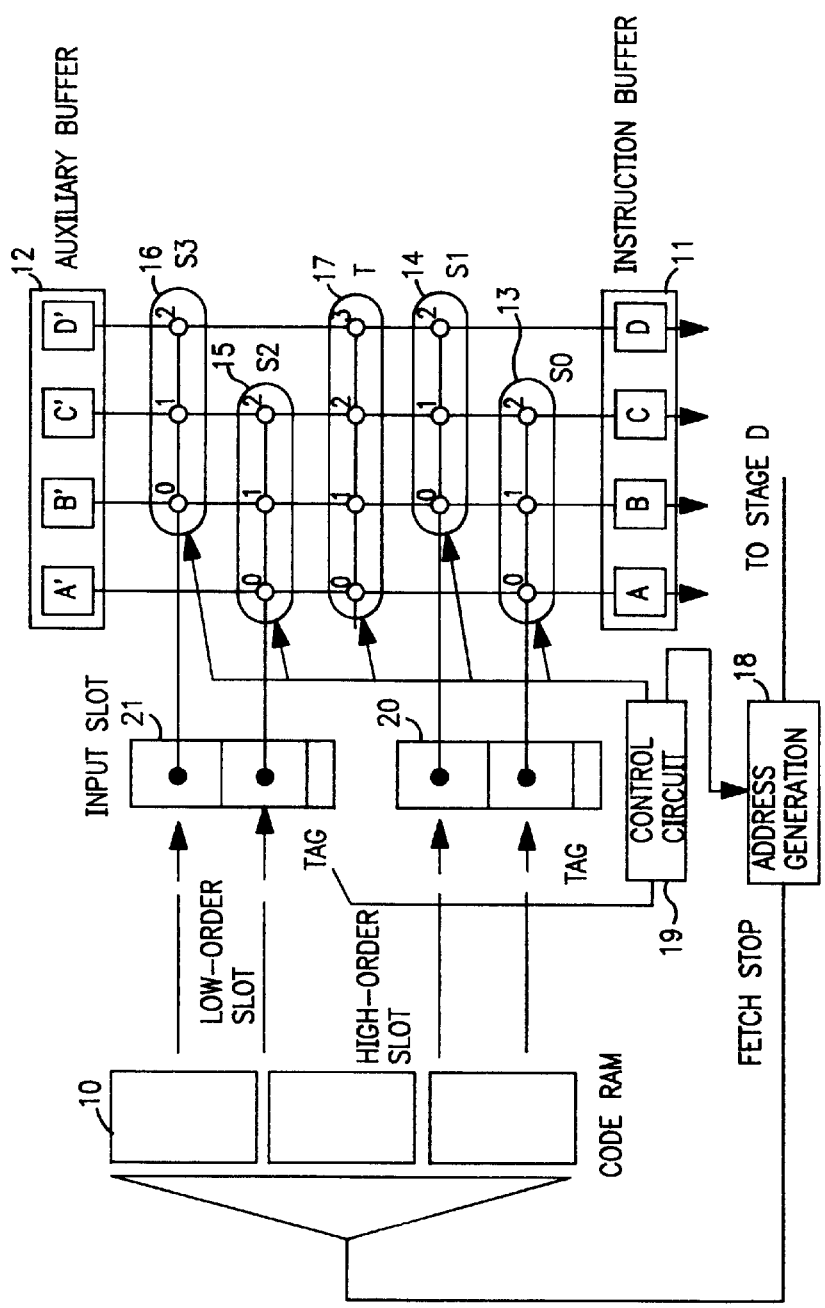
FIG. 5 is a schematic view of a circuit configuration to decompresses instructions which are compressed in long and short formats according to an embodiment of the present invention.

FIG. 5 is an example of a circuit embodiment that decompresses instructions compressed in long and short formats: code RAM (10) to store short-format and long-format instructions illustrated in FIG. 4, instruction buffer (11), auxiliary buffer (12), switch circuits S0 to S3 and T (13–17), address generation circuit (18), control circuit (19), data format indicator (20) for a high-order slot part read from the code RAM (10) into switch circuits S0 and S1 (13, 14), and data format indicator (21) for a low-order slot part read from the code RAM (11) into switch circuits S2 and S3 (15, 16).

Figure 6B:
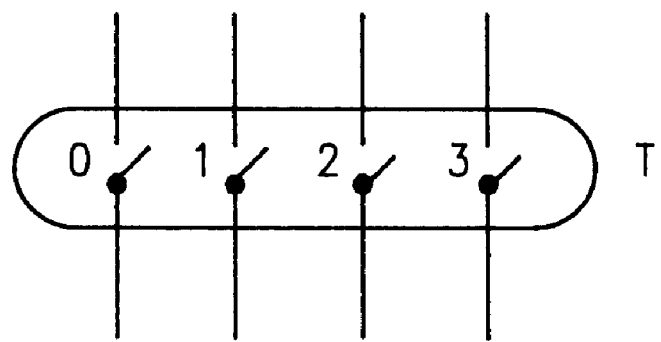
FIGS. 6A and 6B are schematic views of logical configurations of switch circuits according to an embodiment of the present invention.
Figure 6A:
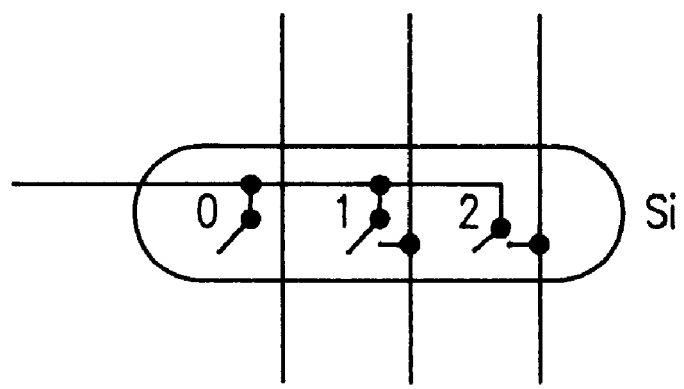

FIGS. 6A and 6B illustrate logical embodiments of switch circuits S0 to S3 and T (13–17): S0 to S3 (13–16) in FIG. 6A and T (17) in FIG. 6B. The circled sections in FIG. 5 correspond to the switch contacts (partial switches).

In FIG. 5, the switch circuits connecting the vertical lines (columns) between the instruction buffer (11) and auxiliary buffer (12) and the horizontal lines (rows) for output from the code RAM (11) are opened and closed according to prescribed rules to decompress an instruction. The decompressed instruction is written to the instruction buffer (11), then issued to stage D. The auxiliary buffer (12) is used to temporarily store part of the instruction being decompressed.

In a switch circuit group, one of several switches is opened and closed simultaneously. The switching rules of a switch circuit group are determined by the combination of long-format and short-format instructions entering the input slots. FIG. 7 lists the switching rules. FIG. 7 also illustrates which partial switches of switches S0 to S3 and T go on depending on the combination of long-format and short-format instructions. For example, if the high-order slots are of the long format (first half) and the low-order slots are of the short format (second half), partial switch 0 of switch S0, partial switch 0 of switch S1, partial switches 2 and 3 of switch T, and partial switch 2 of switch S3 go on simultaneously. It is easy to understand that the instructions from the high- and low-order slots are entered directly into the instruction buffer (11).

The control circuit (19) turns the switches on and off according to these switching rules. This circuit interprets the TAG part of each instruction and executes switching control according to this information.

In FIG. 7, a blank column ([ ]) indicates that the partial switches of the corresponding switch are all off. For example, switch T is off for slots 2 and 3, switches S2 and S3 for slots 4 and 5, switches S0, S1, and T for slots 4' and 5'. When slots 4 and 5 are read, the same slots are read again in the next cycle and switching control is executed according to the switching rules of 4' and 5'. This control is detailed later.

If a short-format instruction enters the high- or low-order slots, switches S0 and S1 or switches S2 and S3 are controlled according to switching rule F(i) except for input slot format 5.

FIG. 8 illustrates details of the switching rule F(i). The short format i has the same short format number explained at TAG[0:2] in relation to FIG. 4. The number i is equal to the information bit pattern number in FIG. 3B.

The instruction sequence before compression, the instruction sequence after compression, and the compression instruction sequence of the instruction decompression circuit illustrated in FIG. 5 are explained in detail with FIGS.

FIG. 9A is an example of a VLIW instruction sequence. In FIG. 9A, "In" is an NOP instruction and I0 to I9 are non-NOP effective instructions. The number of NOP instructions and the target conversion format (long or short) are indicated to the right of each VLIW instruction.

FIG. 9B indicates an instruction string produced by compressing the instruction sequence illustrated in FIG. 9A. [XY] at every two instructions express TAG as follows:

X:=TAG[3]; Y:=TAG[0:2]

Figure 10A:
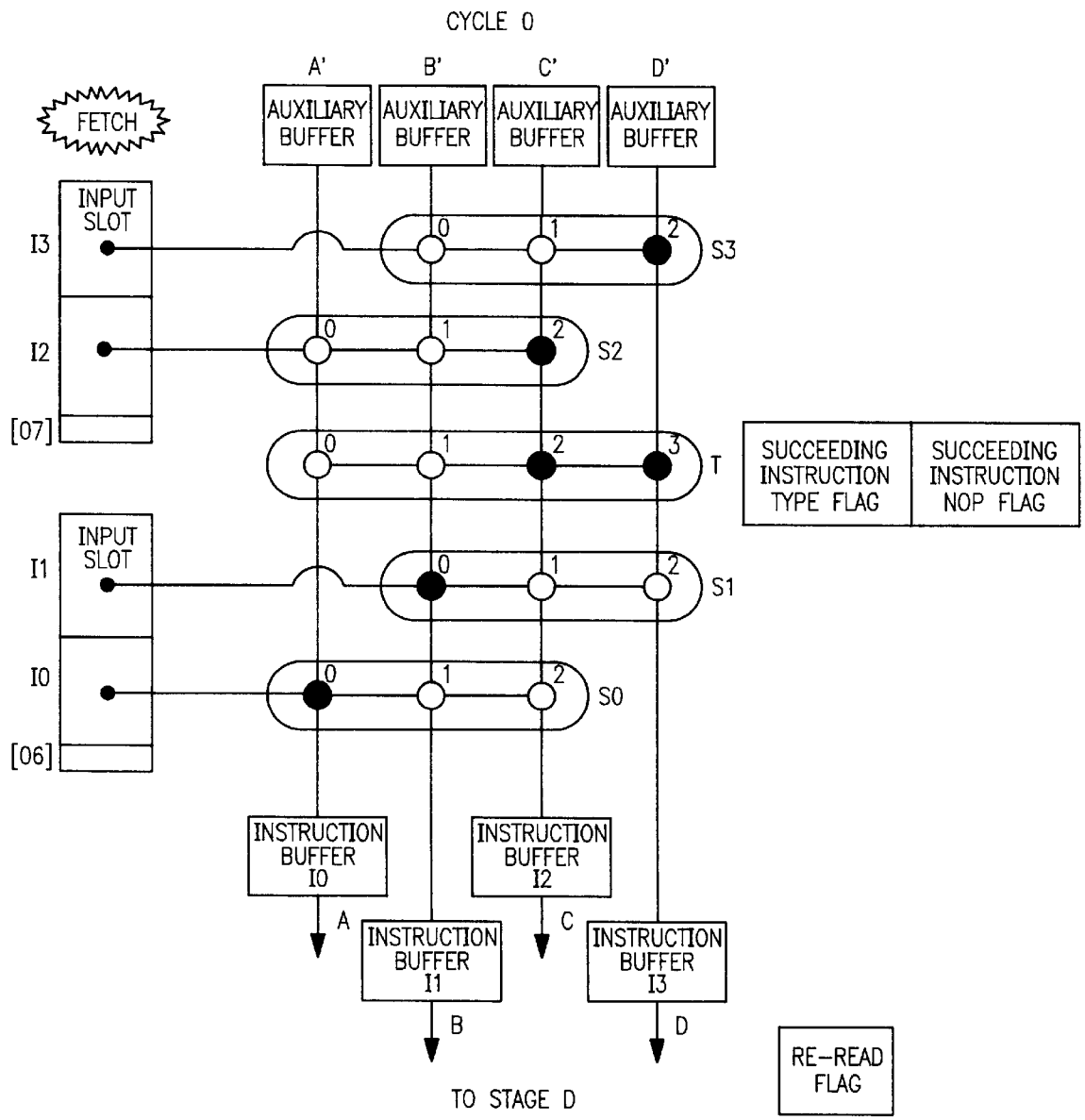
FIGS. 10A and 10B are respective schematic views of a decompression of a compressed instruction sequence according to an embodiment of the present invention.

In other words, Y indicates a short-format instruction number. For a long-format instruction, TAG in the second half of the instruction is 7 (111). FIGS. 10 to 17 show how the compressed instruction string in FIG. 9B is decompressed to its original status. The decompression processing is as follows:

(1) Cycle 0 (FIG. 10A)

The first instruction ([00] I0 I1 [07] I2 I3) is fetched. The low-order bits of TAG are 0 and 7 and indicate the first format (long format [first half], long format [second half]) illustrated in FIG. 7. The switching rules (S0, S1, [T], S2, S3) are (0, 0 [2, 3], 2, 2). This instruction turns on partial switch 0 of switch S0, partial switch 0 of switch S1, partial switches 2 and 3 of switch T, partial switch 2 of switch S2, and partial switch 2 of switch S3. In FIG. 10A, these partial switches are marked with black circles. The result is that input slot instructions I0 to I3 are entered in instruction buffers A to D as is.

Figure 10B:
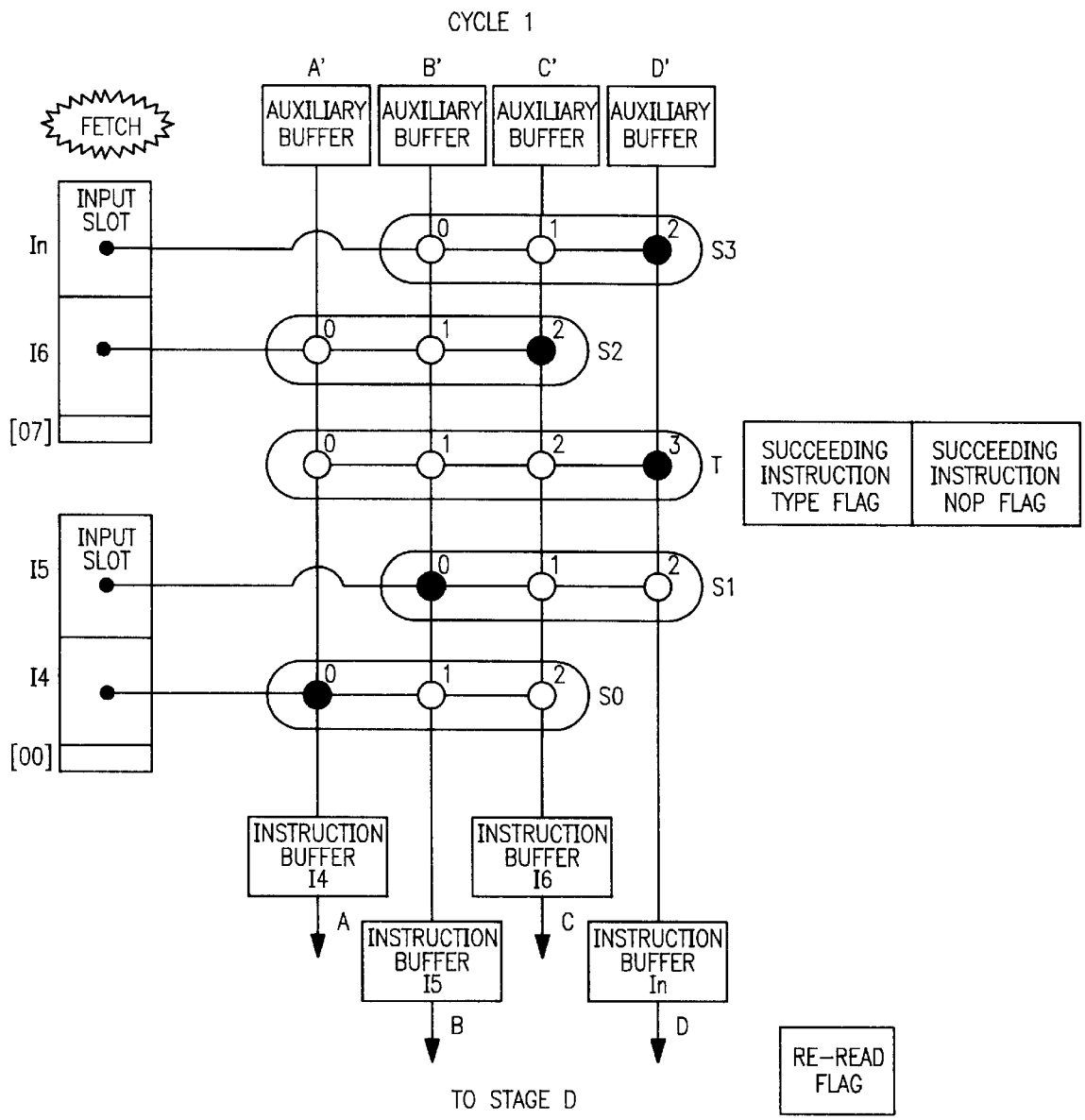

(2) Cycle 1 (FIG. 10B)

The second instruction ([00] I4 I5 [07] I6 In) is fetched. The low-order bits of TAG are 0 and 7 and indicate the same format (long format [first half], long format [second half]) as the first instruction. Therefore, the same switching rules as the first instruction apply and input slot instructions I4 to I6 are entered in instruction buffers A to D as is.

Figure 11A:
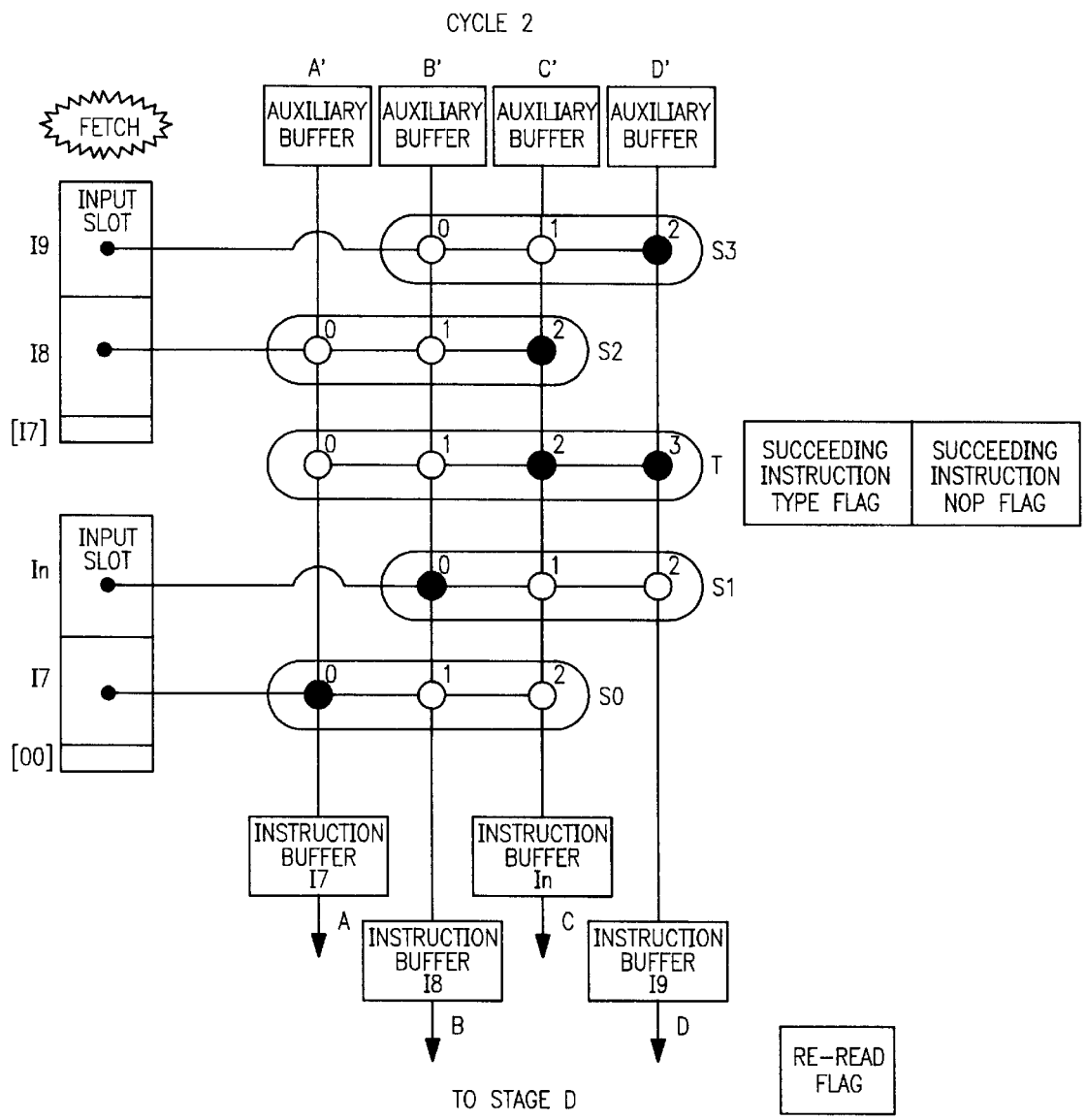
FIGS. 11A and 11B are respective schematic views of a decompression of a compressed instruction sequence according to an embodiment of the present invention.

(3) Cycle 2 (FIG. 11A)

The third instruction ([00] I7 In [17] I8 I9) is fetched. The low-order bits of TAG are 0 and 7 and indicate the same format (long format [first half], long format [second half]) as the first and second instructions. Therefore, the same switching rules as the first and second instructions apply and input slot instructions I7, In, I8, and I9 are written to instruction buffers A to D as is. The high-order bit of TAG at the low-order slot is 1, indicating that the VLIW instruction immediately following is composed of all NOP instructions and to turn on the succeeding instruction NOP flag.

Figure 11B:
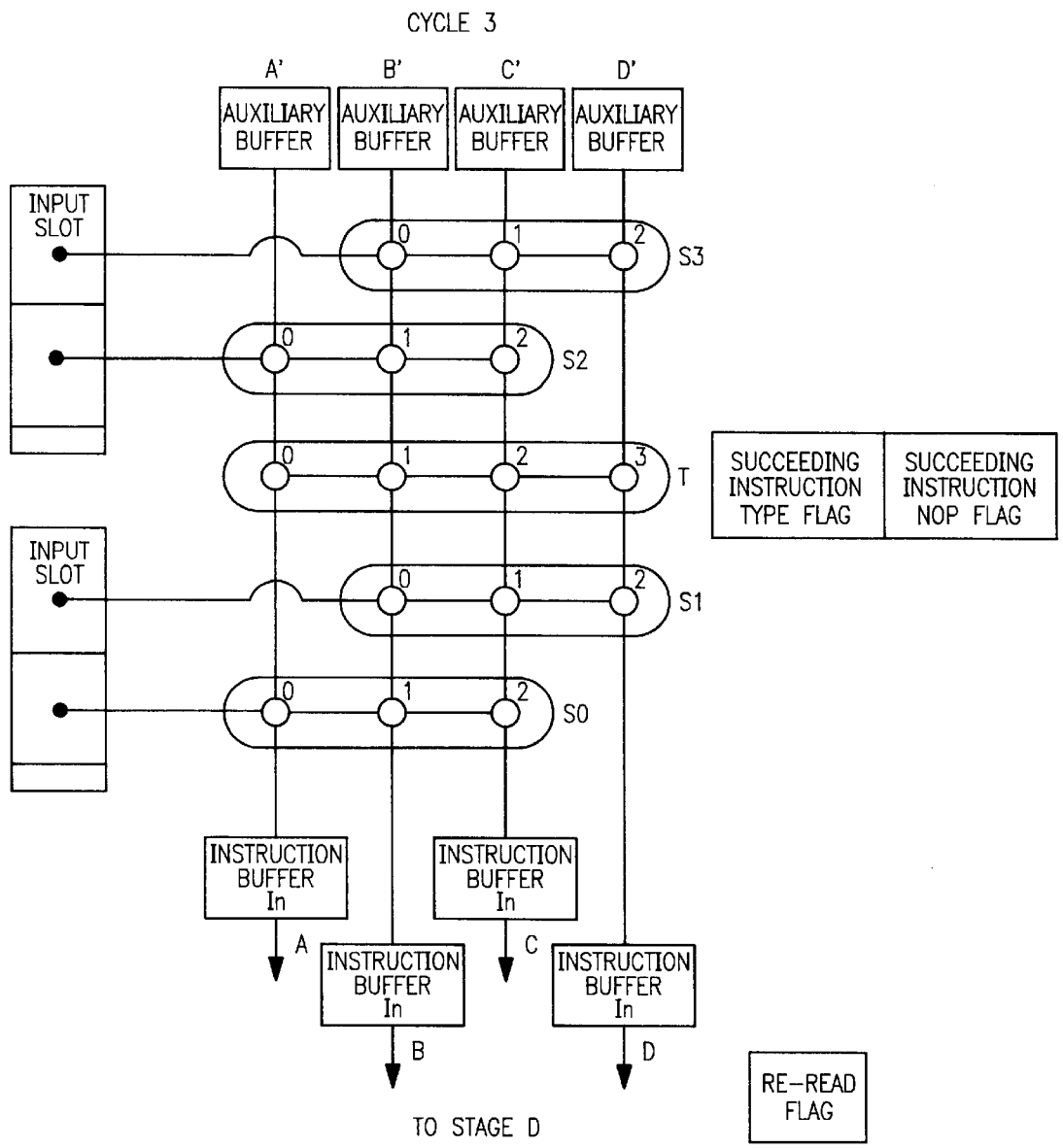

(4) Cycle 3 (FIG. 11B)

Since the succeeding instruction NOP flag was turned on in cycle 2, the next instruction is not fetched and A to D in the instruction buffer is set to the NOP instruction In. FIG. 5 does not illustrate an NOP instruction setting circuit in the instruction buffer (11).

Figure 12A:
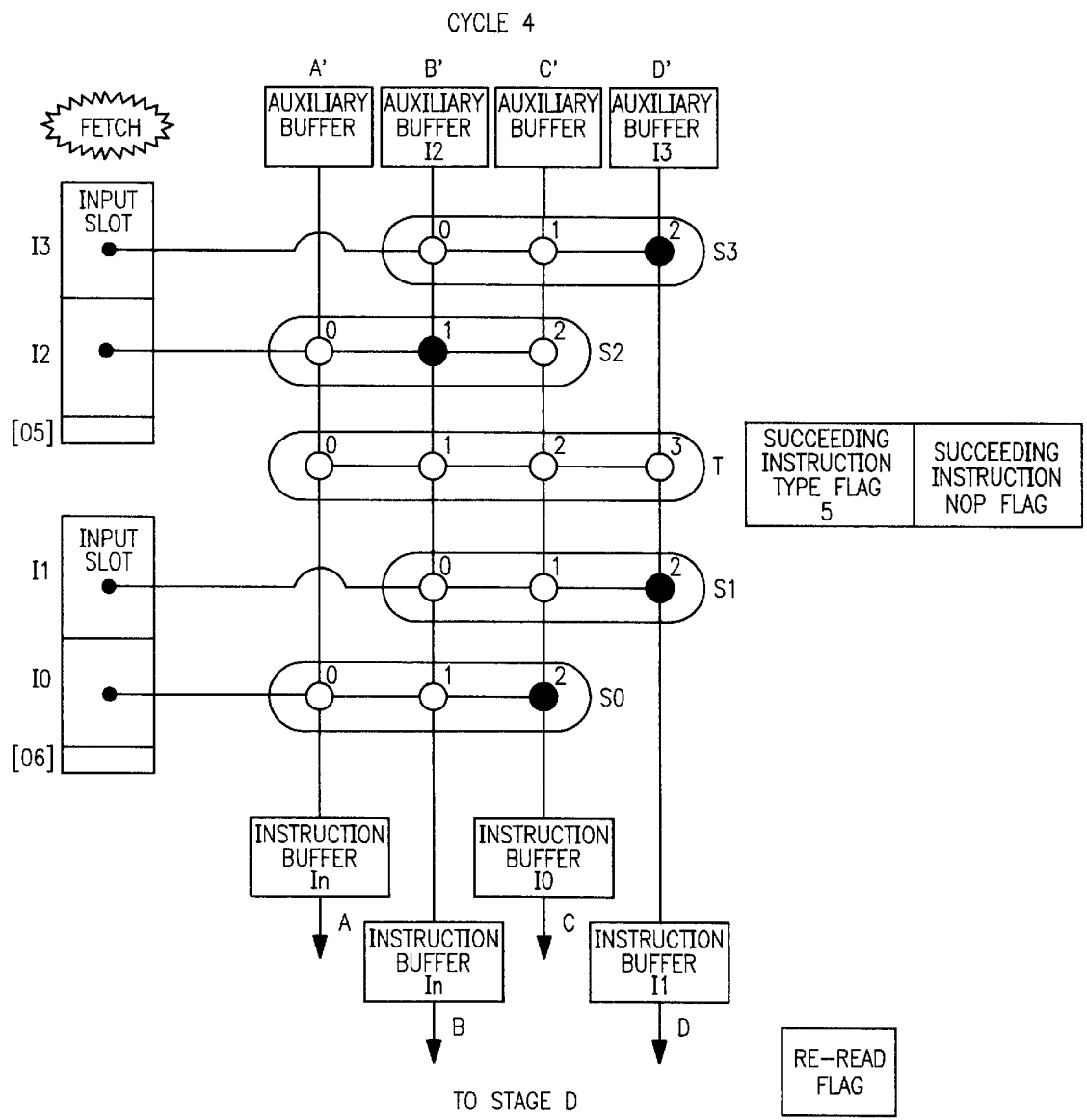
FIGS. 12A and 12B are respective schematic views of a decompression of a compressed instruction sequence according to an embodiment of the present invention.

(5) Cycle 4 (FIG. 12A)

The fourth instruction ([06] I0 I1 [05] I2 I3) is fetched. The low-order bits of TAG are 6 and 5 and indicate the second format (short format [format i], short format [format i]) illustrated in FIG. 7. The switching rules (S0, S1, [T], S2, S3) are (F(i), [ ], F(i)). From FIG. 8, F(i) for S0 and S1 are [2, 2] (i=6) and F(i) for S2 and S3 are [1, 2] (i=5). Therefore, the switching rules (S0, S1, [T], S2, S3) are (2, 2, [ ], 1, 2).

As mentioned before, the partial switches of switch T are all off when [T] is blank.

When switch T is off but the other switches from S0 to S3 are on:

(a) The remaining parts in the instruction buffer are filled with NOP instruction In.
(b) The low-order slot instructions from switches S2 and S3 are set in the auxiliary buffer.
(c) The low-order bit of TAG at the low-order slot is set on the succeeding instruction type flag.

Therefore, instructions I0 and I1 from the high-order slot are entered into instruction buffers C and D and NOP instruction In is entered into instruction buffers A and B and instructions I2 and I3 from the low-order slot are entered into instruction buffers B' and D'. The succeeding instruction type flag is set to 5 according to the low-order bit of TAG at the low-order slot.

When the low-order bit of TAG at the low-order slot is 0 or 7, indicating that the low-order slot is of the long format (first half) or (second half), the succeeding instruction type flag is not set.

Figure 12B:
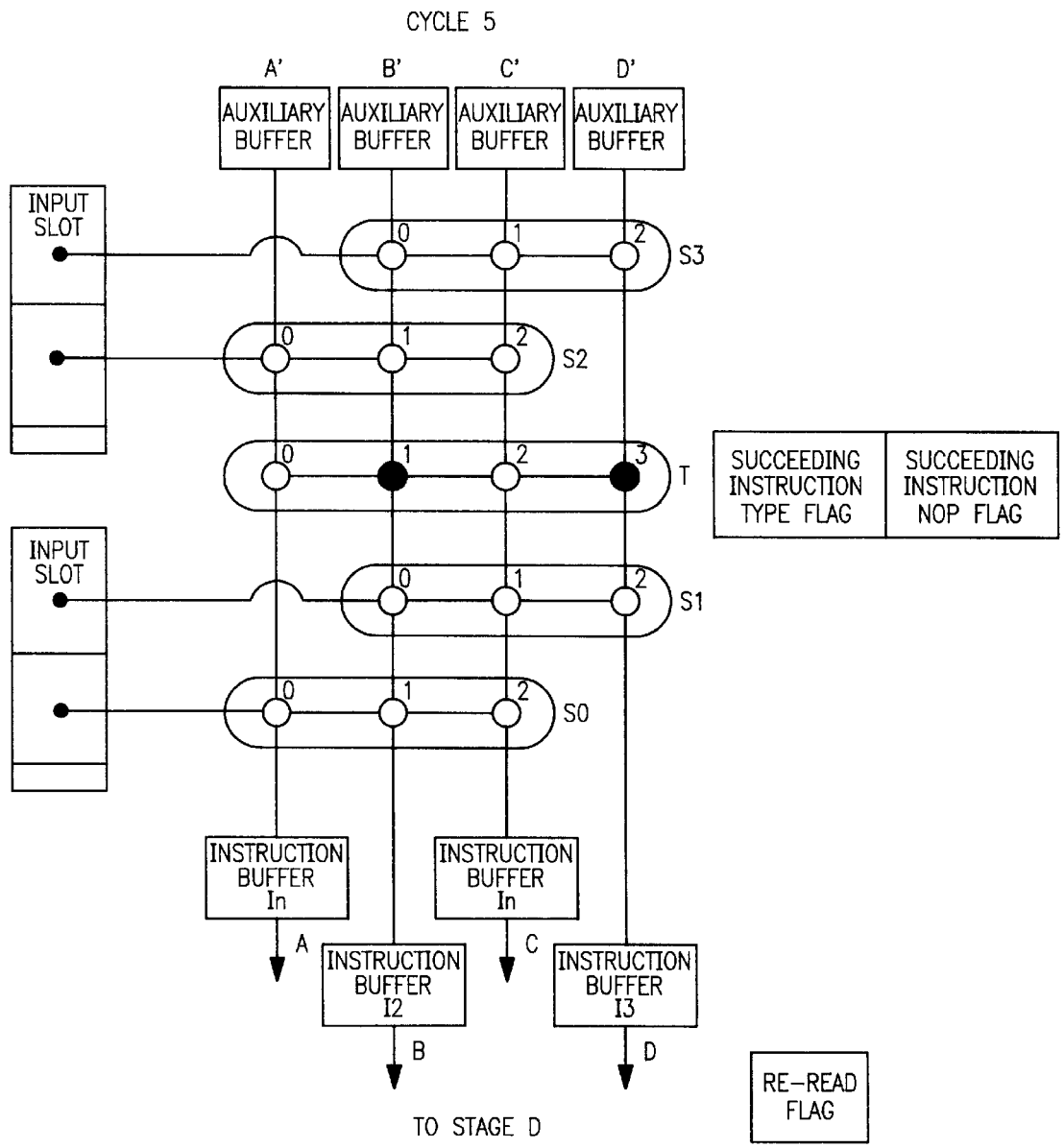

(6) Cycle 5 (FIG. 12B)

Since the succeeding instruction type flag was set to 5 in the cycle immediately before, no instruction is fetched. Partial switches 1 and 3 of switch T are turned on and the contents of auxiliary buffers B' and D' are transferred to instruction buffers B and D. Simultaneously, NOP instruction In is entered into instruction buffers A and C. The succeeding instruction type flag is then reset.

Figure 13A:
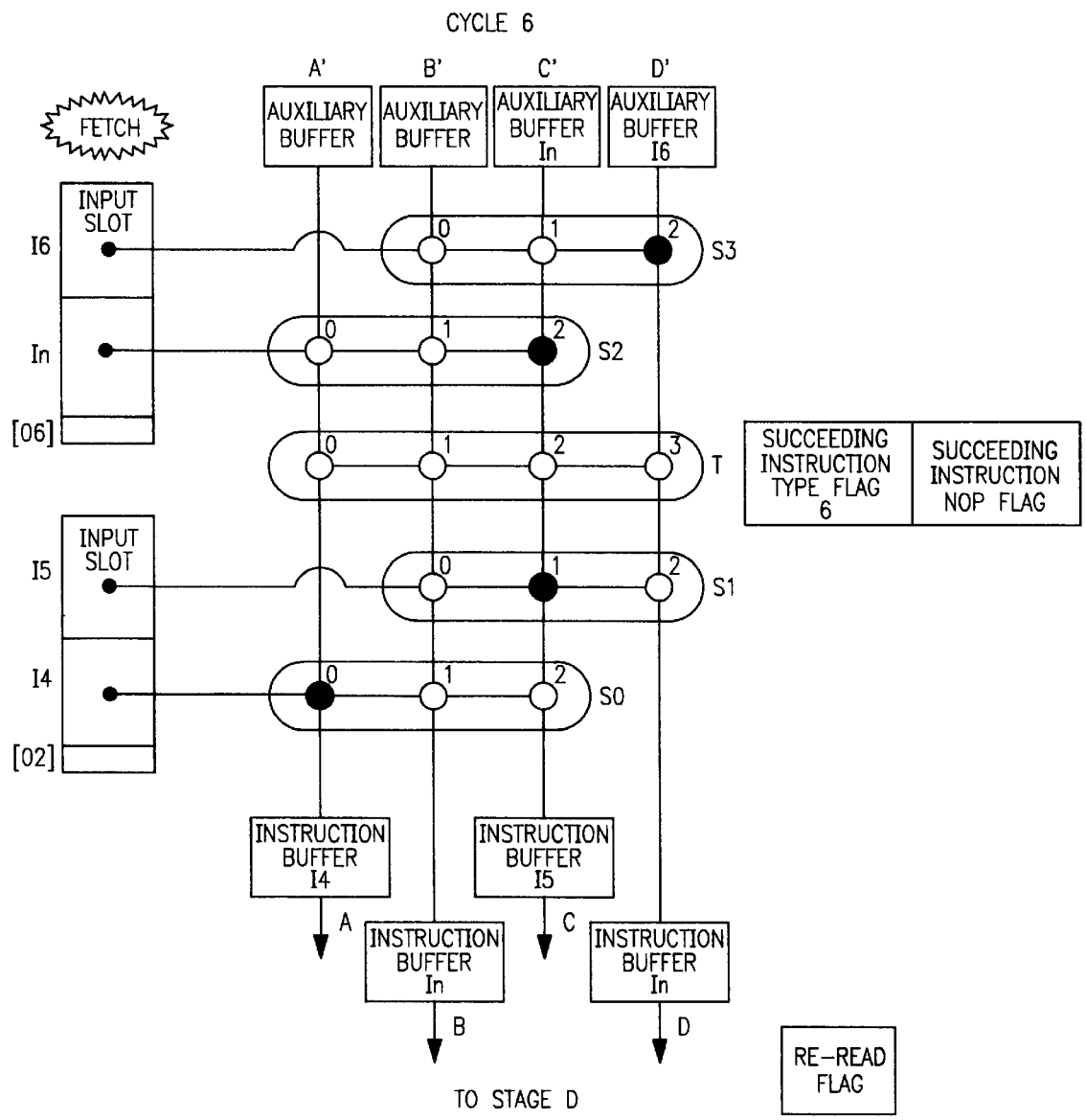
FIGS. 13A and 13B are respective schematic views of a decompression of a compressed instruction sequence according to an embodiment of the present invention.

(7) Cycle 6 (FIG. 13A)

The fifth instruction ([02] I4 I5 [06] In I6) is fetched. The low-order bits of TAG are 2 and 6 and indicate the second format (short format [format i], short format [format \]) illustrated in FIG. 7. The switching rules (S0, S1, [T], S2, S3) are (F(i), [ ], F(i)). From FIG. 8, F(i) for S0 and S1 are [0, 1] (i=2) and F(i) for S2 and S3 are [2, 2] (i=6). Therefore, the switching rules (S0, S1, [T], S2, S3) are (0, 1, [ ], 2, 2).

Since the instruction format is the same as in cycle 4 (short format [format i], short format [format i]), the same processing is executed. Instructions I4 and I5 from the high-order slot are entered into instruction buffers A and C, NOP instruction In is entered into instruction buffers B and D and instructions In and I6 from the low-order slot are entered into auxiliary buffers C' and D'. The succeeding instruction type flag is set to 6 according to the low-order bit of TAG at the low-order slot.

Figure 13B:
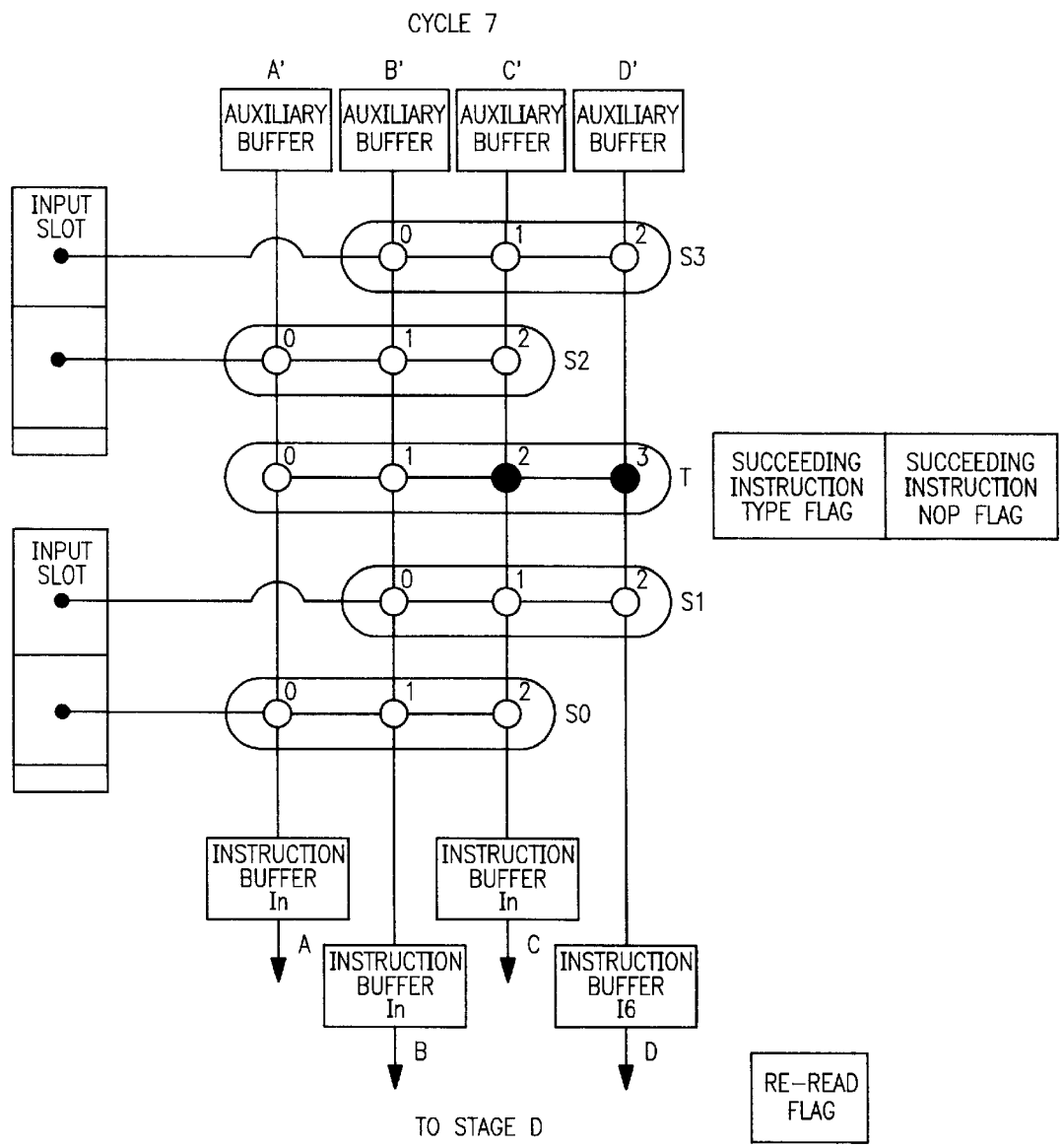

(8) Cycle 7 (FIG. 13B)

Since the succeeding instruction type flag was set to 6 in the cycle immediately before, no instruction is fetched. Partial switches 2 and 3 of switch T are turned on and the contents of auxiliary buffers C' and D' are transferred to instruction buffers C and D. Simultaneously, NOP instruction In is entered into instruction buffers A and B.

Figure 14A:
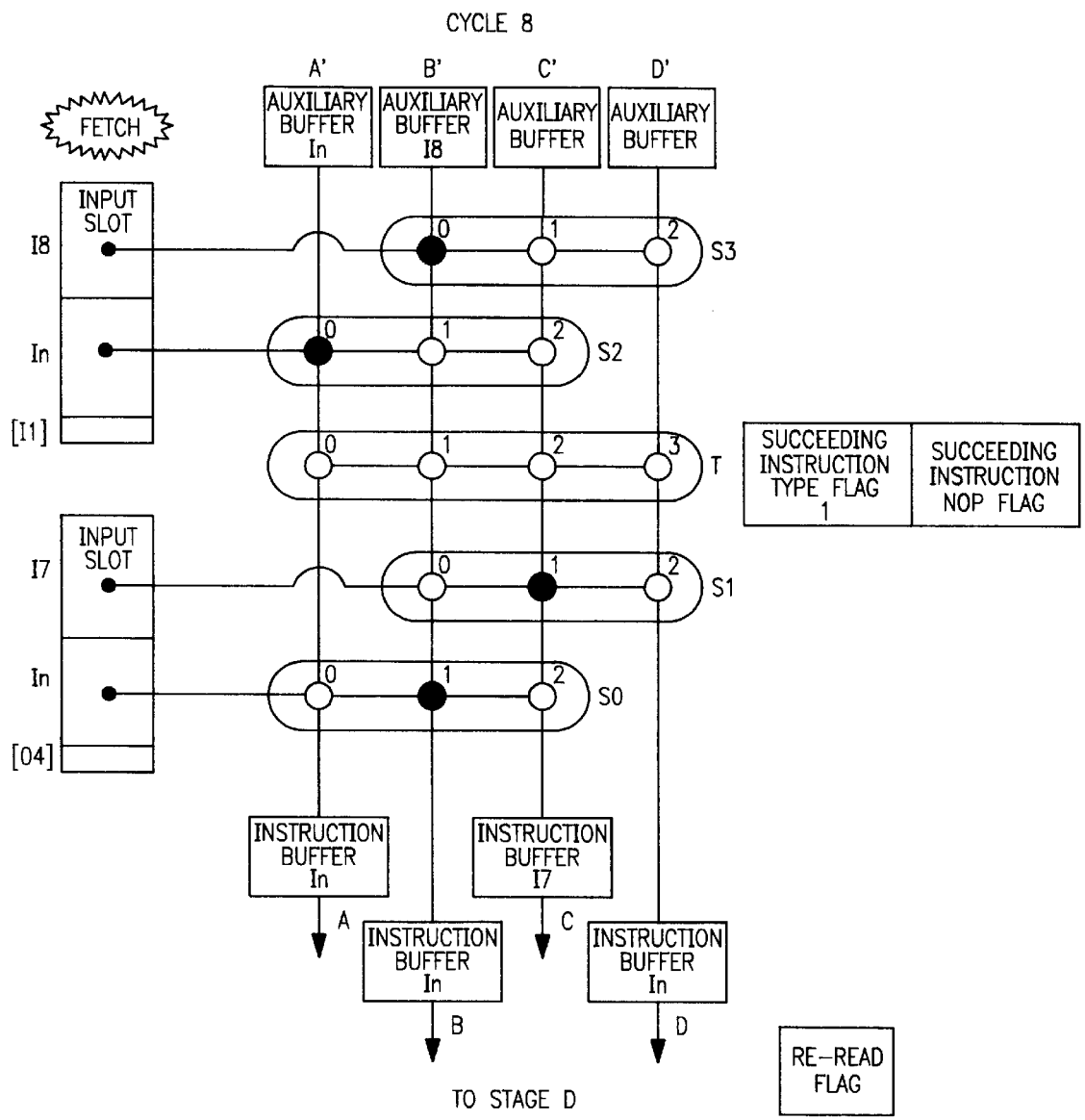
FIGS. 14A and 14B are respective schematic views of a decompression of a compressed instruction sequence according to an embodiment of the present invention.

(9) Cycle 8 (FIG. 14A)

The sixth instruction ([04] In I7 [11] In I8) is fetched. The low-order bits of TAG are 4 and 1 and indicate the second format (short format [format i], short format [format i]) illustrated in FIG. 7. The switching rules (S0, S1, [T], S2, S3) are (F(i), [ ], F(i)). From FIG. 8, F(i) for So and Si are [1, 1] (i=4) and F(i) for S2 and S3 are [0, 0] (i=1). Therefore, the switching rules (S0, S1, [T], S2, S3) are (1, 1, [ ], 0, 0).

Since the instruction format is the same as in cycles 4 and 6 (short format [format i], short format [format i]), the same processing is executed. Instructions In and I7 from the high-order slot are entered into instruction buffers B and C, NOP instruction In is entered into instruction buffers A and D, and instructions In and I8 from the low-order slot are entered into auxiliary buffers A' and B'. The succeeding instruction type flag is set to 1 according to the low-order bit of TAG at the low-order slot.

The high-order bit of TAG at the low-order slot is 1, indicating that the VLIW instruction immediately after is all composed of NOP instructions and to turn the succeeding instruction NOP flag is turned on.

Figure 14B:
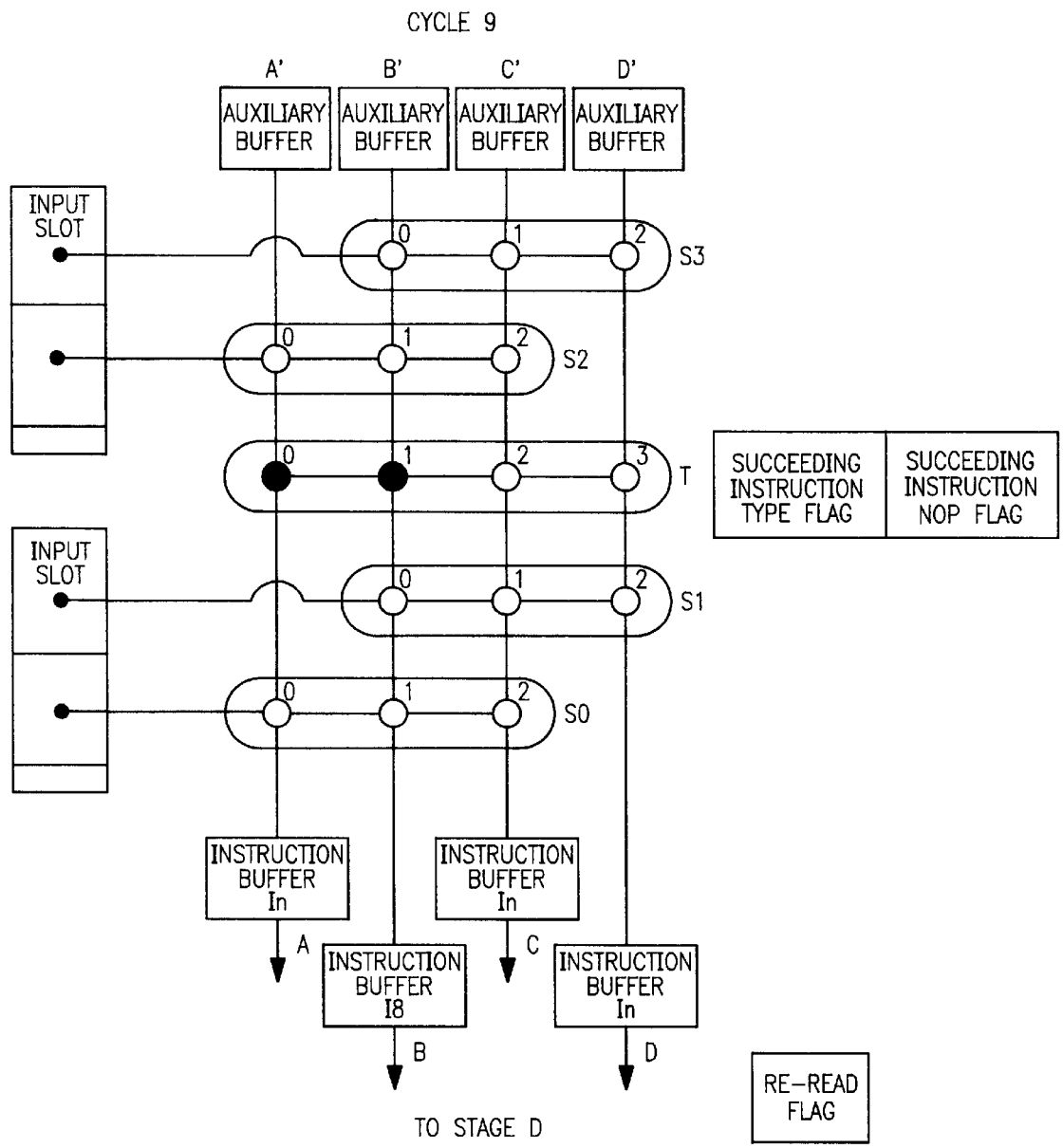

(10) Cycle 9 (FIG. 14B)

The succeeding instruction type flag was set to 1 and the succeeding instruction NOP flag was turned on in the cycle immediately before.

According to the value of the succeeding instruction type flag, the contents of the auxiliary buffers are transferred to the instruction buffers with priority. Since the succeeding instruction type flag was set to 1 in the cycle immediately before, no instruction is fetched. Partial switches 1 and 2 of switch T are turned on, and the contents of auxiliary buffers A' and B' are transferred to instruction buffers A and B. Simultaneously, NOP instruction In is entered into instruction buffers C and D. The succeeding instruction type flag is then reset.

Figure 15A:
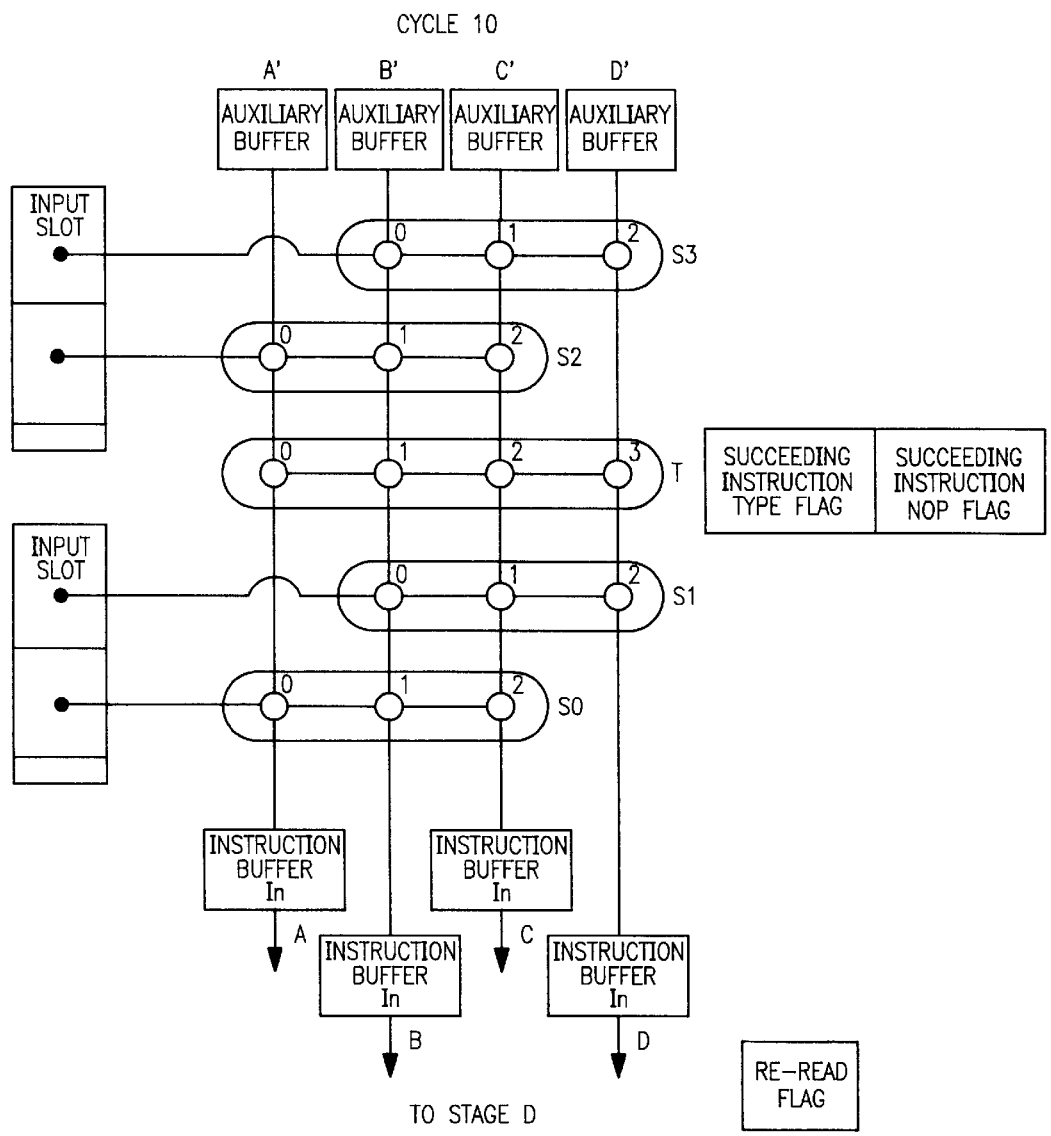
FIGS. 15A and 15B are respective schematic views of a decompression of a compressed instruction sequence according to an embodiment of the present invention.

(11) Cycle 10 (FIG. 15A)

Since the succeeding instruction NOP flag was turned on, the next instruction is not fetched and NOP instruction In is set at A to D in the instruction buffer. Then the succeeding instruction NOP flag is reset.

Figure 15B:
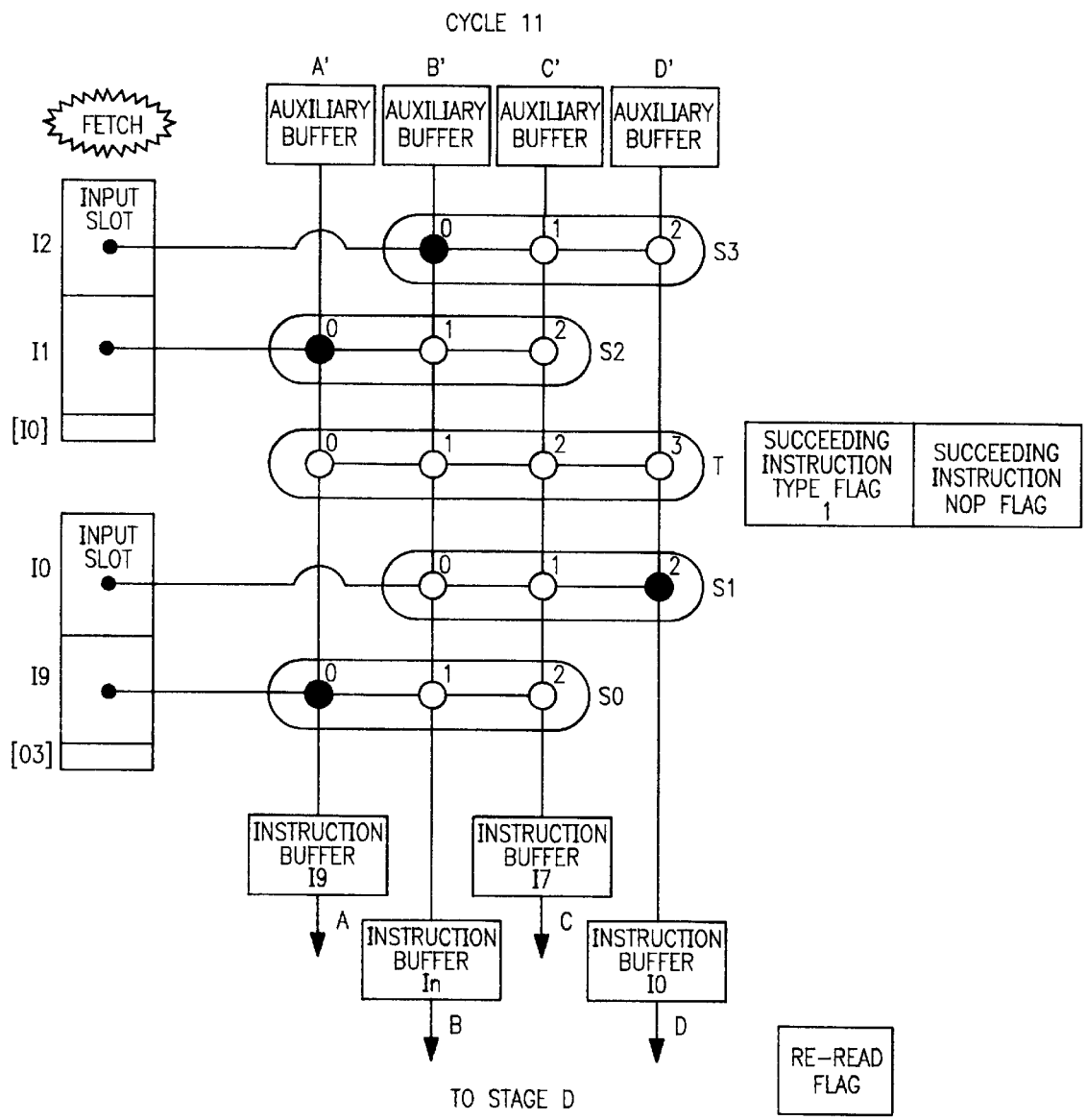

(12) Cycle 11 (FIG. 15B)

The seventh instruction ([03] I9 I0 [00] I1 I2) is fetched. The low-order bits of TAG are 3 and 0 and indicate the third format (short format [format i], long format [first half]) illustrated in FIG. 7. The switching rules (S0, S1, [T], S2, S3) are (F(i), [ ], 0, 0). From FIG. 8, F(i) for S0 and S1 are [0, 2] (i=3). Therefore, the switching rules (S0, S1, [T], S2, S3) are (0, 2, [ ], 0, 0).

According to these switching instructions, instructions I9 and I0 from the high-order slot are entered into instruction buffers A and D, NOP instruction In is entered into instruction buffers B and C, and instructions I1 and I2 from the low-order slot are entered into auxiliary buffers A' and B'.

Figure 16A:
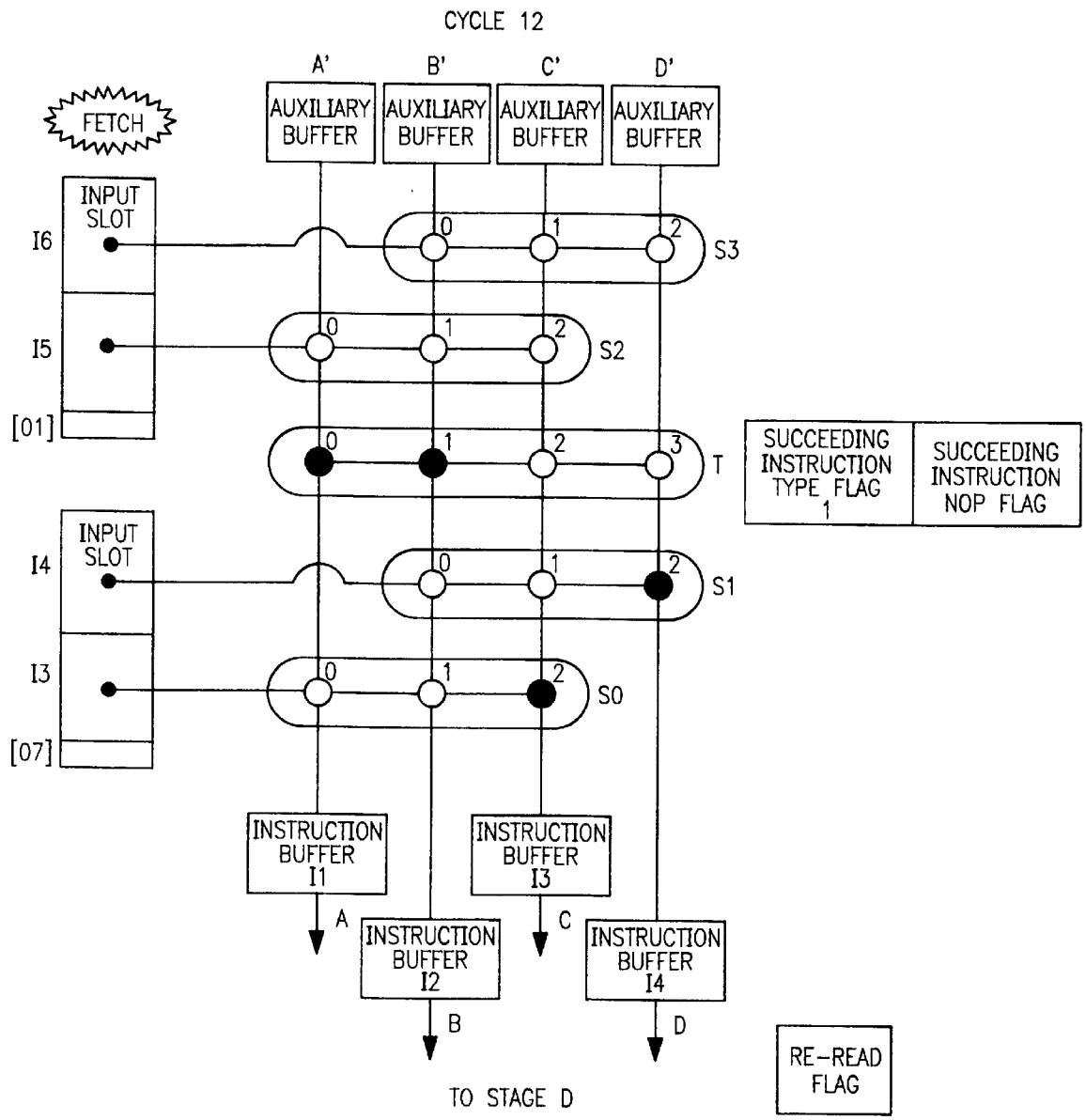
FIGS. 16A and 16B are respective schematic views of a decompression of a compressed instruction sequence according to an embodiment of the present invention.

(13) Cycle 12 (FIG. 16A)

The eighth instruction ([07] I3 I4 [01] I5 I6) is fetched. The low-order bits of TAG are 7 and 1 and indicate the fifth format (long format [first half], short format [format i]) illustrated in FIG. 7. The switching rules (S0, S1, [T], S2, S3) are (2, 2, [0, 1], [ ]). According to these switching instructions, instructions I1 and I2 are transferred from auxiliary buffers A' and B' to instruction buffers A and B, and instructions I3 and I4 from the low-order slot are entered into instruction buffers C and D.

As mentioned before, if slot formats 4 and 5 are read, the same slots are read again at the next cycle and switching control is executed according to the switching rules of 4' and 5'. Therefore, the re-read flag is set once slot formats 4 and 5 are set. In cycle 12, the re-read flag is set.

Figure 16B:
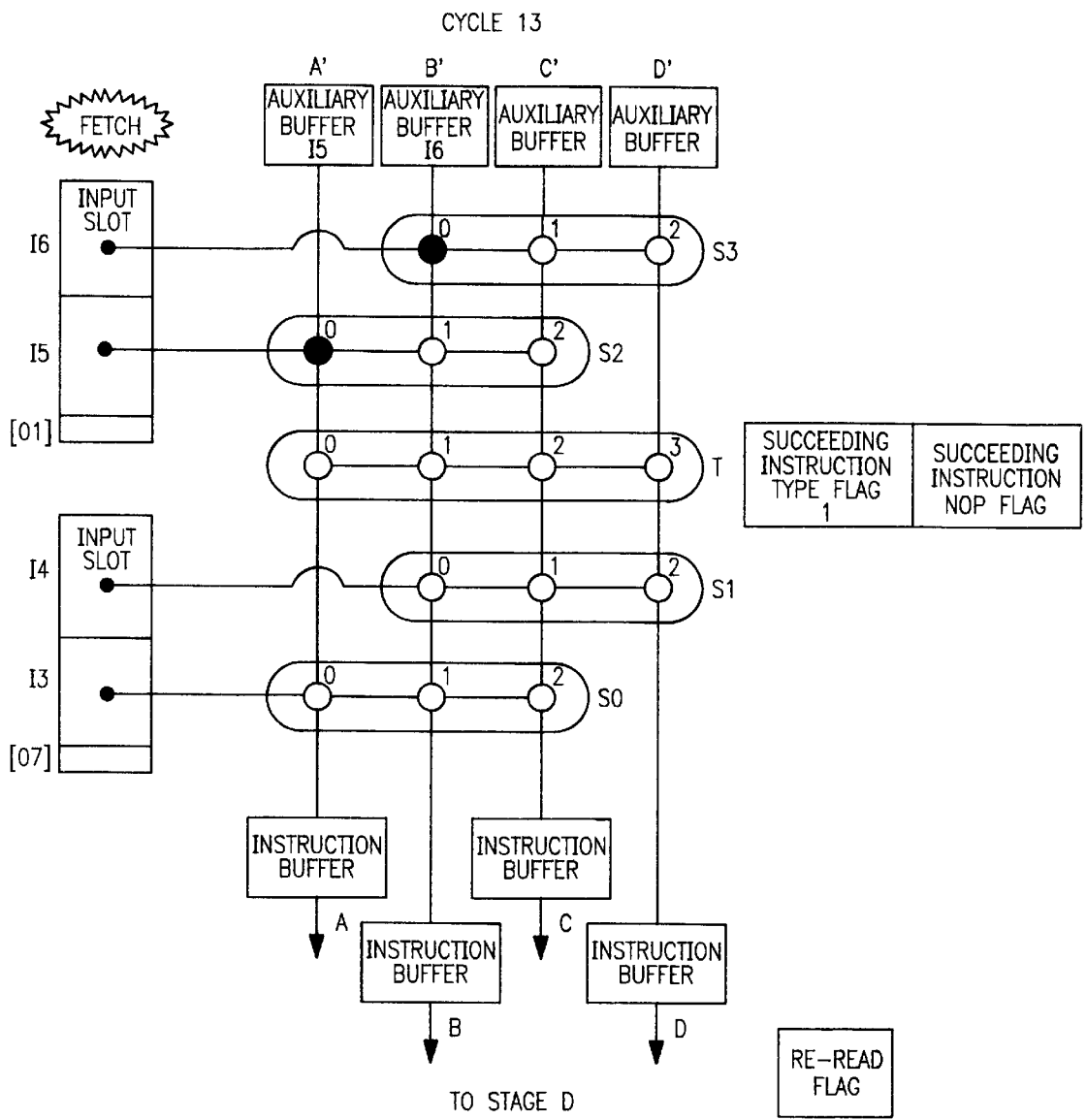

(14) Cycle 13 (FIG. 16B)

Since the re-read flag was set, the eighth instruction ([07] I3 I4 [01] I5 I6) is fetched again. To this re-fetching, the switching rule ([ ], [ ], F(i)) of 5' applies. From FIG. 8, F(i) for S2 and S3 is [0, 0] (i=1). Therefore, the switching rules (S0, S1, [T], S2, S3) are ([ ], [ ], 0, 0). The succeeding instruction type flag is set to 1 according to the low-order bit of TAG at the low-order slot.

Instructions I5 and I6 from the low-order slot are entered into auxiliary buffers A' and B'. The re-read flag is then reset.

If the switching rules are 4' and 5', only the instructions from the low-order slot are entered into the auxiliary buffers but not into the instruction buffers.

Therefore, the instruction supply to stage D is skipped in this cycle.

Figure 17:
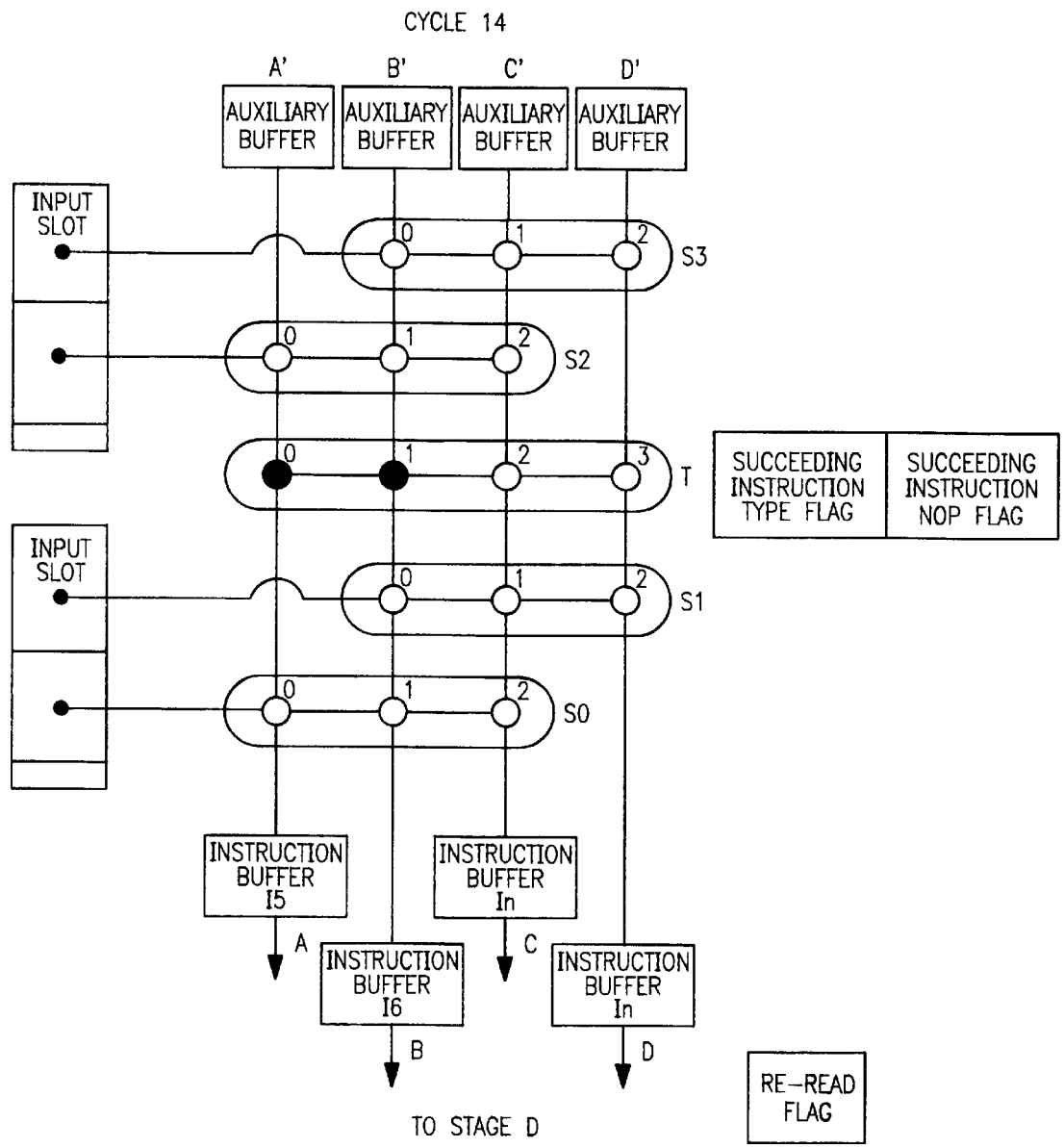
FIG. 17 is a schematic view of a decompression of a compressed instruction sequence according to an embodiment of the present invention.

(15) Cycle 14 (FIG. 17)

Since the succeeding instruction type flag was set to 1 in the cycle immediately before, no instruction is fetched. Partial switches 0 and 1 of switch T are turned on and the contents of auxiliary buffers A' and B' are transferred to instruction buffers A and B. Simultaneously, NOP instruction In is entered in instruction buffers C and D. The succeeding instruction type flag is then reset.

The above processing restores the original instruction sequence, illustrated in FIG. 9A, from the compressed one, illustrated in FIG. 9B.

Figure 18:
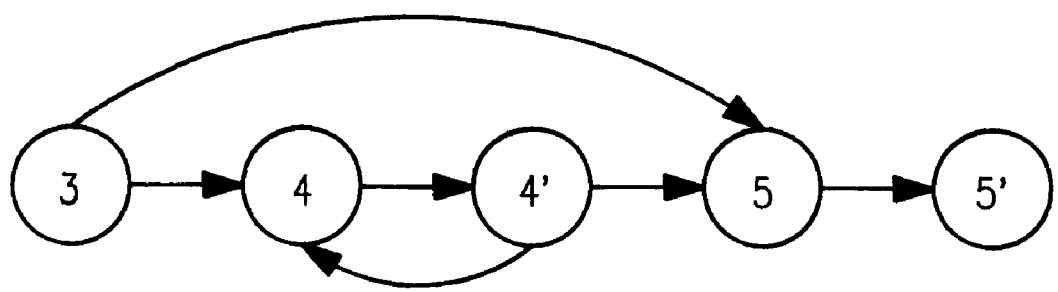
FIG. 18 is a flow chart of an input slot read sequence for input slots containing long format (first half) instructions in a low-order and for slot input slots containing long format (second half) instructions in a low-order slot.

Since this example has only one pair of auxiliary buffers, the buffers are read after an instruction string whose low-order slot is of the long format (first half). For an instruction string whose high-order slot is of the long format (second half), the buffers are read twice consecutively. FIG. 18 illustrates the input slot read sequence for input slots containing the long format (first half) in the low-order slot or ones containing the long format (second half). The numbers in FIG. 18 correspond to those in FIG. 7.

Figure 19:
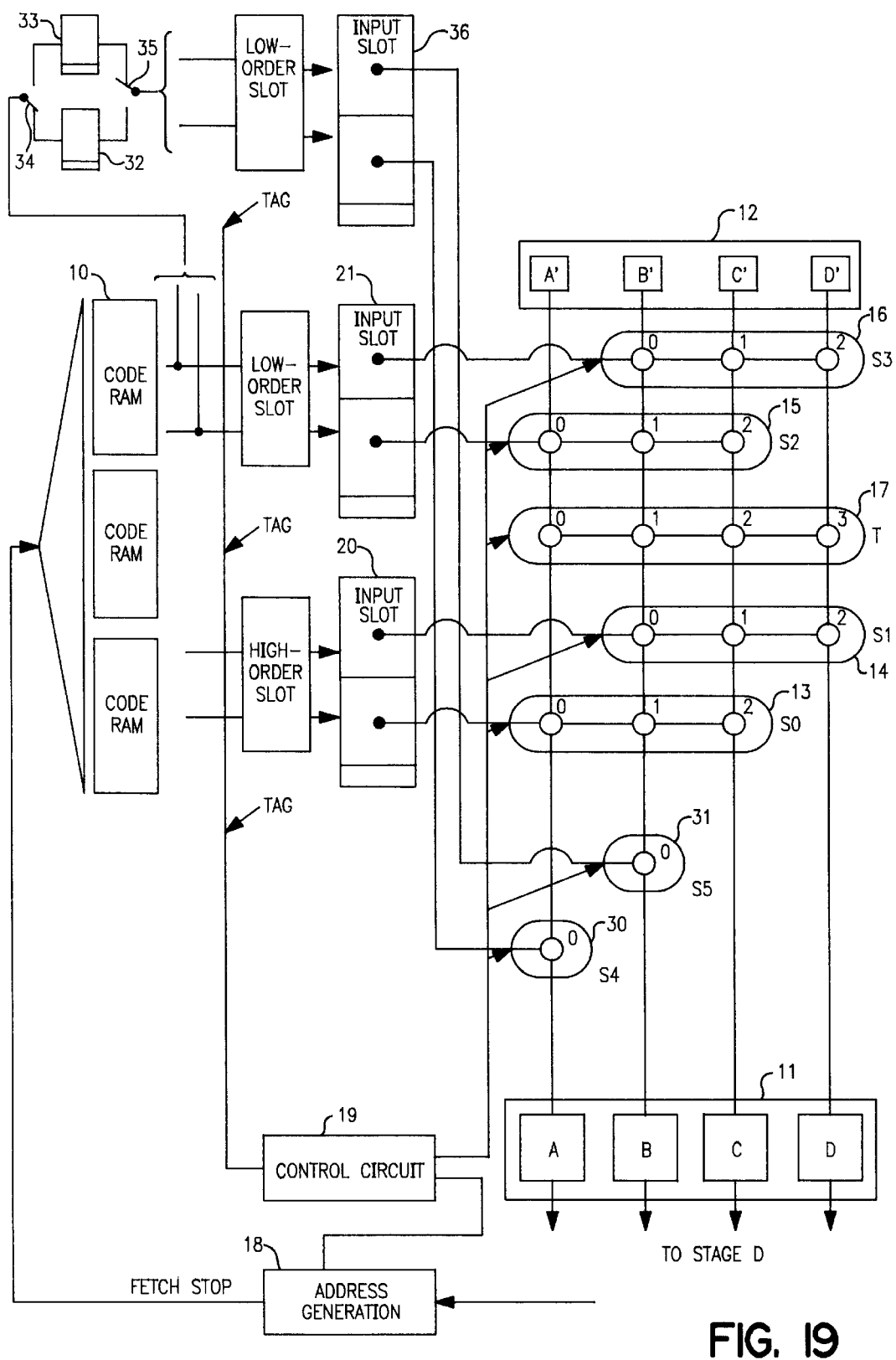
FIG. 19 is a schematic view of a circuit configuration to decompress instructions compressed in long and short formats according to an embodiment of the present invention.

FIG. 19 is another example of a circuit embodiment that continuously decompresses instructions compressed in long and short formats without skipping the supply of instruction strings to stage D for decompression (restoration), irrespective of the combination of compressed instruction strings.

The embodiment in FIG. 19 includes: code RAM (10) to store short-format and long-format instructions, illustrated in FIG. 4, instruction buffer (11), auxiliary buffer (12), switch circuits S0 to S3 and T (13–17), address generation circuit (18), control circuit (19), data format indicator (20) for a high-order slot part read from the code RAM (11) into switch circuits S0 and S1 (13, 14), data format indicator (21) for a low-order slot part read from the code RAM (11) into switch circuits S2 and S3(15, 16), switch circuits S4 and S5 (30, 31), alternate buffers (32, 33), switches (34, 35), and data format indicator (36) for a low-order slot part read from the alternate buffers (32, 33) into switch circuits S4 and S5 (30, 31)

In addition to the circuit embodiment illustrated in FIG. 5, the one illustrated in FIG. 19 has switch circuits S4 and S5 (30, 31), alternate buffers (32, 33), and switches (34, 35).

The circuit including the alternate buffers (32, 33), and switches (34, 35) supplies low-order slot instructions read from the code RAM (11) to switch circuits S4 and S5 (30, 31) one cycle later in the succeeding cycle. When one switch (34) is connected to a buffer (32) and writes a low-order slot instruction from RAM (11) into the buffer (32), the other switch (35) is connected to the other buffer (33) to supply output from the buffer to switch circuits S4 and S5 (30, 31). In contrast, when one switch (34) is connected to a buffer (33) and writes a low-order slot instruction from RAM (11) into the buffer (33), the other switch (35) is connected to the other buffer (32) to supply output from the buffer (32) to switch circuits S4 and S5 (30, 31). The switches (34, 35) are alternated every cycle.

The embodiment of switch circuits S4 and S5 (30, 31) is equal to that illustrated in FIG. 6A where only partial switch 0 is available.

FIG. 20 lists the switching rules in the circuit embodiment illustrated in FIG. 19. The switching rules are almost the same as those illustrated in FIG. 7 but differ for the circuit embodiment illustrated in FIG. 5. If the high-order slot is of the long format (first half) and the low-order slot is of the long format(second half) or if both the high- and low-order slots are of the short format (format i), switching rules are basically the same. Otherwise, the switching rules are different.

The circuit embodiment illustrated in FIG. 19 decompresses the compressed instruction string illustrated in FIG. 9B as set forth below.

The first to sixth instructions in FIG. 9B are read and decompressed (restored) as illustrated in FIG. 5. The processing from cycle 0 in FIG. 10A to cycle 10 in FIG. 15A is executed. During processing, the circuit continues to read the low-order slot of the previous cycle from the alternate buffers (32, 33). However, because switches S4 and S5 are off, the processing does not affect data storage in the instruction buffer (11).

Now, the seventh instruction illustrated in FIG. 9B is read for processing.

Figure 21:
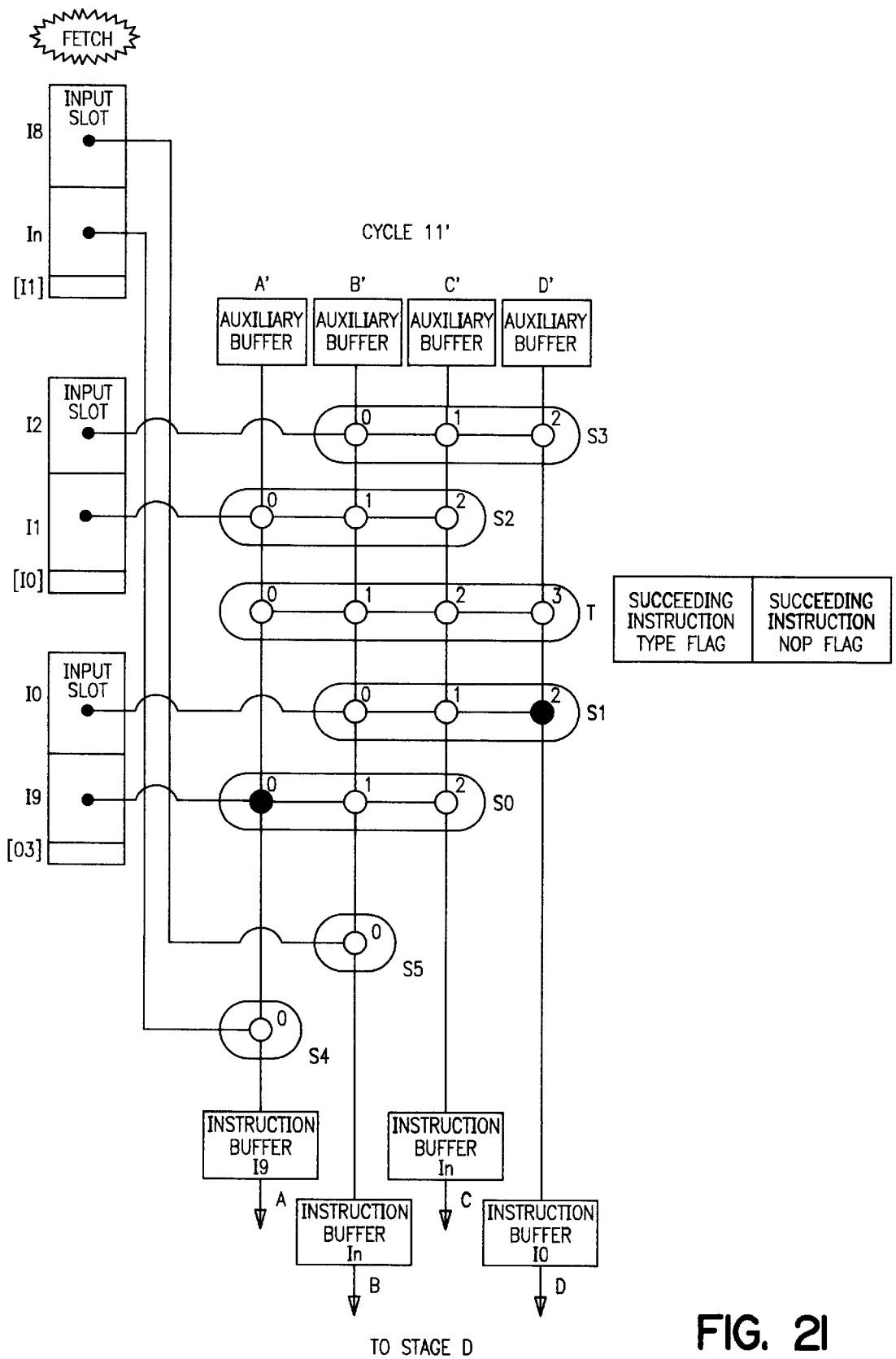
FIG. 21 is a schematic view of a decompression of a compressed instruction sequenced according to an embodiment of the present invention.

(12') Cycle 11' (FIG. 21)

The seventh instruction ([3] I9 I0 [00] I1 I2) is fetched.

The low-order bits of TAG are 3 and 0 and indicate format 13 (short format [format i], long format [first half]) illustrated in FIG. 20. The switching rules (S0, S1, [T], S2, S3) are (F(i), [ ], [ ]). From FIG. 8, F(i) for S0 and S1 are [0, 2] (i=3). Therefore, the switching rules (S0, S1, [T], S2, S3) are (0, 2, [ ], [ ]). [S4, S5] is [ ] to indicate that they are off.

According to these switching conditions, instructions I9 and I0 from the high-order slot are entered into instruction buffers A and D and NOP instruction In is entered into instruction buffers B and C. In cycle 11 of the embodiment in FIG. 5, [S2, S3] is [0, 0] and instructions I1 and I2 from the low-order slot are entered into auxiliary buffers A' and B'. Under the embodiment in FIG. 21, [S2, S3] is [ ] and no instructions are entered into the auxiliary buffers. This is the most significant characteristic of the embodiment illustrated in FIG. 21.

Figure 22:
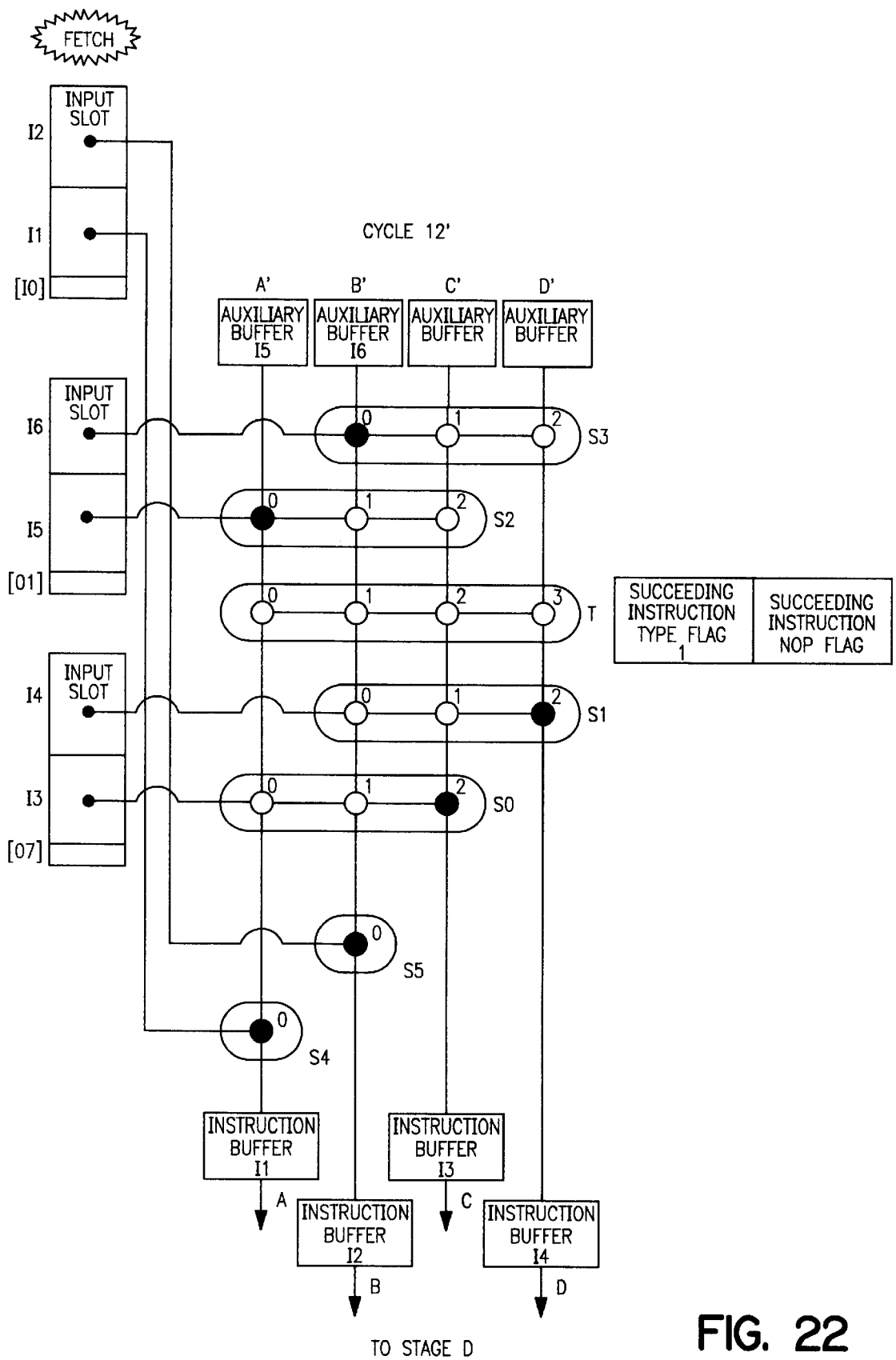
FIG. 22 is a schematic view of a decompression of a compressed instruction sequence according to an embodiment of the present invention.

(13') Cycle 12' (FIG. 22)

The eighth instruction ([07] I3 I4 [01] I5 I6) is fetched. The low-order bits of TAG are 7 and 1 and indicate format 11 (long format [first half], short format [format i]) illustrated in FIG. 20. The switching rules (S0, S1, [T], S2, S3) are (2, 2, [ ], F(i)). [S4, S5] is [0, 0] to indicate that they are on.

According to these switching conditions, instructions I1 and I2 from the low-order slot of the previous cycle stored in the alternate buffers (32, 33) are entered into instruction 10 buffers A and B, and instructions I3 and I4 from the high-order slot of the current cycle are entered into instruction buffers C and D.

Instructions I5 and I6 from the low-order slot of the current cycle are then entered into auxiliary buffers A' and B'. According to the low-order bit of TAG at the low-order slot of the current cycle, the succeeding instruction type flag is set to 1.

The embodiment illustrated in FIG. 19 does not have the re-read flag illustrated in FIG. 5 because no slots are read again.

Figure 23:
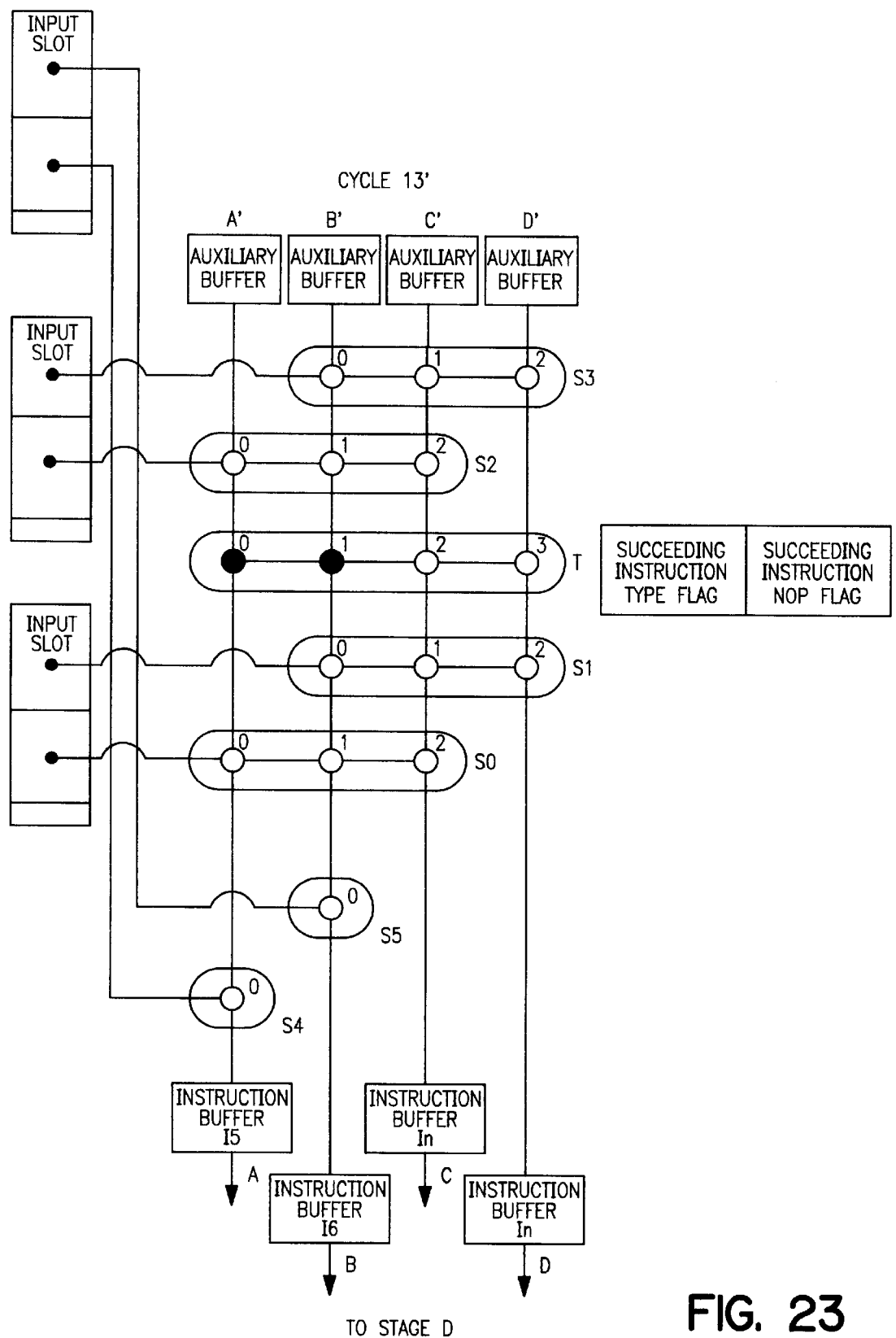
FIG. 23 is a schematic view of a decompression of a compressed instruction sequence according to an embodiment of the present invention.

(14') Cycle 13' (FIG. 23)

Since the succeeding instruction type flag was set to 1 in the cycle immediately preceding, no instruction is fetched. Partial switches 0 and 1 of switch T are turned on and the contents of auxiliary buffers A' and B' are transferred to instruction buffers A and B. Simultaneously, NOP instruction In is entered in instruction buffers C and D. The succeeding instruction type flag is then reset.

The above processing restores the original instruction sequence, illustrated in FIG. 9A, from the compressed one, illustrated in FIG. 9B. As stated before, the embodiment illustrated in FIG. 19 has alternate buffers (22, 23) as well as an auxiliary buffer (12). An instruction whose low-order slot is of the long format (first half) is received from the alternate buffers (22, 23) in the succeeding cycle to allow continuous instruction supply to stage D.

Figures 25A, 25B:
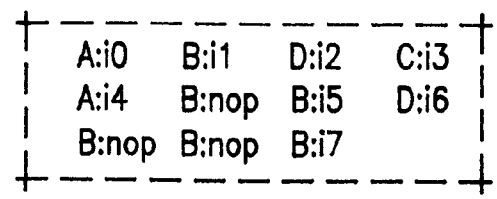
FIGS. 25A and 25B are respective schematic views of tables of compressed instruction strings according to an embodiment of the present invention.

FIGS. 25A and 25B illustrate another embodiment of the present invention for a circuit embodiment that compresses instruction strings. The instruction string in FIG. 25A is before compression; the one in FIG. 25B is after. This system gives a flag to each instruction code as an information bit to indicate the destination slot of the instruction code.

In FIG. 25A, i0 to i7 are effective instructions (not NOP). As FIG. 25B illustrates, this instruction string is stored in the instruction memory with a flag indicating a destination slot.

In FIG. 25, flag A is attached to instruction codes i0 and i4 to enter in slot A, flag B is attached to instruction codes i1, i5, and i7 to enter in slot B, flag C is attached to instruction code i3 to enter in slot C, and flag D is attached to instruction codes i2 and i6 to enter in slot D.

If there are as many or more continuous NOP instructions than slots, some NOP instructions should not be deleted. To be more specific, the maximum number of NOP instructions to be deleted between an effective instruction and an NOP instruction to be retained should be (number of slots—1). If a VLIW instruction includes four slots as illustrated in FIG. 25, at most only three NOP instructions can be deleted.

From the relationship between the preceding instruction code and the succeeding one in the instruction memory, the deletion of as many or more continuous NOP instructions than slots makes it impossible to determine the following items:

(1) whether the succeeding instruction code belonged to the same VLIW instruction as the preceding instruction or to the next VLIW instruction in the instruction string before compression, (2) whether the succeeding instruction code belonged to the next VLIW instruction after the one where the preceding instruction belonged or one VLIW instruction later in the instruction string before compression.

In other words, the position of the succeeding instruction cannot be confirmed.

In the example of FIG. 25, an appropriate number of NOP instructions are left at slot B so as to not delete more than three NOP instructions. To be more specific, in cycles 3, 5, and 6, NOP instructions are stored in the instruction memory without being deleted.

For the NOP instructions to be retained, the position is fixed at slot B in the example of FIG. 25 but may be changed to another slot. In addition, NOP instructions may be retained in an arbitrary slot if the above conditions are satisfied.

If information is added to an instruction string before compression to indicate explicitly that the succeeding string is totally composed of NOP instructions, as many or more NOP instructions than slots can be omitted.

Figure 26:
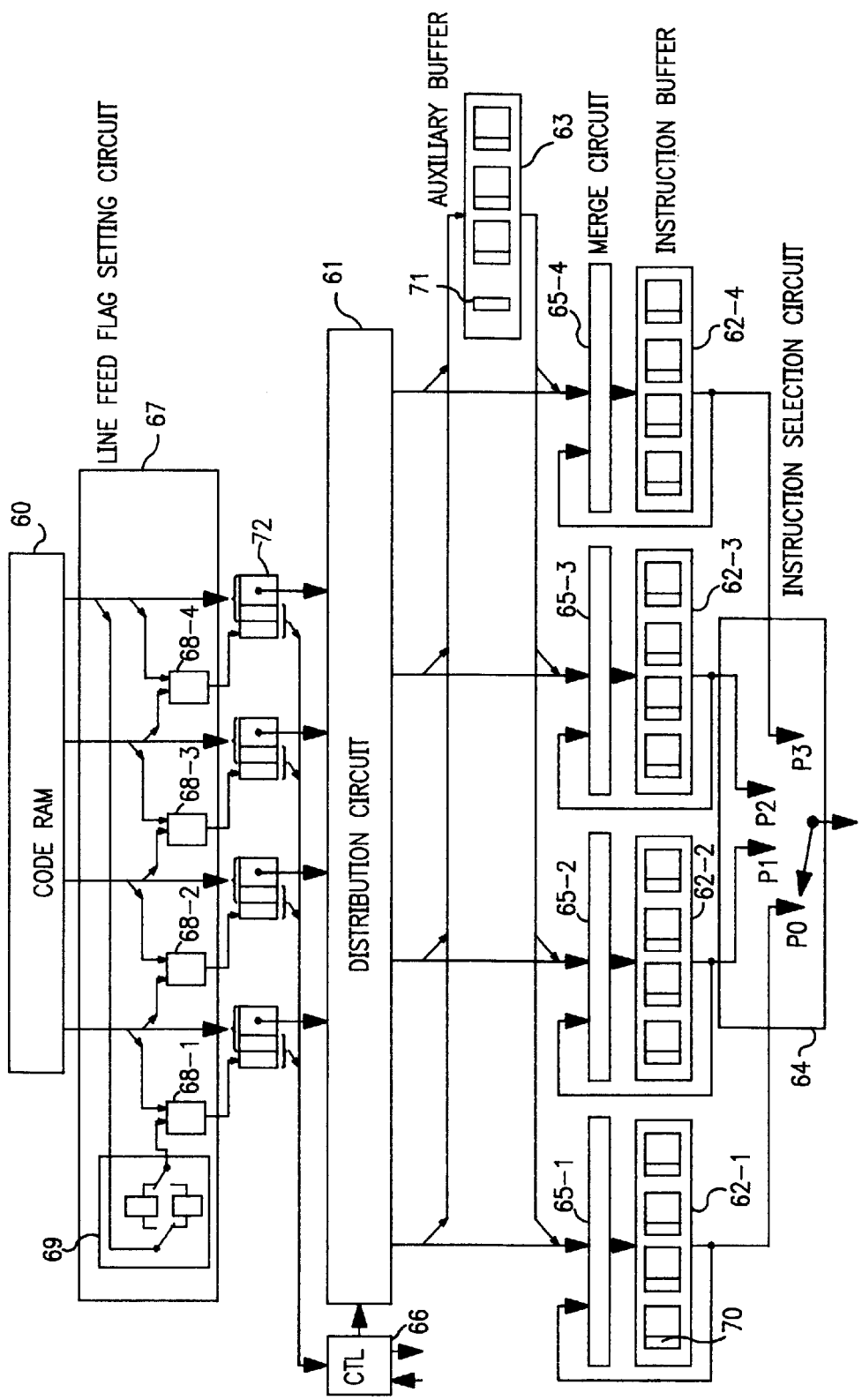
FIG. 26 is a schematic view of a circuit configuration to decompress instructions compressed in the format shown in FIG. 25 according to an embodiment of the present invention.

FIG. 26 is an example of a circuit embodiment that decompresses instructions compressed in the format illustrated in FIG. 25: code RAM (60) to store compressed instructions, distribution circuit (61), instruction buffers (62-1–62-4), auxiliary buffer (63), instruction selection circuit (64), merge circuits (65-1–65-4), control circuit (66), line feed flag setting circuit (67), line feed flag judgment circuits (68-1–68-4), slot D flag hold circuit (69) for holding a slot position specification flag read from slot D, empty flag (70) added to each instruction code buffer in the instruction buffers (62-1–62-4) and auxiliary buffer (63), instruction buffer number hold flag (71) to hold the number of an instruction buffer where to set the contents of the auxiliary buffer (63), and information type indicator (72) for the signal line between the feed flag setting circuit (67) and distribution circuit (61).

The circuit illustrated in FIG. 26 decompresses an instruction word read from the code RAM (60) in the distribution circuit (61) and stores the instructions in a plurality of instruction buffers (62-1–62-4). The instruction selection circuit (64) reads the contents of the instruction buffers (62-1–62-4) sequentially and supplies them to stage D. If decompressing an instruction word in the distribution circuit (61) and distributing the instructions to the plurality of instruction buffers (62-1–62-4) duplicates the data remaining in the instruction buffer, the duplicate data to be stored in the buffers is saved once into the auxiliary buffer (63). The contents of the auxiliary buffer (63) are transferred to the instruction buffer when the instruction buffer becomes empty.

As to two adjacent instruction codes in a compressed instruction code string read from the code RAM (60), the line feed flag setting circuit (67) judges the following items:

(1) whether the succeeding instruction word belongs to the same VLIW instruction as the preceding instruction, (2) whether the succeeding instruction word belongs to the next VLIW instruction after the one where the preceding instruction belongs.

The line feed flag is set to 0 in case (1) and to 1 in case (2).

By checking this line feed flag, the control circuit (66) determines whether to store an instruction word in the same instruction buffer as the preceding instruction word or in the next instruction buffer and controls distribution processing at the distribution circuit accordingly.

According to the slot position specification flag A or B, stored in pair with an instruction word, the line feed flag judgment circuits (68-1–68-4) use the following logic to set the line feed flag:

Slot position specification flag: A
   The line feed flag is turned on unconditionally.
Slot position specification flag: B
   The line feed flag is turned on if the slot position specification flag of the instruction word immediately preceding is B, C, or D.
Slot position specification flag: C
   The line feed flag is turned on if the slot position specification flag of the instruction word immediately preceding is C or D.
Slot position specification flag: D
   The line feed flag is turned on if the slot position specification flag of the instruction word immediately before is D.

In the instruction word at the beginning of an instruction word string, the instruction word at the last position in the instruction word string at the previous fetch becomes the instruction word immediately preceding. Therefore, the slot D flag hold circuit (69) retains the slot position specification flag added to the instruction word at the last position in the instruction word string read from the code RAM (60) until the next fetch cycle.

As the instruction selection circuit (64) reads the four instruction buffers cyclically, instructions are supplied to stage D.

For instruction fetch from the code RAM (60), if the instruction buffer at the latter stage of the instruction buffer currently supplying instructions to stage D becomes empty or partially empty (some instruction words remain), the next cycle becomes an instruction fetch cycle.

If the instruction buffer at the latter stage of the instruction buffer currently supplying instructions to stage D becomes complete (definite instruction words are retained), the next cycle becomes an instruction fetch stop cycle.

FIGS. 27 to 32 illustrate how the compressed instruction word in FIG. 25B is decompressed to restore the one illustrated in FIG. 25A.

Figure 27:
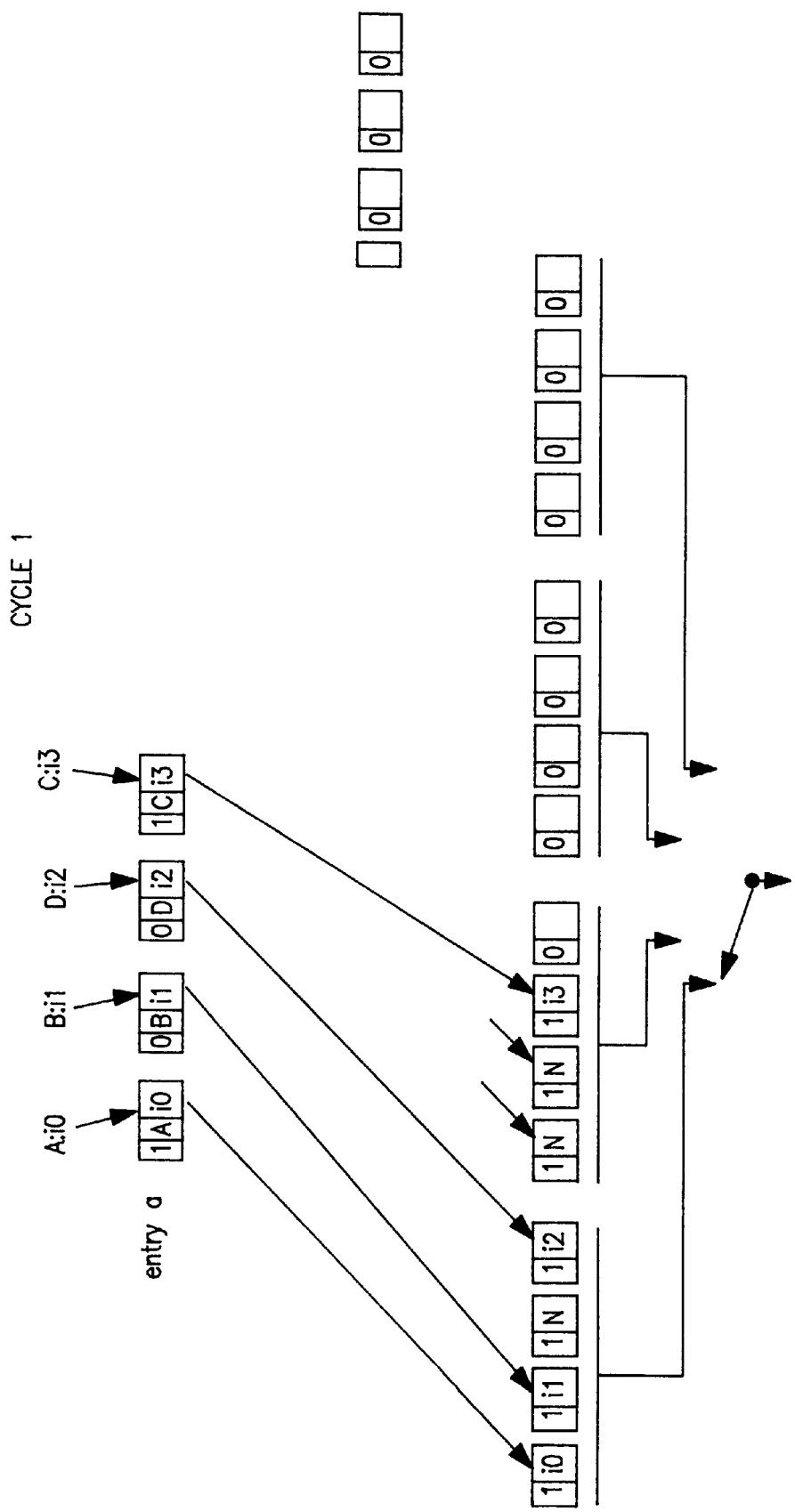
FIG. 27 is a schematic view of decompression of a compressed instruction sequence according to an embodiment of the present invention.

(1) Cycle 1 (FIG. 27)

The first instruction (A:i0, B:i1, D:i2, C:i3) is fetched. The line feed flag is set to 1 for instructions A:i0 and C:i3, and to 0 for instructions B:i1 and D:i2. Instructions A:i0, B:i1, and D:i2 are then stored in the first instruction buffer and instruction C:i3 is stored in the second instruction buffer. Blank instruction words between stored instruction words are filled with NOP instructions.

The first instruction is sent to stage D:i0 i1 NOP i2.

Figure 28:
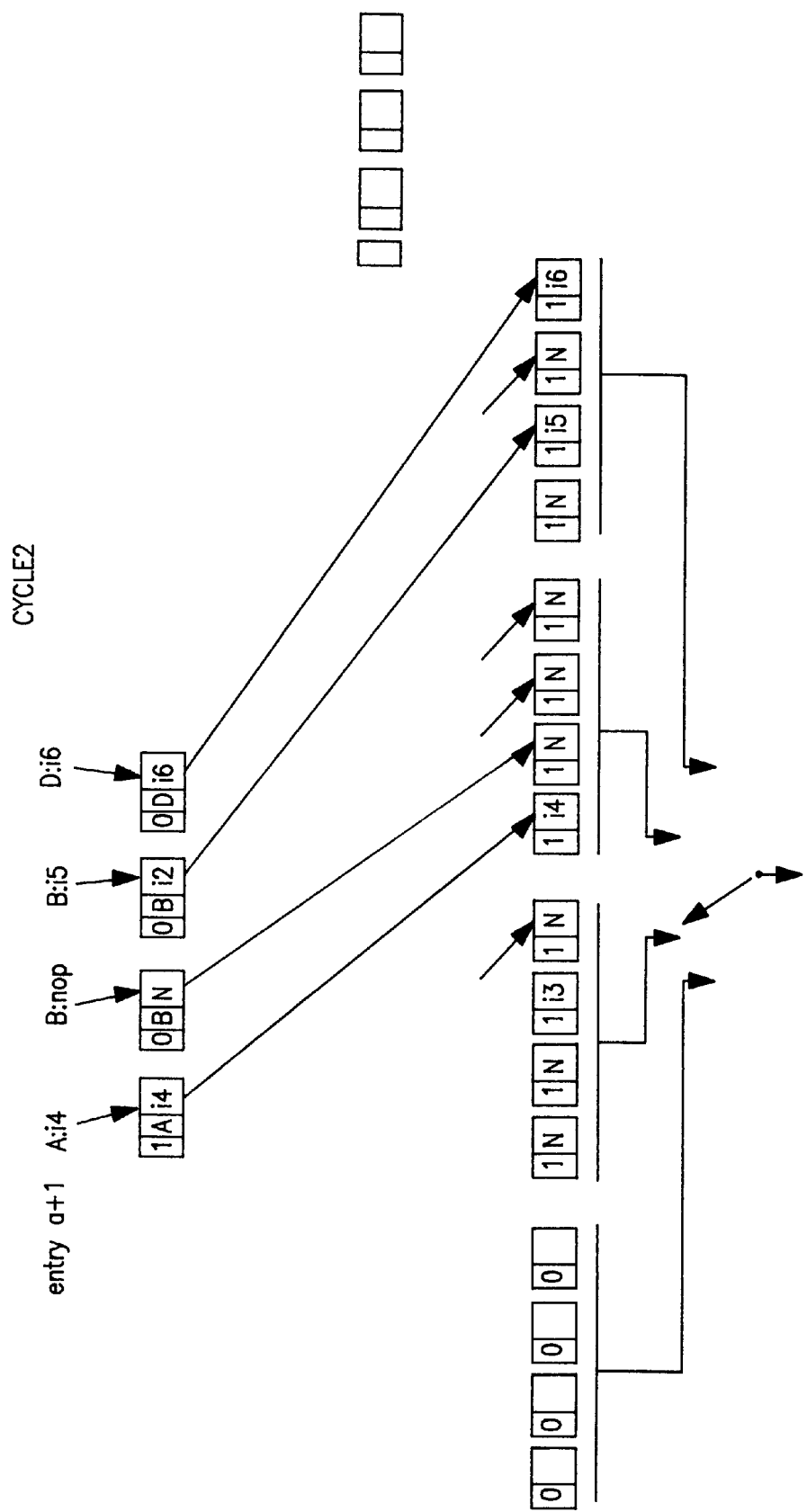
FIG. 28 is a schematic view of decompression of a compressed instruction sequence according to an embodiment of the present invention.

(2) Cycle 2 (FIG. 28)

The second instruction (A:i4, B:NOP, B:i5, D:i6) is fetched. The line feed flag is set to 1 for instructions A:i4 and B:i5 and to 0 for instructions B:NOP and D:i6. Instructions A:i4 and B:NOP are then stored in the third instruction buffer and instructions B:i5 and D:i6 are stored in the fourth instruction buffer. Blank instruction words between stored instruction words are filled with NOP instructions.

The second instruction is sent to stage D: NOP NOP i3 NOP.

Figure 29:
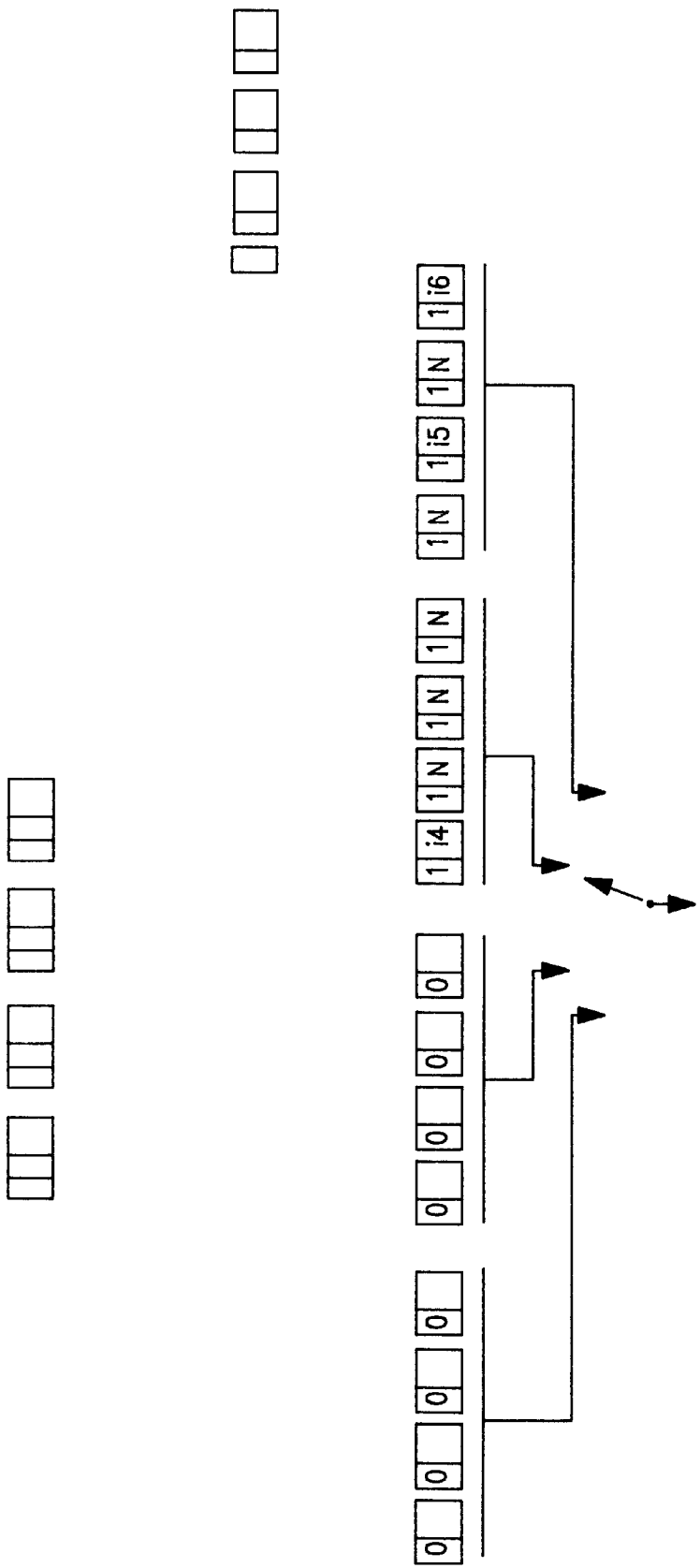
FIG. 29 is a schematic view of decompression of a compressed instruction sequence according to an embodiment of the present invention.

(3) Cycle 3 (FIG. 29)

Since a complete instruction is in the instruction buffer, no instruction is fetched.

Figure 30:
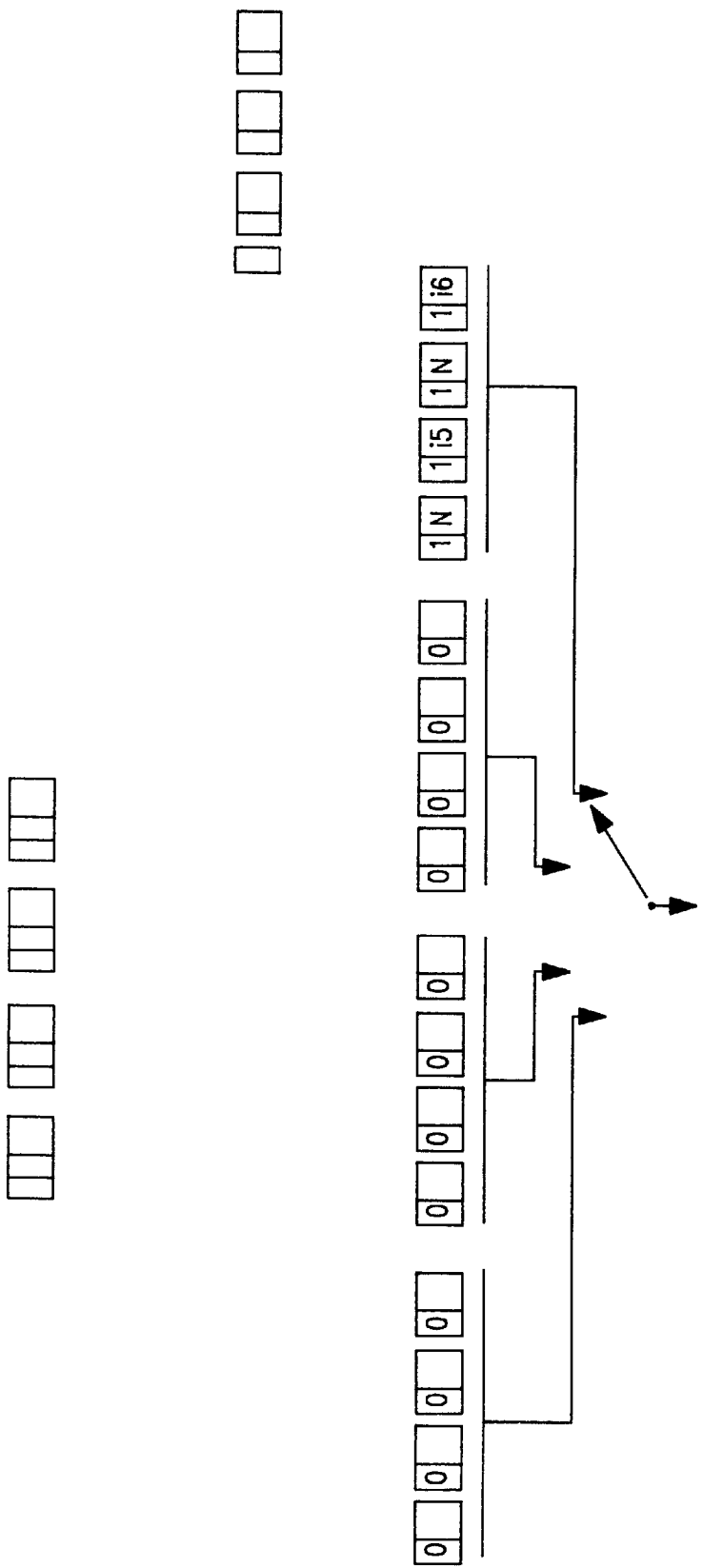
FIG. 30 is a schematic view of decompression of a compressed instruction sequence according to an embodiment of the present invention.

The third instruction is sent to stage D:i4 NOP NOP NOP (4) Cycle 4 (FIG. 30)

Since a complete instruction is in the instruction buffer, no instruction is fetched.

The fourth instruction is sent to stage D:NOP i5 NOP i6

Figure 31:
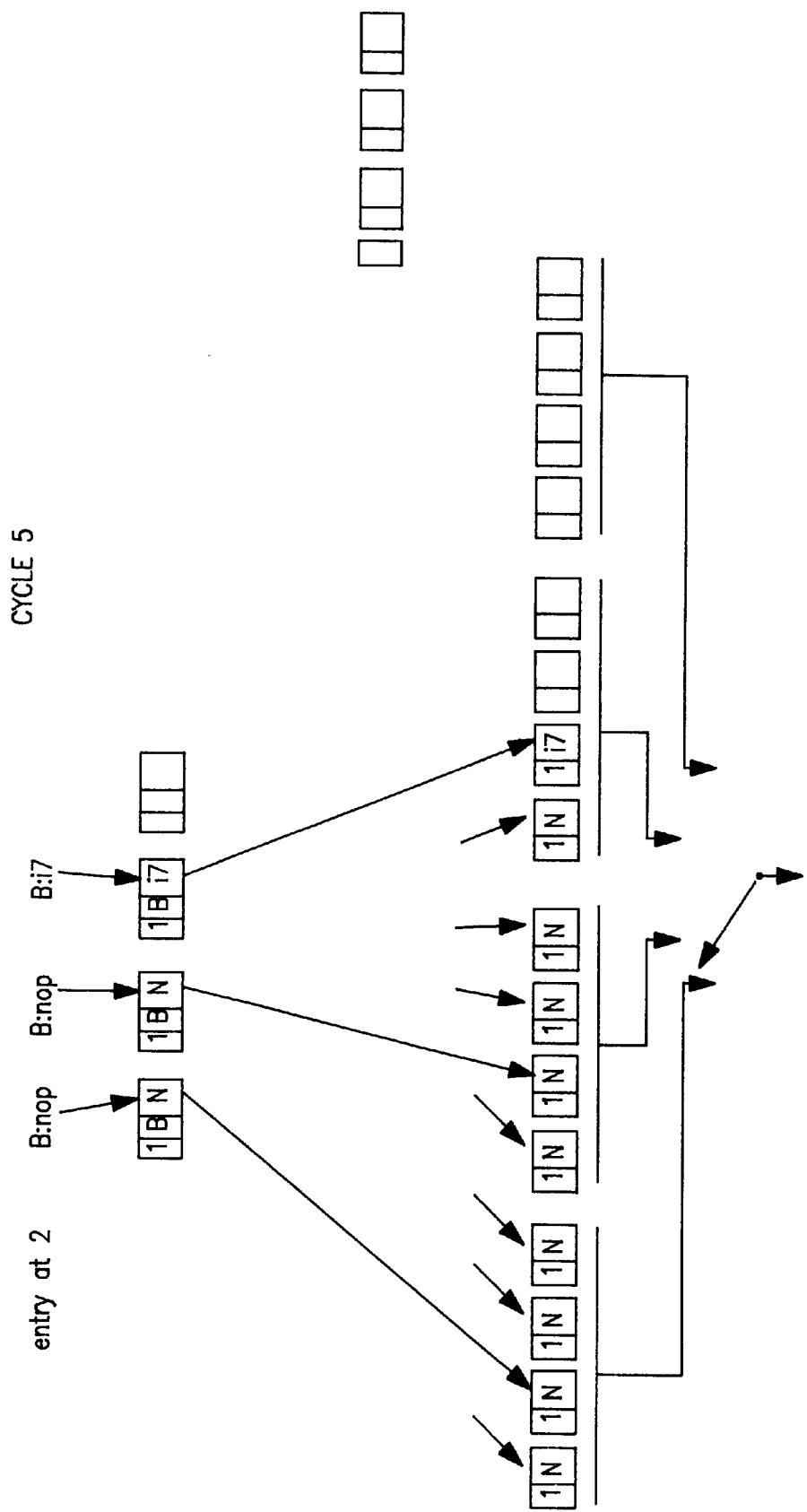
FIG. 31 is a schematic view of decompression of a compressed instruction sequence according to an embodiment of the present invention.

(5) Cycle 5 (FIG. 31)

The third instruction (B:NOP, B:NOP, B:i7, (X)) is fetched.

FIG. 25B does not illustrate the contents of the instruction word at the fourth position (entry a+2). To restore the instruction word to the format in cycle 7 illustrated in FIG. 25A, an effective instruction should exist at least in slot A or B in cycle 8, which is not illustrated.

The line feed flag is set for each of the three instructions, B:NOP, B:NOP, and B:i7. The first instruction B:NOP is stored in the first instruction buffer, the second instruction B:NOP in the second instruction buffer, and the third instruction B:i7 in the third instruction buffer.

Figure 32:
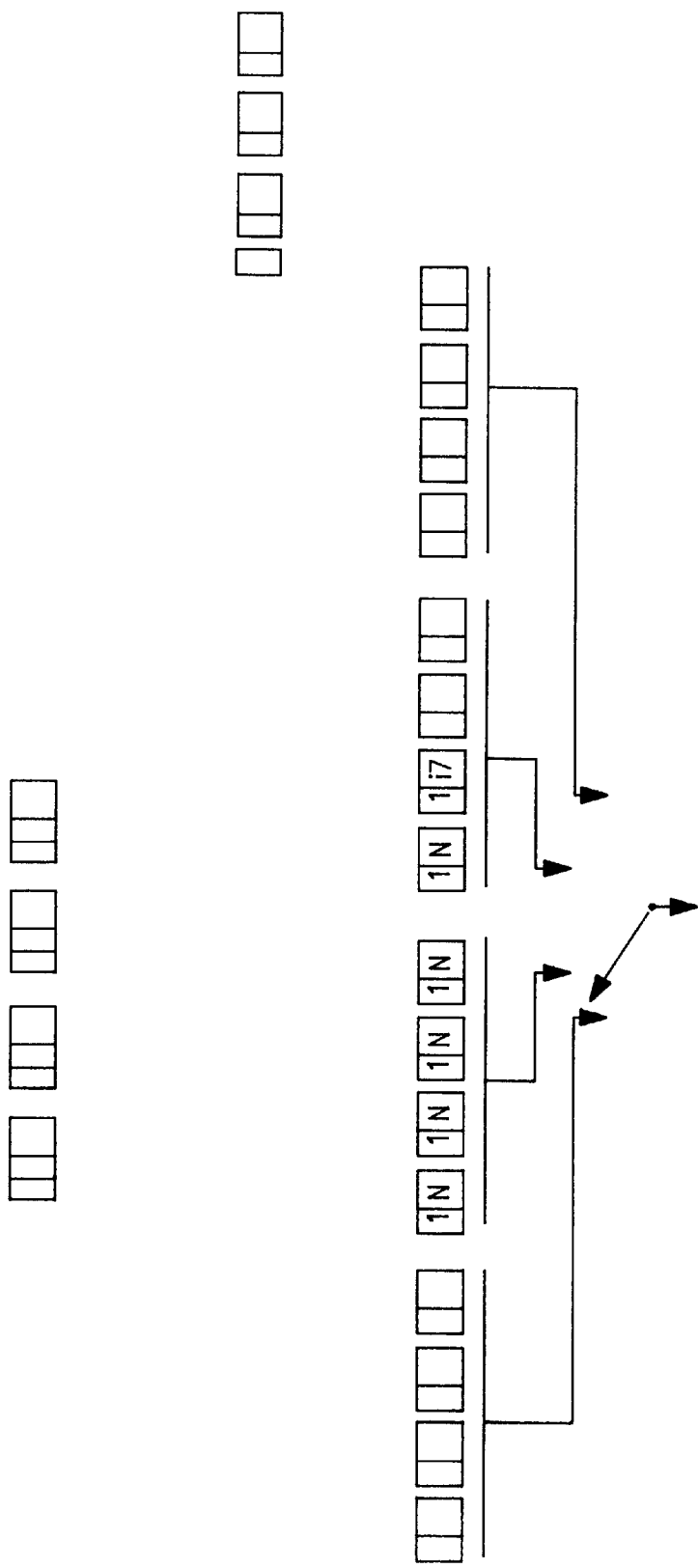
FIG. 32 is a schematic view of decompression of a compressed instruction sequence according to an embodiment of the present invention.

The fifth instruction is sent to stage D: NOP NOP NOP NOP (6) Cycle 6 (FIG. 32)

Since a complete instruction is in the instruction buffer, no instruction is fetched.

The sixth instruction is sent to stage D:NOP NOP NOP NOP (7) Cycle 7 (Not illustrated) The seventh instruction is sent to stage D:NOP i7 NOP NOP.

In the embodiment illustrated in FIG. 26, a bit can be added with the slot position specification flag to indicate that the VLIW instruction following a compressed instruction word is composed of all NOP instructions.

Figure 33:
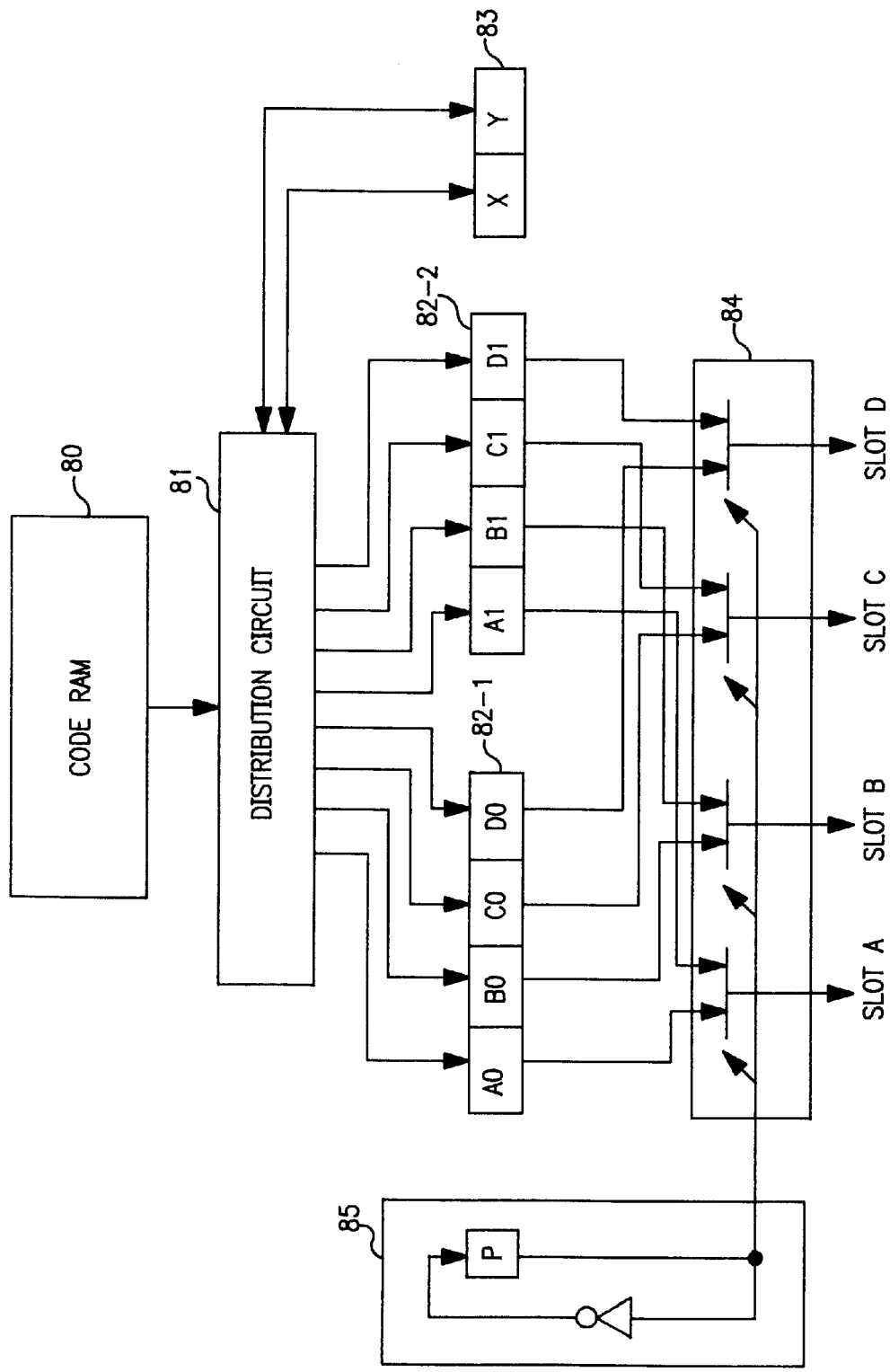
FIG. 33 is a schematic view of a circuit configuration to decompress instructions compressed in the format shown in FIG. 25 according to an embodiment of the present invention.

FIG. 33 is another example of circuit embodiment that decompresses the instructions compressed in the format illustrated in FIGS. 25A and 25B: code RAM (80) to store compressed instructions, distribution circuit (81), instruction buffers (82-1, 82-2), auxiliary buffer (83), instruction selection circuit (84), instruction selection control circuit (85).

This embodiment has only two buffers for alternate use as instruction buffers. Instruction codes read from the code RAM (80) that do not fit in the two instruction buffers are stored in the auxiliary buffer (83).

In addition, a status bit is added to each of buffers A0 to D0 and A1 to D1 in the instruction buffers (82-1, 82-2). FIGS. 34A and 34B illustrate the contents of the status bits.

State E The slot is blank and waits for input after outputting an NOP instruction.

State V: The slot has an instruction code and waits for input after outputting the instruction code.

State N: The slot has an NOP instruction and waits for input after outputting the NOP instruction.

State D: The slot has an instruction code but changes to state V after outputting an NOP instruction while retaining the instruction code.

FIGS. 35A and 35B illustrate an instruction code string compressed by adding a position specification flag to an instruction word and its decompressed string. FIG. 35A illustrates an example of a pattern fetched from the instruction storage memory. FIG. 35B illustrates the instruction issue order when the pattern illustrated in FIG. 35A is developed.

Figure 36B:
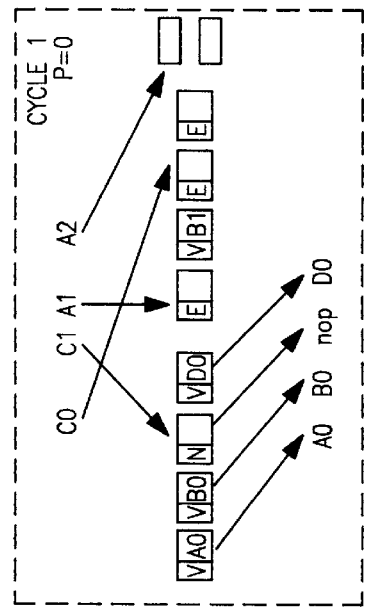
FIGS. 36A, 36B, 36C and 36D are cycles of decompression for a compressed instruction sequence according to an embodiment of the present invention.
Figure 36D:
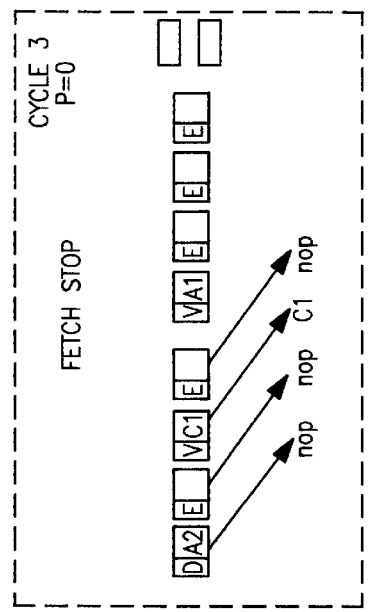
Figure 36A:
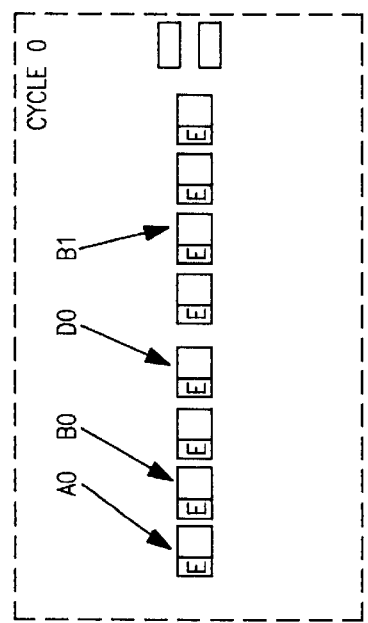

FIGS. 36 to 38 illustrate how the circuit in FIG. 33 decompresses the pattern illustrated in FIG. 35A. The decompression processing is as follows:

(1) Cycle 0 (FIG. 36A)

The first compressed instruction (A0 B0 D0 B1) is fetched. A0, B0, and D0 are stored in the instruction buffer on the left and B1 is stored in the instruction buffer on the right.

(2) Cycle 1 (FIG. 36B)

The first compressed instruction (C0 C1 A1 A2) is fetched. A0, B0, NOP, and D0 are issued from the instruction buffer on the left and C1 is stored in that buffer. C0 and A1 are stored in the instruction buffer on the right, and A2 is stored in the auxiliary buffer.

Figure 36C:
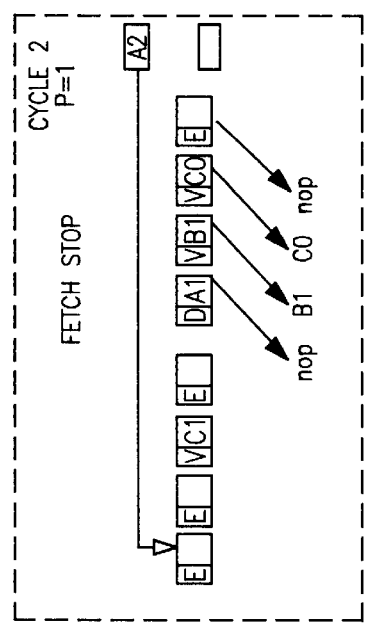

(3) Cycle 2 (FIG. 36C)

Instruction fetching is stopped. NOP, B1, C0, and NOP are issued from the instruction buffer on the right and A2 in the auxiliary buffer is stored in the instruction buffer on the left.

(4) Cycle 3 (FIG. 36D)

Instruction fetching is stopped. NOP, NOP, C1, and NOP are issued from the instruction buffer on the left.

Figure 37A:
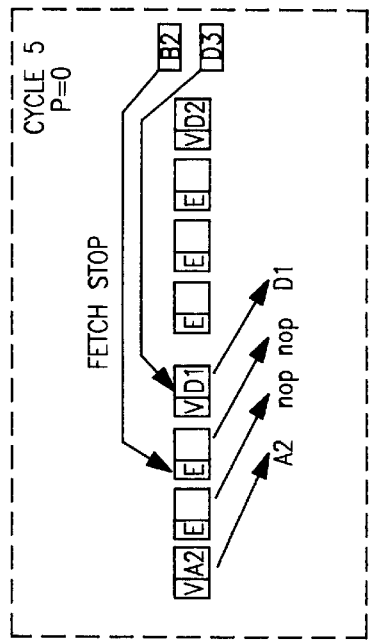
FIGS. 37A, 37B, 37C, and 37D are cycles of decompression for a compressed instruction sequence according to an embodiment of the present invention.

(5) Cycle 4 (FIG. 37A)

The third compressed instruction (D1 D2 B2 D3) is fetched. A1, NOP, NOP, and NOP are issued from the instruction buffer on the right and D1 is stored in the instruction buffer on the left. D2 is stored in the instruction buffer on the right, and B2 and D3 are stored in the auxiliary buffer.

Figure 37B:
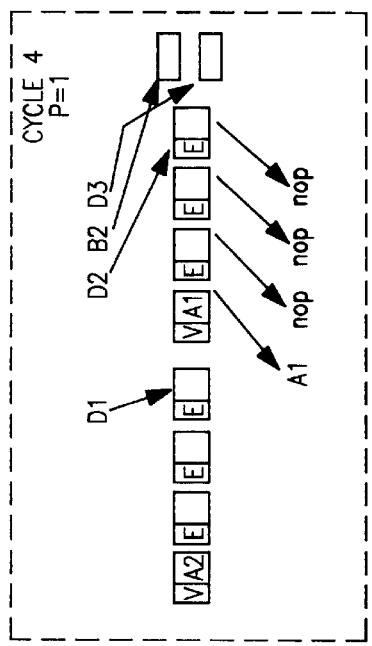

(6) Cycle 5 (FIG. 37B)

Instruction fetching is stopped. A2, NOP, NOP, and D1 are issued from the instruction buffer on the left, and B2 and D3 from the auxiliary buffer are stored in the instruction buffer on the left.

Figure 37C:
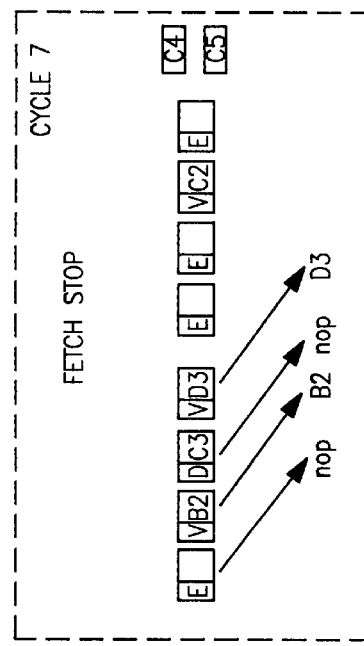
Figure 37D:
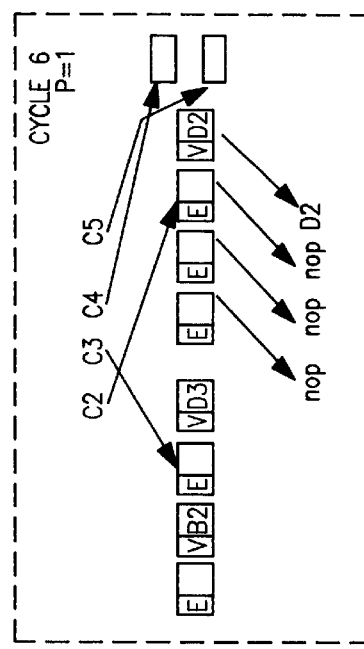

(7) Cycle 6 (FIG. 37C)

The fourth compressed instruction (C2 C3 C4 C5) is fetched. NOP, NOP, NOP, and D2 are issued from the instruction buffer on the right and C2 is stored in the instruction buffer on the left. C3 is stored in the instruction buffer on the right, and C4 and C5 are stored in the auxiliary buffer.

(8) Cycle 7 (FIG. 37D))

Instruction fetching is stopped. NOP, B2, NOP, and D3 are issued from the instruction buffer on the left.

Figure 38B:
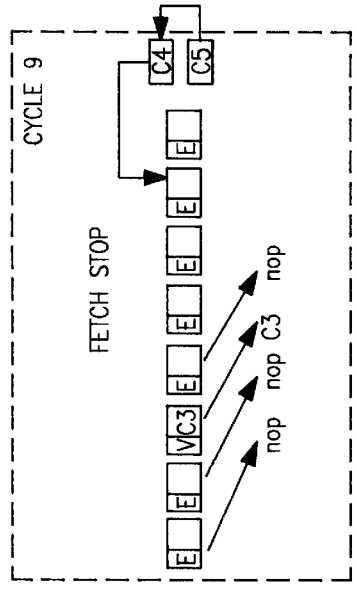
FIGS. 38A, 38B, 38C, and 38D are cycles of compression of a compressed instruction sequence according to an embodiment of the present invention.
Figure 38D:
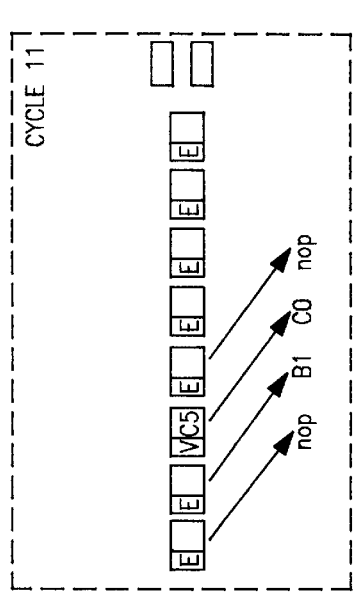
Figure 38A:
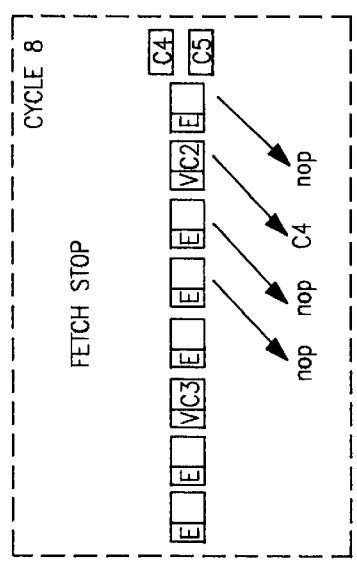

(9) Cycle 8 (FIG. 38A)

Instruction fetching is stopped. NOP, NOP, C2, and NOP are issued from the instruction buffer on the right.

(10) Cycle 9 (FIG. 38B)

Instruction fetching is stopped. NOP, NOP, C3, and NOP are issued from the instruction buffer on the left and C4 from the auxiliary buffer is stored in the instruction buffer on the right.

Figure 38C:
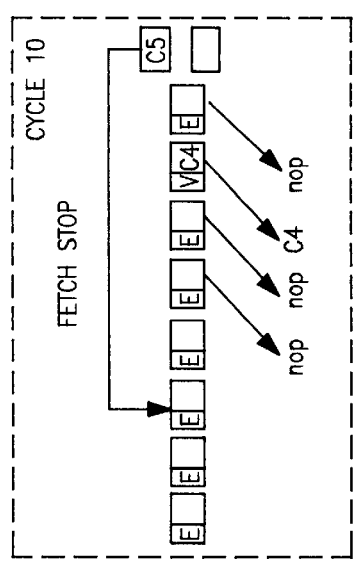

(11) Cycle 10 (FIG. 38C)

Instruction fetching is stopped. NOP, NOP, C4, and NOP are issued from the instruction buffer on the right and C5 from the auxiliary buffer is stored in the instruction buffer on the left.

(12) Cycle 11 (FIG. 38D)

Instruction fetching is stopped. NOP, NOP, C5, and NOP are issued from the instruction buffer on the left.

In the example illustrated in FIGS. 33 to 38, the following processing sets status flag D if there is another slot with the V flag next to the current slot in the instruction buffer:

1) Fetching an instruction from memory and storing it in the buffer, and

2) Transferring an instruction from the auxiliary buffer to the instruction buffer The use of flag D is not necessary if the number of auxiliary buffers is adequate.

In the embodiment illustrated in FIG. 33, a bit can be added with the slot position specification flag to indicate that the VLIW instruction following a compressed instruction word is composed of all NOP instructions.

Figure 39:
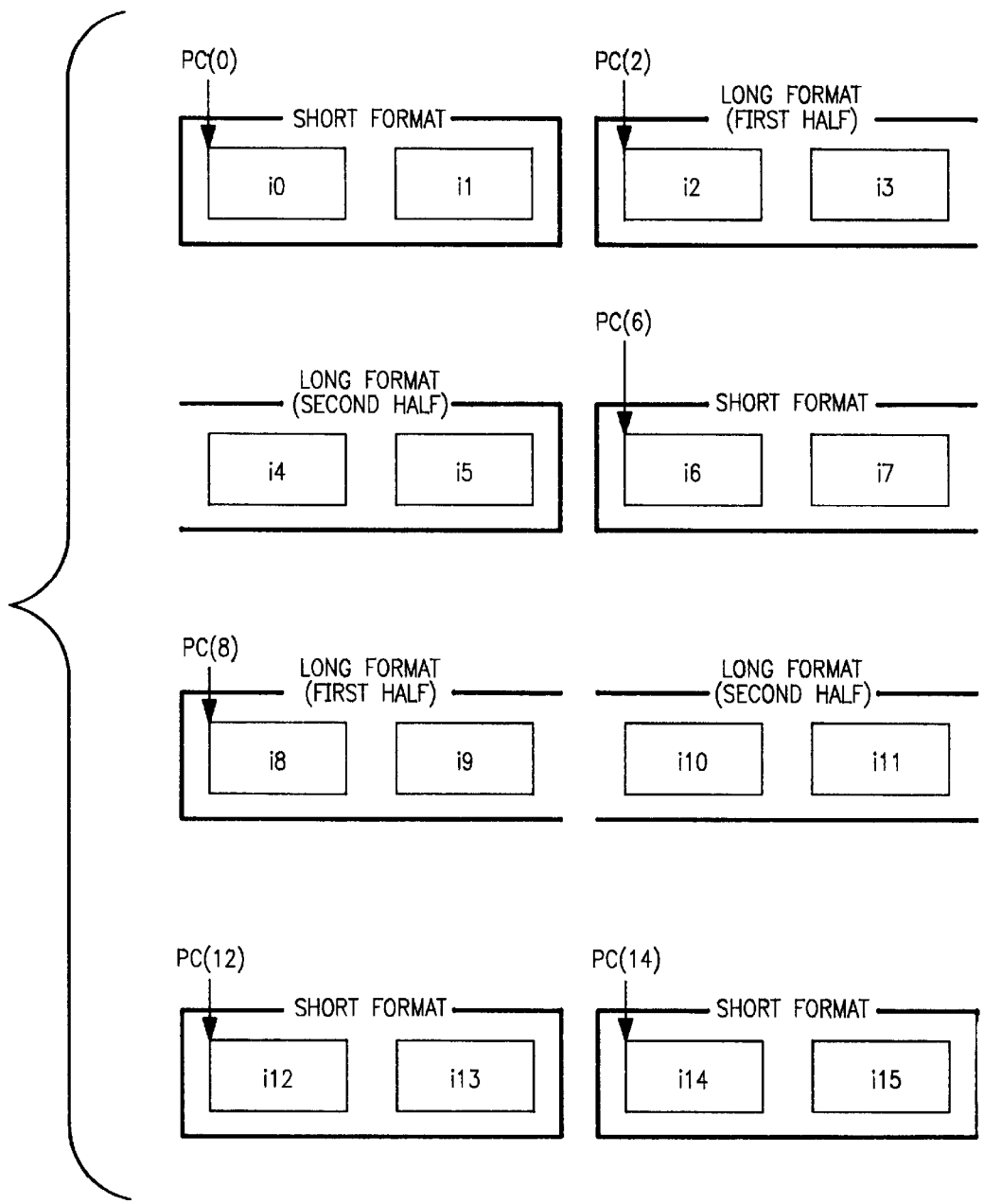
FIG. 39 is a schematic view of a program counter for instructions to be stored in memory after compression according to an embodiment of the present invention.

FIG. 39 is an example of giving a program counter to instructions to be stored in memory after compression. FIG. 39 illustrates how a compressed instruction string without NOP instructions is stored in a load module. As FIG. 39 illustrates, a program counter is added to the beginning of the effective instructions in a load module. In FIG. 39, i0 to i15 are instruction elements.

An instruction is always fetched in units of four instruction elements. The program counter specifies the unique number of a VLIW instruction. In FIG. 39, i0 and i1 are of the short format type and two NOP instructions are deleted somewhere. Therefore, the program counter of this VLIW instruction is defined as 0 to indicate the beginning of i0. Although fetched at the same time, i2 and i3 belong to a VLIW instruction to be executed at the next timing.

i2 and i3 are part of a long-format instruction; the VLIW instruction cannot be completed until other elements are fetched in the next cycle. The program counter is based on the instruction element address system and incremented for every instruction element. As FIG. 39 illustrates, the program counter value is 2 for a VLIW instruction starting at instruction element i2.

Similarly, the program counter value is 6 for a VLIW instruction starting at instruction element i6. A program counter is not given to an instruction code deleted for compression but is given to one stored in the instruction storage memory. If the current instruction is of the short format, 2 is added to the current program counter value to calculate the next counter value. If the current instruction is of the long format, 4 is added to the current program counter value.

Figure 40:
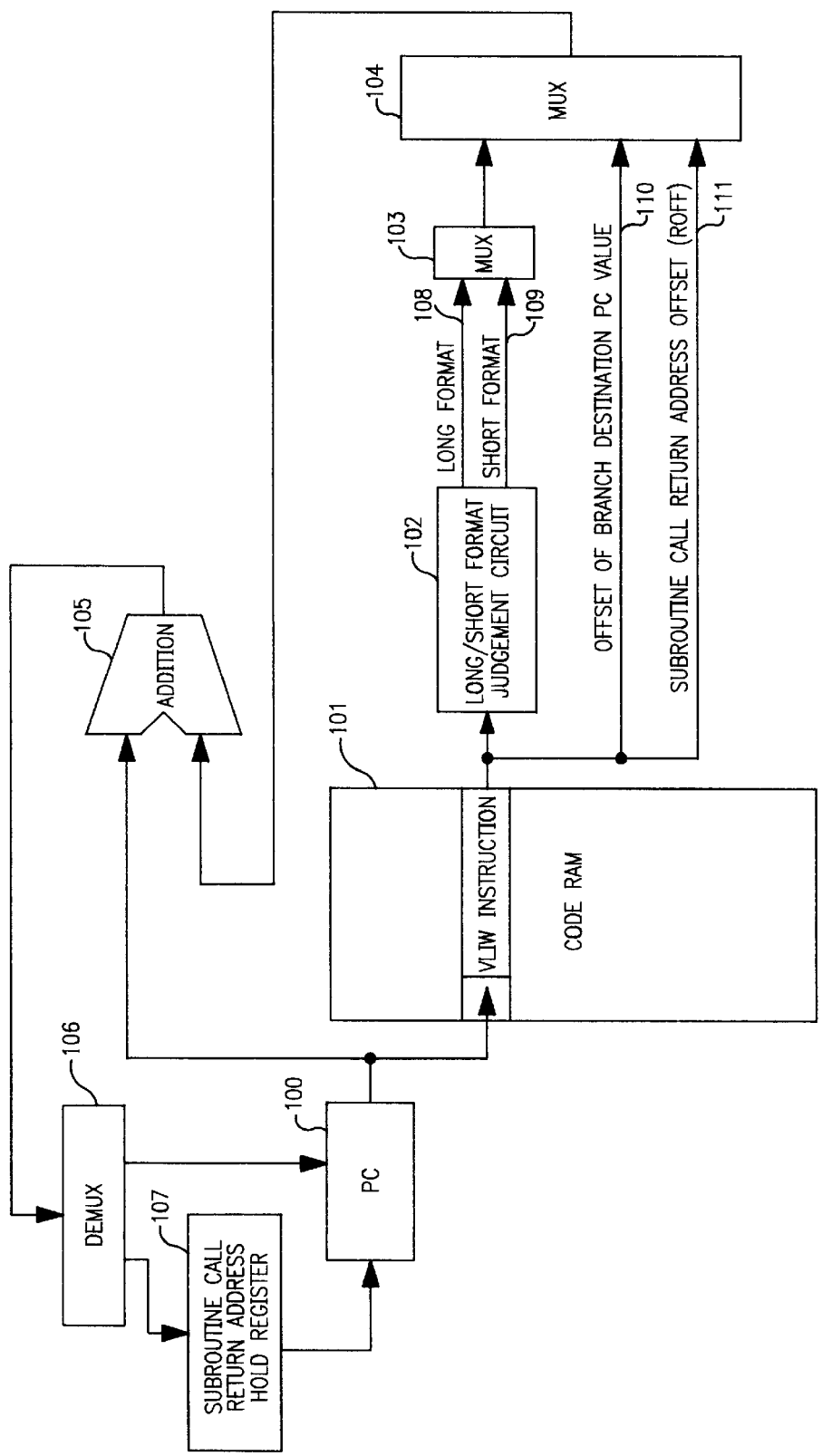
FIG. 40 is a schematic view of a program counter update control circuit according to an embodiment of the present invention.

FIG. 40 illustrates an embodiment of a program counter update control circuit according to the present invention: program counter hold register (100), instruction storage memory (code RAM) (101), long/short format judgment circuit (102), selection circuits (103, 104), addition circuit (105), output destination selection circuit (106), subroutine call return address hold register (107), +4 signal line (108), +2 signal line (109), branch program counter offset signal line (110), and subroutine call return address offset value (ROFF) signal line (111).

With the contents of the PC register (100) as an address, the corresponding address in the instruction RAM (101) is accessed to fetch a VLIW instruction. As stated previously, if the fetched instruction is of the long format, 4 is added to the current program counter value. If the fetched instruction is of the short format, 2 is added to the current program counter value. The long/short format judgment circuit (102) judges the instruction format. FIG. 40 also illustrates a data path for generating a branch destination address if the fetched instruction is a branch destination. To control a branch destination address, the offset value of the branch program counter in the instruction codes of a branch destination contained in the fetched VLIW instruction is added to the current program counter.

Then the return address of a subroutine call instruction is explained here.

This return address can be classified into two patterns depending whether the VLIW instruction containing the subroutine call instruction is of the long or short format and three patterns depending on whether the VLIW instruction at the delay slot is of the long or short format or an implicit NOP instruction. Therefore, there are six return address patterns in total.

Figure 42B:
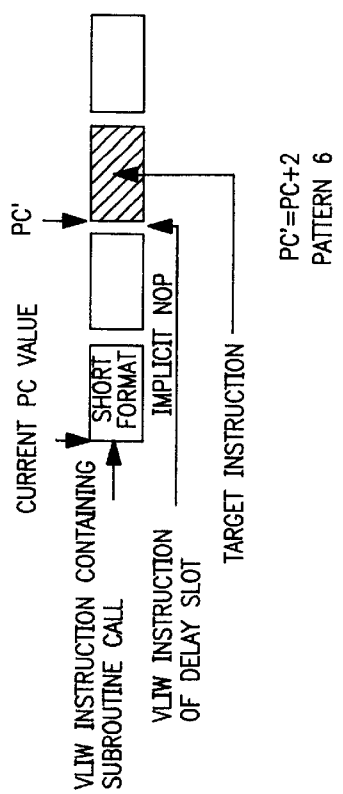
FIGS. 42A and 42B are schematic views of return address patterns for a subroutine call instruction according to an embodiment of the present invention.
Figure 42A:
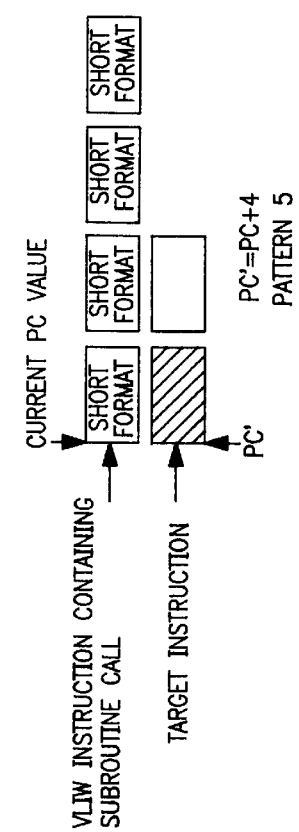

FIGS. 41 and 42 illustrate the six return address patterns. In FIGS. 41 and 42, a target instruction refers to an instruction to be returned when a return instruction is executed after a subroutine call instruction is issued and. executed. Note that the VLIW instruction contained in the delay slot must always be executed before a subroutine.

FIG. 43 lists the return address patterns illustrated in FIGS. 41 and 42. In FIG. 43, ROFF is an offset value necessary for calculating a return address (PC' in FIGS. 41 and 42) when a subroutine call instruction is issued. As FIGS. 41, 42, and 43 illustrate, the value of ROFF depends on whether the VLIW instruction containing the subroutine call instruction is of the long or short format type and whether the VLIW instruction at the delay slot is of the long or short format type or an implicit NOP instruction. Therefore, this value cannot be calculated. This invention gives a value of ROFF to the instruction field of a subroutine call instruction as an immediate value.

Figure 44:
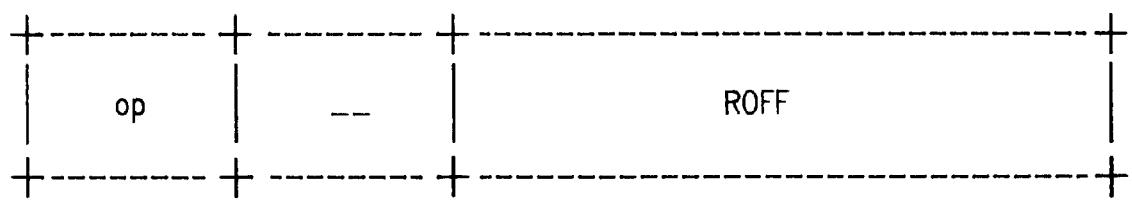
FIG. 44 is a block diagram of a subroutine call instruction format according to an embodiment of the present invention.

A subroutine call instruction has the format illustrated in FIG. 44. The value of ROFF is automatically inserted by the assembler. The return address is reserved in the return address storage register by summing the value of ROFF and the program counter value of the instruction including the subroutine call. In other words, the formula for calculating the return address is:

Return address=PC value of VLIW instruction containing subroutine call instruction+value of ROFF This formula ensures a correct return address for a subroutine call instruction even when compressed. As to the circuit illustrated in FIG. 40, the addition circuit (105) sums the contents of the PC register (100) and the return address offset signal line (111) and stores the result in the return address hold register (107) to implement the above operation.

As mentioned before, a value of ROFF is embedded in the instruction. This value is added to the current program counter value to determine a return address for a subroutine call. After the subroutine is called and finishes executing a series of instructions, this value is set on the program counter to return from the subroutine.

Although a few preferred embodiments of the present invention have been illustrated and described, it will be appreciated by those skilled in the art that changes may be made in these embodiments without departing from the principles and spirit of the invention, the scope of which is defined in the claims and their equivalents.

What is claimed is:

1. A data processing device with an instruction compression function and an instruction decompression function for VLIW instructions comprising:

an instruction storage memory to store specific instruction code strings for controlling a computer in a compressed form, wherein each compressed instruction code string includes attached compression information indicating a form of compression; and an instruction code decompression circuit to restore a compressed instruction code string read from said instruction storage memory to an original status according to the attached compression information, wherein the attached compression information indicates whether a succeeding VLIW instruction is filled with NOP instructions, and wherein non-branch NOP instructions are selectively stored in said instruction storage memory.

2. The data processing device according to claim 1, wherein each instruction code string is a VLIW instruction which has elements compressed by deleting at least one of NOP instructions from the VLIW instruction if the VLIW instruction has more NOP instructions than a predetermined number, and wherein the form of compression is determined according to a number and position of the NOP instructions.

3. The data processing device according to claim 2, wherein the compression information is added to each instruction code string that includes fewer instruction codes than in a VLIW instruction.

4. The data processing device according to claim 3, wherein succeeding instruction information indicating that a succeeding VLIW instruction includes only NOP instructions is added to the compression information, thereby storing information from the succeeding instruction code string in said instruction storage memory without storing the succeeding VLIW instruction, and wherein said instruction code decompression circuit restores the succeeding VLIW instruction upon detection of information indicating that the succeeding VLIW instruction includes only NOP instructions when the compression form information is read from said instruction storage memory.

5. A data processing device with an instruction compression function and an instruction decompression function for VLIW instructions, comprising:

an instruction storage memory to store at least specific instruction code strings for controlling a computer in a compressed form with compression information indicating a form of compression, and to selectively store non-branch NOP instructions;

an instruction buffer to store decompressed instructions;

an auxiliary buffer to temporarily store part of an instruction being decompressed;

a first switch to selectively input instruction code strings of high-order slots read from said instruction storage memory into said instruction buffer;

a second switch to selectively input instruction code strings of low-order slots read from said instruction storage memory into said instruction buffer and said auxiliary buffer;

a third switch to transfer contents of said auxiliary buffer to said instruction buffer; and a control circuit to control the first, second, and third switch according to the compression information, wherein the attached compression information indicates whether a succeeding VLIW instruction is filled with NOP instructions.

6. The data processing device according to claim 5, wherein the instruction codes of a VLIW instruction are elements which are compressed by deleting at least one of NOP instructions in the VLIW instruction if the VLIW instruction has more NOP instructions than a predetermined number, and wherein a form of the compression is determined according to a number and positions of the NOP instructions.

7. The data processing device according to claim 6, wherein the compression information is added to each instruction code string that includes fewer instruction codes than the instruction codes in a VLIW instruction.

8. The data processing device according to claim 7, wherein succeeding instruction information indicating that a succeeding VLIW instruction includes only NOP instructions is added to the compression information, thereby storing information from the succeeding instruction code string in said instruction storage memory without storing the succeeding VLIW instruction, and wherein said instruction code decompression circuit restores the succeeding VLIW instruction upon detection of information indicating that the succeeding VLIW instruction includes only NOP instructions when the compression form information is read from said instruction storage memory.

9. The data processing device according to claim 5, wherein said first switch has a first partial switch for each instruction code in the corresponding instruction code string to input each corresponding instruction code into a different section in said instruction buffer, and said second switch has a second partial switch for each instruction code in the corresponding instruction code string to input each corresponding instruction code into a different section in said instruction buffer and said auxiliary buffer.

10. The data processing device according to claim 9, further comprising:

a delay output buffer for outputting a low-order slot part of an instruction read from said instruction storage memory with a delay; and a fourth switch to input the output from said delay output buffer into the high-order part of said instruction buffer.

11. A data processing device with an instruction compression function and an instruction decompression function for VLIW instructions, comprising:

an instruction storage memory to read or write instruction codes for controlling a computer in units of instruction code strings including a predetermined number of instruction codes in a compressed form and storage position information attached to each instruction code by deleting specific instruction codes; and an instruction code decompression circuit to decompress each instruction code according to the attached storage position information, wherein NOP instructions are left in a compressed code string such that consecutively deleted NOP instructions will not exceed the predetermined number in a compression code string when NOP instructions are deleted from an NOP instruction string in an instruction code string before compression.

12. The data processing device according to claim 11, wherein the instruction code is an element of a VLIW instruction, the storage position information is slot position information for a VLIW instruction, and the specific instruction code is an NOP instruction.

13. The data processing device according to claim 12, wherein NOP instructions to be left in a compressed code string are fixed at specific slot positions in a VLIW instruction word before compression.

14. The data processing device according to claim 12, wherein succeeding instruction information indicating that a succeeding VLIW instruction includes only NOP instructions is added to the compression information of the instruction code string, thereby storing information from the succeeding instruction code string in said instruction storage memory without storing the succeeding VLIW instruction, and wherein said instruction code decompression circuit restores the VLIW instruction upon detection of information indicating that the VLIW instruction includes only NOP instructions when the compression form information is read from said instruction storage memory.

15. A data processing device with an instruction compression function and an instruction decompression function for VLIW instructions, comprising:

an instruction storage memory to read or write instruction codes for controlling a computer in units of instruction code strings, each instruction code string including a specified number of instruction codes in a compressed form and storage position information attached to each instruction code by deleting specific instruction codes, said instruction storage memory selectively storing non-branch NOP instructions;

a plurality of instructions buffers to store a plurality of instruction codes and to cyclically fetch a plurality of instructions;

an instruction code distribution unit to develop a compressed instruction code string read from said instruction storage memory and send the instruction codes to respective instruction buffers of said plurality of instruction buffers; and a control circuit to control the development of a compressed instruction code string in said instruction distribution unit according to storage position information attached to each instruction code and instruction buffer information indicating an instruction buffer from which an instruction is output, wherein NOP instructions are left in a compressed code string such that consecutively deleted NOP instructions will not exceed the predetermined number in a compression code string when NOP instructions are deleted from an NOP instruction string in an instruction code string before compression.

16. The data processing device according to claim 15, wherein the instruction code is an element of a VLIW instruction, the storage position information is slot position information for a VLIW instruction, and the specific instruction code is an NOP instruction.

17. The data processing device according to claim 16, wherein NOP instructions to be left in a compressed code string are fixed at specific slot positions in a VLIW instruction word before compression.

18. The data processing device according to claim 16, wherein succeeding instruction information indicating that a succeeding VLIW instruction includes only NOP instructions is added to the compression information of the instruction code string, thereby storing information from the succeeding instruction code string in said instruction storage memory without storing the succeeding VLIW instruction, and wherein said instruction code decompression circuit restores the VLIW instruction upon detection of information indicating that the VLIW instruction includes only NOP instructions when the compression form information is read from said instruction storage memory.

19. The data processing device according to claim 16, further comprising:

a flag information extraction unit to extract flag information indicating whether a succeeding instruction code of two adjacent instruction codes in a instruction code string belongs to a same instruction word as a preceding instruction code or to a next instruction word by comparing storage position information added to the two adjacent instruction codes in the compressed instruction code string, wherein said control circuit sends each instruction code to one of said plurality of instruction buffers by using the flag information output from said flag information extraction unit.

20. The data processing device according to claim 19 further comprising:

an auxiliary buffer to temporarily store an instruction code when the instruction code read from the instruction storage memory cannot be stored in any of said plurality of instruction buffers.

21. The data processing device according to claim 16, wherein a flag is provided at each slot of each instruction buffer of said plurality of instruction buffers to indicate slot status, and wherein said control circuit sends each instruction code to one of said plurality of instruction buffers by using the flag information, then updates the flag information.

22. The data processing device according to claim 21, wherein the flag indicates one of the following states:

(1) state 1: slot is empty, await input after outputting an NOP instruction, (2) state 2: slot has an instruction code, await input after outputting the instruction code, (3) state 3: slot has an NOP instruction, await input after outputting the NOP instruction, and (4) state 4: slot has an instruction code, change to state 2 after outputting the NOP instruction while keeping the instruction code.

23. A data processing device with an instruction compression function and an instruction decompression function, comprising:

an instruction storage memory to store specific instruction code strings for controlling a computer in a compressed form with attached compression information indicating a form of compression; and an instruction code decompression circuit to restore a code string read from said instruction storage memory to an original status according to the attached compression information, wherein a program counter is not added to an instruction code deleted for compression and a program counter is added to an instruction code stored in said instruction storage memory, wherein the attached compression information indicates whether a succeeding VLIW instruction is filled with NOP instructions, and wherein non-branch NOP instructions are selectively stored in said instruction storage memory.

24. The data processing device according to claim 23, wherein a return offset value is specified in an instruction code of a subroutine call instruction as an immediate value, and wherein a program counter of the subroutine call instruction added with the return offset value is given as an immediate value in the subroutine call instruction and becomes a return program counter after termination of the subroutine call.

25. The data processing device according to claim 24, wherein said instruction codes existing in a VLIW instruction as elements are compressed by deleting at least some of the NOP instructions in the VLIW instruction if the VLIW instruction before compression has more NOP instructions than a predetermined number, and wherein a form of compression is determined according to the number and positions of the NOP instructions.

26. The data processing device according to claim 25, wherein compression information is added to each instruction code string that includes fewer instruction codes than a number of instruction slots for a VLIW instruction.

27. The data processing device according to claim 26, wherein succeeding instruction information indicating that a succeeding VLIW instruction includes only NOP instructions is added to the compression information, thereby storing information from the succeeding instruction code string in said instruction storage memory without storing the succeeding VLIW instruction, and wherein said instruction code decompression circuit restores the succeeding VLIW instruction upon detection of information indicating that the succeeding VLIW instruction includes only NOP instructions when the compression form information is read from said instruction storage memory.

28. A data processing device with an instruction compression function and an instruction decompression function for VLIW instructions, comprising:

an instruction storage memory to read or write units of instruction code strings for controlling a computer including a predetermined number of instruction codes in a compressed form with storage position information attached to each instruction code by deleting specific instruction codes; and an instruction code decompression circuit to decompress each instruction code according to the attached storage position information, wherein a program counter is not added to an instruction code deleted for compression, and a program counter is added to an instruction code stored in said instruction storage memory, wherein NOP instructions are left in a compressed code string such that consecutively deleted NOP instructions will not exceed the predetermined number in a compression code string when NOP instructions are deleted from an NOP instruction string in an instruction code string before compression.

29. The data processing device according to claim 28, wherein a return offset value is specified in an instruction code of a subroutine call instruction as an immediate value, and wherein a program counter of the subroutine call instruction added with the return offset value given as an immediate value in the subroutine call instruction becomes a return program counter after termination of the subroutine call.

30. The data processing device according to claim 29, wherein said instruction code is an element of a VLIW instruction, said storage position information is slot position information for a VLIW instruction, and said specific instruction code is an NOP instruction.

31. The data processing device according to claim 30, wherein NOP instructions to be left in a compressed code string are fixed at specific slot positions in a VLIW instruction word before compression.

32. The data processing device according to claim 30,
   wherein succeeding instruction information indicating that a succeeding VLIW instruction includes only NOP instructions is added to the compression information of the instruction code string, thereby storing information from the succeeding instruction code string in said instruction storage memory without storing the succeeding VLIW instruction, and
   wherein said instruction code decompression circuit restores the VLIW instruction upon detection of information indicating that the VLIW instruction includes only NOP instructions when the compression form information is read from said instruction storage memory.

33. A data storage medium to store at least specific instruction code strings for controlling a computer in a compressed form and to store attached compression form information respectively indicating a form of compression for said instruction code strings,
   wherein the attached compression information indicates whether a succeeding VLIW instruction is filled with NOP instructions, and wherein non-branch NOP instructions are selectively stored in said data storage medium.

34. The data storage medium according to claim 33,
   wherein said instruction codes exist in a VLIW instruction as elements and are compressed by deleting at least some of the NOP instructions in the VLIW instruction if the VLIW instruction before compression has more NOP instructions than a predetermined number, and
   wherein the form of compression is determined according to the number and positions of the NOP instructions.

35. The data storage medium according to claim 34, wherein compression information is added to each instruction code string that includes fewer instruction codes than a number of instruction slots for a VLIW instruction.

36. The data storage medium according to claim 35, wherein succeeding instruction information indicating that a succeeding VLIW instruction includes only NOP instructions is added to the compression information of the instruction code string, thereby storing information from the succeeding instruction code string in said instruction storage memory without storing the succeeding VLIW instruction.

37. A data storage medium to read or write instruction codes for controlling a computer in units of instruction code strings including a specified number of instruction codes in a form compressed by deleting specific instruction codes and in a form such that storage position information is respectively attached to each instruction code, the data storage medium to selectively store non-branch NOP instructions,
   wherein NOP instructions are left in a compressed code string such that consecutively deleted NOP instructions will not exceed a predetermined number in a compression code string when NOP instructions are deleted from an NOP instruction string in an instruction code string before compression.

38. The data storage medium according to claim 37, wherein the instruction code is an element of a VLIW instruction, the storage position information is slot position information for each VLIW instruction, and the specific instruction code is an NOP instruction.

39. The data storage medium according to claim 38, wherein NOP instructions to be left in a compressed code string are fixed at specific slot positions in a VLIW instruction word before compression.

40. The data storage medium according to claim 38, wherein succeeding instruction information indicating that a succeeding VLIW instruction includes only NOP instructions, is added to an instruction code read from said instruction storage memory, such that the instruction code string is stored in said instruction storage memory without the succeeding VLIW instruction.

41. A data processing device with an instruction compression function and an instruction decompression function for VLIW instructions, comprising:
   an instruction storage memory to store specific instruction code strings for controlling a computer in a compressed form, wherein each instruction code string includes attached compression information indicating a form of compression, and to selectively store non-branch NOP instructions; and
   an instruction code decompression circuit to decompress a compressed instruction code string read from said instruction storage memory according to the attached compression information,
   wherein succeeding instruction information indicating that a succeeding VLIW instruction includes only NOP instructions is added to the compression information of the instruction code string, thereby storing information from the succeeding instruction code string in said instruction storage memory without storing the succeeding VLIW instruction.

42. The data processing device according to claim 41, wherein said instruction code decompression circuit restores the VLIW instruction upon detection of information indicating that the VLIW instruction includes only NOP instructions when the compression form information is read from said instruction storage memory.

* * * * *